United States Patent
Tran et al.

(10) Patent No.: US 11,484,048 B2
(45) Date of Patent: Nov. 1, 2022

(54) DEFROSTING APPARATUS WITH DEFROSTING OPERATION MONITORING AND METHODS OF OPERATION THEREOF

(71) Applicant: NXP USA, Inc., Austin, TX (US)

(72) Inventors: Hung Hoa Tran, Chandler, AZ (US); Pierre Marie Jean Piel, Chandler, AZ (US); Lionel Mongin, Chandler, AZ (US); Jamison Michael McCarville, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 637 days.

(21) Appl. No.: 16/172,650

(22) Filed: Oct. 26, 2018

(65) Prior Publication Data

US 2020/0085082 A1   Mar. 19, 2020

Related U.S. Application Data

(63) Continuation-in-part of application No. 16/131,606, filed on Sep. 14, 2018.

(51) Int. Cl.
  *H05B 6/06* (2006.01)
  *H05B 6/68* (2006.01)
  (Continued)

(52) U.S. Cl.
  CPC ............ *A23L 3/005* (2013.01); *H05B 6/1245* (2013.01); *H05B 6/72* (2013.01)

(58) Field of Classification Search
  CPC .......... A23L 3/005; H05B 6/1245; H05B 6/72
  See application file for complete search history.

(56) References Cited

U.S. PATENT DOCUMENTS

| | | | | |
|---|---|---|---|---|
| 4,771,153 A | * | 9/1988 | Fukushima | ............ H05B 6/645 |
| | | | | 219/696 |
| 5,548,101 A | * | 8/1996 | Lee | ...................... H05B 6/6488 |
| | | | | 219/601 |

(Continued)

FOREIGN PATENT DOCUMENTS

| CN | 108521691 A | 9/2018 |
|---|---|---|
| CN | 108812854 A | 11/2018 |

(Continued)

OTHER PUBLICATIONS

Non Final Office Action; U.S. Appl. No. 16/131,606; 26 pages (dated Jan. 26, 2021).

(Continued)

*Primary Examiner* — Helena Kosanovic
*Assistant Examiner* — Ahmad Abdel-Rahman

(57) ABSTRACT

A system and method for defrosting a load are presented. Radio frequency (RF) signals are supplied to a transmission path that is electrically coupled to one or more electrodes that are positioned proximate to a cavity to cause the one or more electrodes to radiate RF electromagnetic energy. An RF power value of the RF signal along the transmission path is periodically measured resulting in RF power values and a rate of change of the RF power values is determined. A low-loss indicator value is determined using the RF power values, wherein the low-loss indicator value is at least partially determined by a dielectric loss of a load in the cavity. A controller determines, using the rate of change of the RF power values and the low-loss indicator value, that the load is in a defrosted state and stops supplying the RF signals.

13 Claims, 22 Drawing Sheets

(51) Int. Cl.
*A23L 3/005* (2006.01)
*H05B 6/12* (2006.01)
*H05B 6/72* (2006.01)

(56) References Cited

U.S. PATENT DOCUMENTS

| | | |
|---|---|---|
| 6,784,405 B2 | 8/2004 | Flugstad et al. |
| 7,068,050 B2 | 6/2006 | Steele et al. |
| 8,207,479 B2 | 6/2012 | Ben-Shmuel et al. |
| 9,215,756 B2 | 12/2015 | Bilchinsky et al. |
| 2004/0206755 A1 | 10/2004 | Hadinger |
| 2006/0081624 A1 | 4/2006 | Takada et al. |
| 2007/0278220 A1 | 12/2007 | Bostick et al. |
| 2012/0122072 A1 | 5/2012 | Bilchinsky et al. |
| 2013/0142923 A1 | 6/2013 | Torres et al. |
| 2014/0097908 A1 | 4/2014 | Fisk, II et al. |
| 2014/0305934 A1 | 10/2014 | DeCamillis et al. |
| 2015/0351164 A1 | 12/2015 | Wesson et al. |
| 2017/0118805 A1* | 4/2017 | Ha .................. H05B 6/129 |
| 2018/0042073 A1 | 2/2018 | Scott et al. |
| 2018/0220497 A1 | 8/2018 | Ibragimov |
| 2018/0220499 A1* | 8/2018 | Sims .................. H05B 6/50 |

FOREIGN PATENT DOCUMENTS

| | | |
|---|---|---|
| CN | 109000418 A | 12/2018 |
| EP | 3280224 A1 | 2/2018 |
| WO | WO-2017/017407 A1 | 2/2017 |

OTHER PUBLICATIONS

Final Office Action; U.S. Appl. No. 16/131,606; 17 pages (dated Apr. 20, 2022).
U.S. Appl. No. 15/806,075; 66 pages, filed Nov. 7, 2017.
U.S. Appl. No. 16/131,606; 113 pages, filed Sep. 14, 2018.
U.S. Appl. No. 16/230,425; 122 pages, filed Dec. 21, 2018.

* cited by examiner

DEFROSTING APPARATUS WITH DEFROSTING OPERATION MONITORING AND METHODS OF OPERATION THEREOF

CROSS-REFERENCE TO RELATED APPLICATIONS

This application is a continuation-in-part of and claims priority to U.S. patent application Ser. No. 16/131,606 entitled "DEFROSTING APPARATUS WITH LOW-LOSS LOAD DETECTION AND METHODS OF OPERATION THEREOF" and filed on Sep. 14, 2018.

TECHNICAL FIELD

Embodiments of the subject matter described herein relate generally to apparatus and methods of operating a thermal increase system for defrosting a load using radio frequency (RF) energy.

BACKGROUND

Conventional capacitive food defrosting (or thawing) systems include planar electrodes contained within a heating compartment. After a food load is placed between the electrodes and the electrodes are brought into close proximity with the food load, electromagnetic energy is supplied to the electrodes to provide gentle warming of the food load. As the food load thaws during a defrosting operation, the impedance of the food load changes.

When implementing a defrosting operation, it can be difficult to estimate the amount of time required for the defrosting operation to complete properly—premature cessation of the defrosting operation may leave the load still frozen and late cessation may result in partial cooking of the load. What are needed are apparatus and methods for defrosting food loads (or other types of loads) that may be configured to cease the defrosting operation when the load is at a desired temperature.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1A:
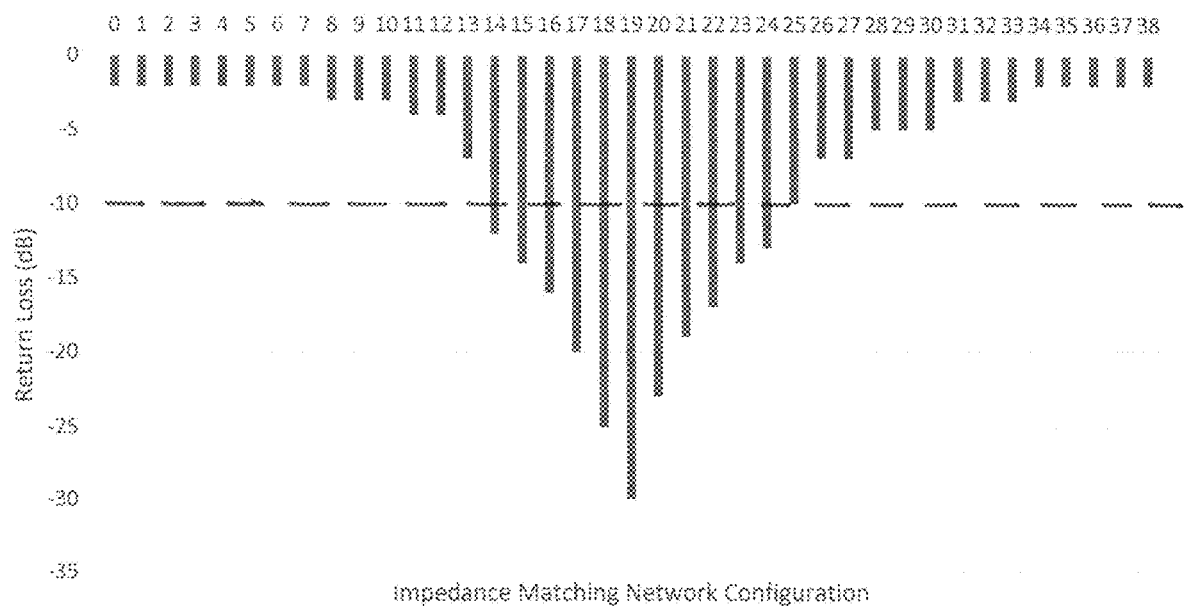
FIGS. 1A and 1B are charts depicting the results of testing an impedance match for a particular load over a number of different impedance matching network configurations.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to a solid-state defrosting apparatus that may be incorporated into stand-alone appliances or into other systems. As described in greater detail below, embodiments of solid-state defrosting apparatus include both "unbalanced" defrosting apparatus and "balanced" apparatus. For example, exemplary "unbalanced" defrosting systems are realized using a first electrode disposed in a cavity, a single-ended amplifier arrangement (including one or more transistors), a single-ended impedance matching network coupled between an output of the amplifier arrangement and the first electrode, and a measurement and control system that can detect when a defrosting operation has completed. In contrast, exemplary "balanced" defrosting systems are realized using first and second electrodes disposed in a cavity, a single-ended or double-ended amplifier arrangement (including one or more transistors), a double-ended impedance matching network coupled between an output of the amplifier arrangement and the first and second electrodes, and a measurement and control system that can detect when a defrosting operation has completed. In various embodiments, the impedance matching network includes a variable impedance matching network that can be adjusted during the defrosting operation to improve matching between the amplifier arrangement and the cavity.

Generally, the term "defrosting" means to elevate the temperature of a frozen load (e.g., a food load or other type of load) to a temperature at which the load is no longer frozen (e.g., a temperature at or near 0 degrees Celsius). As used herein, the term "defrosting" more broadly means a process by which the thermal energy or temperature of a load (e.g., a food load or other type of load) is increased through provision of radio frequency (RF) power to the load. Accordingly, in various embodiments, a "defrosting operation" may be performed on a load with any initial temperature (e.g., any initial temperature above or below 0 degrees Celsius), and the defrosting operation may be ceased at any final temperature that is higher than the initial temperature (e.g., including final temperatures that are above or below 0 degrees Celsius). That said, the "defrosting operations" and "defrosting systems" described herein alternatively may be referred to as "thermal increase operations" and "thermal increase systems." The term "defrosting" should not be construed to limit application of the invention to methods or systems that are only capable of raising the temperature of a frozen load to a temperature at or near 0 degrees Celsius. In one embodiment, a defrosting operation may raise the temperature of a food item to a tempered state at or around −4 degrees Celsius to −1 degrees Celsius, at which temperature the food item may be considered defrosted.

During a typical defrosting operation, RF electromagnetic energy supplied into the defrosting system's cavity by the system's electrodes is absorbed by the load, increasing the temperature of the load. As a food load thaws during a defrosting operation, the electrical properties of the food load change. By monitoring the changes in the electrical properties of the food load, the defrosting system can determine when the food load is defrosted (or has reached a target temperature) and can, therefore, automatically stop the defrosting process.

Specifically, when defrosting a frozen food load, the dielectric properties of the food load change. This results in changes in the return losses within the defrosting chamber as the food load warms up and begins to defrost. Generally, the rate of change in the amount of return losses over time during an initial stage of the defrosting process (e.g., when the food load is heating from −20 degrees Celsius) will be relatively constant as the defrosting process causes the frozen food load to warm gradually. As the food load warms and approaches the freezing point, however, the rate of change in the return losses diminishes relatively quickly. This change in the rate of change of the return losses can therefore be detected as an indication that the food load is defrosted or has reached a temperature (e.g., −4 degrees Celsius) at which the food load is in a nearly defrosted state.

Additionally, as a food load thaws and ice within the load transitions into water, the load tends to become increasingly transparent to RF electromagnetic energy. This results because water tends to have a lower loss tangent at the typically operating frequency (e.g., around 40 megahertz (MHz)) of the defrosting system than ice. For example, a typical defrosted load that is predominantly water may have a loss tangent 0.005 at 40.68 MHz, while the same load, when frozen, may have a loss tangent of 0.1 at the same frequency.

The defrosting system is configured to detect the food load transitioning from a relatively high-loss load (e.g., a frozen load) to a relatively low-loss load (e.g., a load that contains water) to assist in determining that the load is defrosted and the defrosting operation should be stopped.

To determine that the food load has transitioned into a low-loss state (indicating that the load is defrosted), the present defrosting system is configured to detect a low-loss load within the defrosting system's cavity. As with other types of food loads, when implementing a defrosting operation on a food load that has transitioned into a low-loss load, the defrosting system uses the system's variable impedance matching network to provide impedance matching between the system's amplifier and the cavity plus the load. Essentially, the variable impedance matching network provides an impedance transformation between the input and output of the network (e.g., from a relatively-low impedance to a relatively-high impedance), and the amount or value of impedance transformation may be measured in ohms. In some configurations, the network may provide a relatively small impedance transformation (e.g., relatively small increase in impedance), and in other configurations, the network may provide a relatively high impedance transformation (e.g., relatively large increase in impedance). The "impedance transformation value" represents the magnitude of the impedance transformation provided by the variable impedance matching network in any given state or configuration. Impedance matching can be achieved because the low-loss loads generate a similar cavity capacitance to absorptive loads. As such, a low-loss load may appear to the defrosting system to be an absorptive load (e.g., a load that may absorb RF electromagnetic energy) that may be defrosted.

As described above, however, low-loss loads tend to not absorb significant amounts of the RF electromagnetic energy supplied by the defrosting system. Although low-loss loads are susceptible to impedance changes in the same manner as absorptive loads, and thus may benefit from variable impedance matching, low-loss loads are characterized in that they tend to form a higher quality ("Q") resonant circuit with the defrosting system than an absorptive load. That is, the impedance match achieved with a low-loss load may be less robust than the match that can be achieved with an absorptive load. More particularly, impedance matching for a low-loss load occurs over a small range of impedance transformation values as compared to an absorptive load.

Specifically, for an absorptive load, once an optimum impedance match between the system and cavity plus load is achieved by setting the system's impedance matching network to a particular impedance transformation value or configuration, small changes to the impedance transformation value will not tend to severely degrade the quality of that impedance match. That is, small changes to the impedance transformation value may not significantly change return losses in the system. In contrast, the impedance match achieved with a low-loss load is less robust. For a low-loss load, once an optimum impedance match between the system's amplifier and cavity plus load is achieved by setting the system's impedance matching network to a particular impedance transformation value or configuration, small changes to the impedance transformation may significantly degrade the quality of that impedance match as compared to an absorptive load. More particularly, as compared to an absorptive load, small changes to the impedance transformation value for a low-loss load can result in a measurable change in return losses.

In view of these characteristics of a low-loss load, embodiments of the present defrosting system can perform an analysis of the system's impedance match characteristics to detect a potential low-loss load. In an embodiment, the defrosting system detects a low-loss load by first evaluating the quality of the impedance match achieved with a number of different configurations of the system's variable impedance matching network. This may involve iteratively measuring a reflected RF power from the system's cavity containing the load (and in some embodiments the forward RF power to the cavity) for all or a subset of possible impedance matching network configurations. Following this sweep of impedance matching network configurations, the system then determines which configuration results in the lowest reflected RF power and/or the lowest reflected-to-forward power ratio, indicating that such a configuration (e.g., the impedance transformation value associated with that configuration) provides an optimum impedance match between the system's amplifier and cavity plus load. Understanding that multiple configurations potentially may provide an optimum, near-optimum, or acceptable impedance match, the term "optimum," as used herein, means the best (i.e., an impedance match configuration corresponding to the highest absorption of electromagnetic energy into the load, or the minimum reflected RF power or reflected-to-forward power ratio), or an acceptable (i.e., an impedance match configuration providing higher than a predefined threshold of energy absorption, as indicated by a reflected RF power or reflected-to-forward power ratio below a predefined reflected RF power threshold or predefined reflected-to-forward power ratio threshold).

With an optimum match identified, the system analyzes the quality of the match for impedance matching network configurations that provide impedance transformation values around (e.g., higher and lower than) the impedance transformation value that provided the optimum match. The quality of the impedance match at those other impedance transformation values is used to generate a numerical score or point value. If the score or point value falls below a threshold (indicating that the impedance match is of relatively poor quality at those other impedance transformation values), that may indicate that the load is a low-loss load and the system can take appropriate action.

Figure 1B:
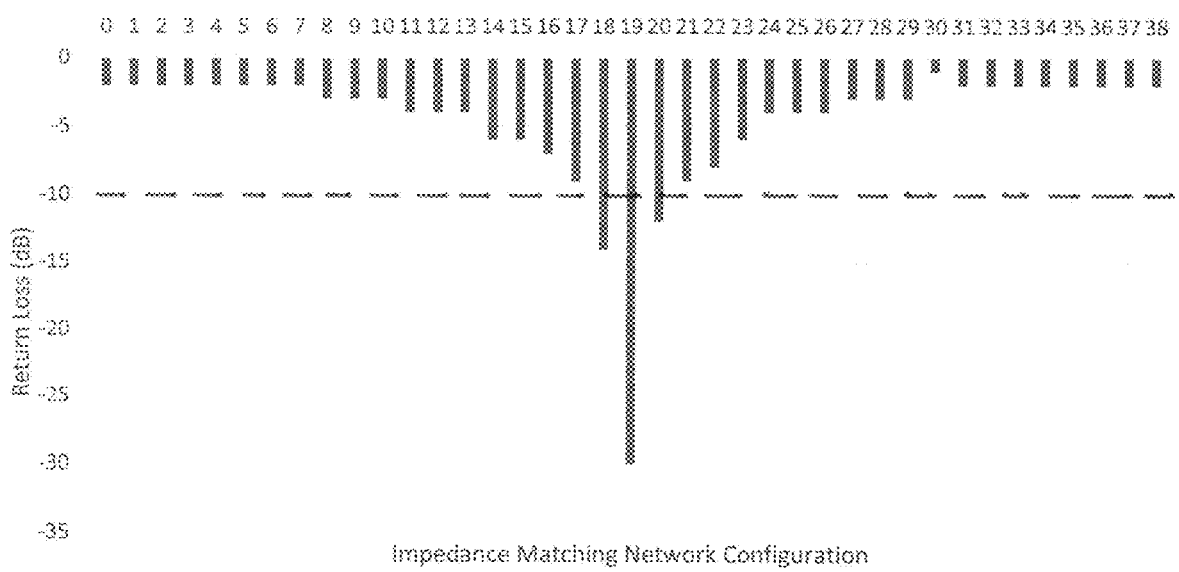

To illustrate, FIGS. 1A and 1B are charts depicting the results of testing the impedance match for a particular load with a number of different configurations of the system's variable impedance matching network. More specifically, the impedance configurations along the horizontal axis each represent a different configuration of the system's variable impedance matching network, and the values along the vertical axis represent the return loss, in decibels (dB), for which lower (e.g., more negative) values indicate a better impedance match (i.e., higher absorption of electromagnetic energy by the load). FIG. 1A represents the results for the load in a frozen condition and FIG. 1B represents the results for the same load in a defrosted condition.

As illustrated, the load in both the absorptive (FIG. 1A) and low-loss (FIG. 1B) conditions achieve an optimum impedance match at an impedance configuration number 18 with a return loss of −30 dB. But, as can be seen in FIGS. 1A and 1B, the match achieved for the load in the absorptive state is more robust than that of the load in the low-loss state. Assuming a threshold return loss is −10 dB, for example, FIG. 1A shows that, as the impedance configurations change from that of the optimum match for the load in the absorptive state (either increasing or decreasing from configuration 18), the quality of the match stays relatively high (return loss below the −10 dB threshold) between impedance configurations 14 and 24. In the case of the load in the low-loss state, however, the quality of the match degrades rapidly as the impedance of the system's impedance matching network's configuration differs from the optimum impedance configuration 18, as evidenced by the quality of the match staying relatively high (return loss below the −10 dB threshold) only between impedance configurations 18 and 20. In other words, for the low-loss load, the quality of the match degrades much more rapidly around the optimum impedance match than for absorptive loads. That rapid degradation is indicative of the presence of a low-loss load in the system's cavity and, in turn, indicative that the load is in a defrosted state.

In analyzing how rapidly the impedance match quality degrades, the system may use any of a number of suitable approaches. For example, the system may determine, during a particular impedance matching network configuration scan (i.e., iterating through a number of different impedance matching network configurations to measure), the number of impedance configurations that achieve a match with return losses lower than a particular return loss threshold (e.g., −10 dB or some other threshold). If the number of impedance match configurations below the threshold exceeds a predetermined minimum number of impedance match configurations, that may indicate that the load is an absorptive load. In short, for an absorptive load, there may be a relatively large number of different impedance match configurations that achieve a satisfactory (acceptable) impedance match. Conversely, if the number falls below the minimum number of impedance match configurations, that may indicate that the load is a low-loss load. For low-loss loads only a relatively small number of impedance configurations may achieve an acceptable impedance match.

With reference to FIGS. 1A and 1B, for example, system parameters may be established that include a satisfactory return loss threshold (indicating an acceptable impedance match) of −10 dB, and for a load to be considered an absorptive load, a minimum number of 7 impedance match configurations must achieve return losses falling below that threshold. With reference to FIG. 1A, for example, the system can analyze the results of iterating through all available impedance match configurations to determine that 11 impedance match configurations result in a return loss that is lower than the return loss threshold of −10 dB (in this example, a return loss is considered to "exceed" the threshold when it has a value that falls below the threshold). Since 11 impedance match configurations is greater than the minimum number of 7, that indicates to the system that the load of FIG. 1A is an absorptive load and that the load may be successfully defrosted using a standard process. But in the case of FIG. 1B, the system may analyze the results to determine that only 3 impedance match configurations resulted in return losses below the threshold of −10 dB. Since 3 is less than the minimum number of 7, that indicates that the load is a low-loss load for which the standard defrosting process may not be effective.

In other embodiments, the system can use other approaches for analyzing the results of the impedance matching network configuration scan. For example, the system may calculate the rate of change in return losses as the impedance transformation value of the system's impedance matching network changes from an optimum configuration. The rate of change may be expressed as the ratio of the rate of change in return loss to the rate of change in impedance transformation. The system may calculate that ratio for a predetermined number of impedance network configurations (e.g., 3 impedance network configurations) providing greater impedance transformation values then the optimum impedance network configuration. The system may also calculate that ratio for a predetermined number of impedance network configurations (e.g., 3 impedance network configurations) providing lesser impedance transformation values than the optimum impedance network configuration. Those two ratios may then be combined (e.g., by taking an average value of the absolute value of both ratios) to determine an average rate of change in return losses around the optimum impedance network configuration. If the average ratio value exceeds a predetermined threshold, the system may determine that the load is a low-loss load.

In another embodiment, a number of points (or a weighting) may be associated with the different impedance matching configurations, enabling an overall score to be calculated for a particular load based upon the number of impedance matching network configuration that achieve a satisfactory impedance match. Once calculated, the score can be compared to various score thresholds to identify a potential low-loss load (or an absorptive load), and to control device operation accordingly.

Having determined both the rate of change of the return losses over time and a value indicative of whether the load is a low-loss load (e.g., the number of impedance configurations that achieve a match with return losses lower than a particular return loss threshold, the rate of change in return losses as the impedance transformation value of the system's impedance matching network changes from an optimum configuration, or a point score), the two values can be combined, as described herein, and compared to a threshold to determine that the load is defrosted and that the defrosting operation should end.

Figure 2A:
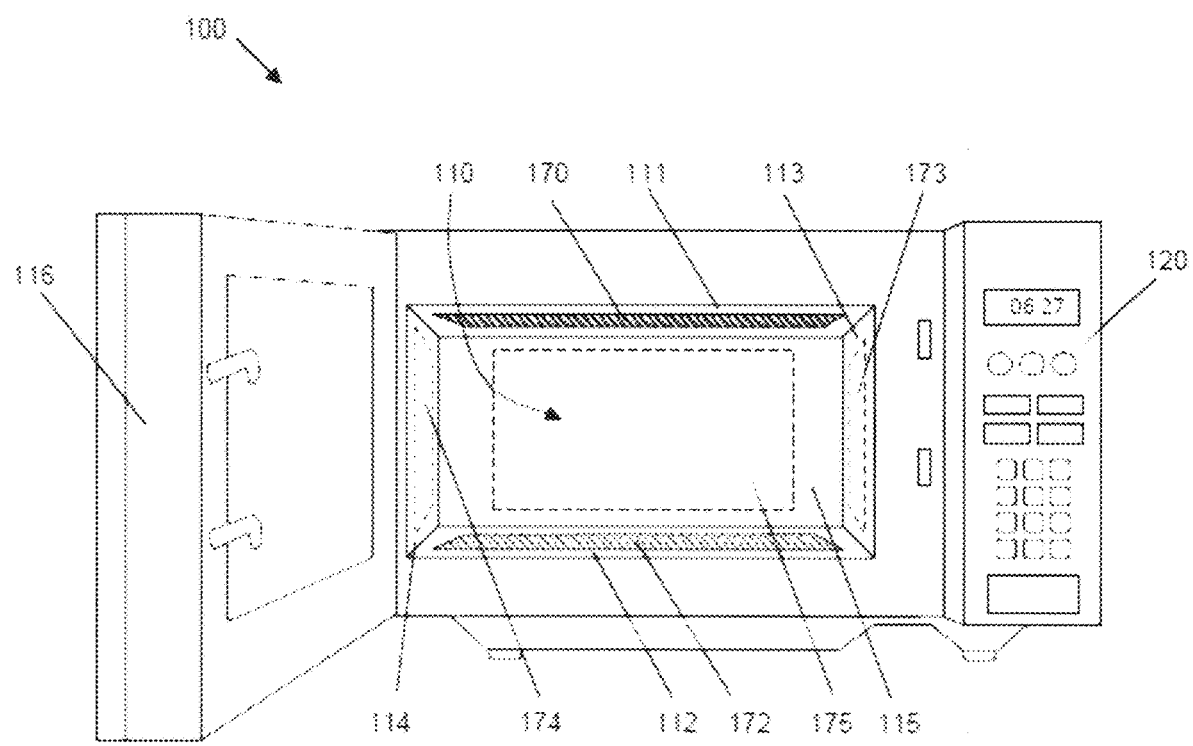
FIG. 2A is a perspective view of a defrosting appliance, in accordance with an example embodiment.

FIG. 2A is a perspective view of a defrosting system 100, in accordance with an example embodiment. Defrosting system 100 includes a defrosting cavity 110 (e.g., cavity 360, 760, 1174, FIGS. 3, 7, 11), a control panel 120, one or more RF signal sources (e.g., RF signal source 320, 720, 1120, FIGS. 3, 7, 11), a power supply (e.g., power supply 326, 726, FIGS. 3, 7), a first electrode 170 (e.g., electrode 340, 740, 1170, FIGS. 3, 7, 11), a second electrode 172 (e.g., electrode 750, 1172, FIGS. 7, 11), impedance matching circuitry (e.g., circuits 334, 370, 734, 772, 1160, FIGS. 3, 7, 11), power detection circuitry (e.g., power detection circuitry 330, 730, 730', 730", 1180, FIGS. 3, 7, 11), and a system controller (e.g., system controller 312, 712, 1130, FIGS. 3, 7, 11). The defrosting cavity 110 is defined by interior surfaces of top, bottom, side, and back cavity walls 111, 112, 113, 114, 115 and an interior surface of door 116. With door 116 closed, the defrosting cavity 110 defines an enclosed air cavity. As used herein, the term "air cavity" may mean an enclosed area that contains air or other gasses (e.g., defrosting cavity 110).

According to an "unbalanced" embodiment, the first electrode 170 is arranged proximate to a cavity wall (e.g., top wall 111), the first electrode 170 is electrically isolated from the remaining cavity walls (e.g., walls 112-115 and door 116), and the remaining cavity walls are grounded. In such a configuration, the system may be simplistically modeled as a capacitor, where the first electrode 170 functions as one conductive plate (or electrode), the grounded cavity walls (e.g., walls 112-115) function as a second conductive plate (or electrode), and the air cavity (including any load contained therein) function as a dielectric medium between the first and second conductive plates. Although not shown in FIG. 2A, a non-electrically conductive barrier (e.g., barrier 362, 762, FIGS. 3, 7) also may be included in the system 100, and the non-conductive barrier may function to electrically and physically isolate the load from the bottom cavity wall 112. Although FIG. 2A shows the first electrode 170 being proximate to the top wall 111, the first electrode 170 alternatively may be proximate to any of the other walls 112-115, as indicated by electrodes 172-175.

According to a "balanced" embodiment, the first electrode 170 is arranged proximate to a first cavity wall (e.g., top wall 111), a second electrode 172 is arranged proximate to an opposite, second cavity wall (e.g., bottom wall 112), and the first and second electrodes 170, 172 are electrically isolated from the remaining cavity walls (e.g., walls 113-115 and door 116). In such a configuration, the system also may be simplistically modeled as a capacitor, where the first electrode 170 functions as one conductive plate (or electrode), the second electrode 172 functions as a second conductive plate (or electrode), and the air cavity (including any load contained therein) function as a dielectric medium between the first and second conductive plates. Although not shown in FIG. 2A, a non-electrically conductive barrier (e.g., barrier 762, 1156, FIGS. 7, 11) also may be included in the system 100, and the non-conductive barrier may function to electrically and physically isolate the load from the second electrode 172 and the bottom cavity wall 112. Although FIG. 2A shows the first electrode 170 being proximate to the top wall 111, and the second electrode 172 being proximate to the bottom wall 112, the first and second electrodes 170, 172 alternatively may be proximate to other opposite walls (e.g., the first electrode may be electrode 173 proximate to wall 113, and the second electrode may be electrode 174 proximate to wall 114.

According to an embodiment, during operation of the defrosting system 100, a user (not illustrated) may place one or more loads (e.g., food and/or liquids) into the defrosting cavity 110, and optionally may provide inputs via the control panel 120 that specify characteristics of the load(s). For example, the specified characteristics may include an approximate mass of the load. In addition, the specified load characteristics may indicate the material(s) from which the load is formed (e.g., meat, bread, liquid). In alternate embodiments, the load characteristics may be obtained in some other way, such as by scanning a barcode on the load packaging or receiving a radio frequency identification (RFID) signal from an RFID tag on or embedded within the load. Either way, as will be described in more detail later, information regarding such load characteristics enables the system controller (e.g., system controller 312, 712, 1130, FIGS. 3, 7, 11) to establish an initial state (configuration) for the impedance matching network of the system at the beginning of the defrosting operation, where the initial configuration may be relatively close to an optimal configuration that enables maximum RF power transfer into the load. Alternatively, load characteristics may not be entered or received prior to commencement of a defrosting operation, and the system controller may establish a default initial configuration for the impedance matching network.

To begin the defrosting operation, the user may provide an input via the control panel 120. In response, the system controller causes the RF signal source(s) (e.g., RF signal source 320, 720, 1120, FIGS. 3, 7, 11) to supply an RF signal to the first electrode 170 in an unbalanced embodiment, or to both the first and second electrodes 170, 172 in a balanced embodiment, and the electrode(s) responsively radiate electromagnetic energy into the defrosting cavity 110. The electromagnetic energy increases the thermal energy of the load (i.e., the electromagnetic energy causes the load to warm up).

During the defrosting operation, the impedance of the load (and thus the total input impedance of the cavity 110 plus load) changes as the thermal energy of the load increases. The impedance changes alter the absorption of RF electromagnetic energy into the load, and thus alter the magnitude of reflected power. According to an embodiment, power detection circuitry (e.g., power detection circuitry 330, 730, 1180, FIGS. 3, 7, 11) continuously or periodically measures the reflected power along a transmission path (e.g., transmission path 328, 728, 1148, FIGS. 3, 7, 11) between the RF signal source (e.g., RF signal source 320, 720, 1120, FIGS. 3, 7, 11) and the electrode(s) 170, 172. Based on these measurements, the system controller (e.g., system controller 312, 712, 1130, FIGS. 3, 7, 11) may detect completion of the defrosting operation, as will be described in detail below. According to a further embodiment, the impedance matching network is variable, and based on the reflected power measurements (or both the forward and reflected power measurements), the system controller may alter the configuration of the impedance matching network during the defrosting operation to increase the absorption of RF power by the load.

Figure 2B:
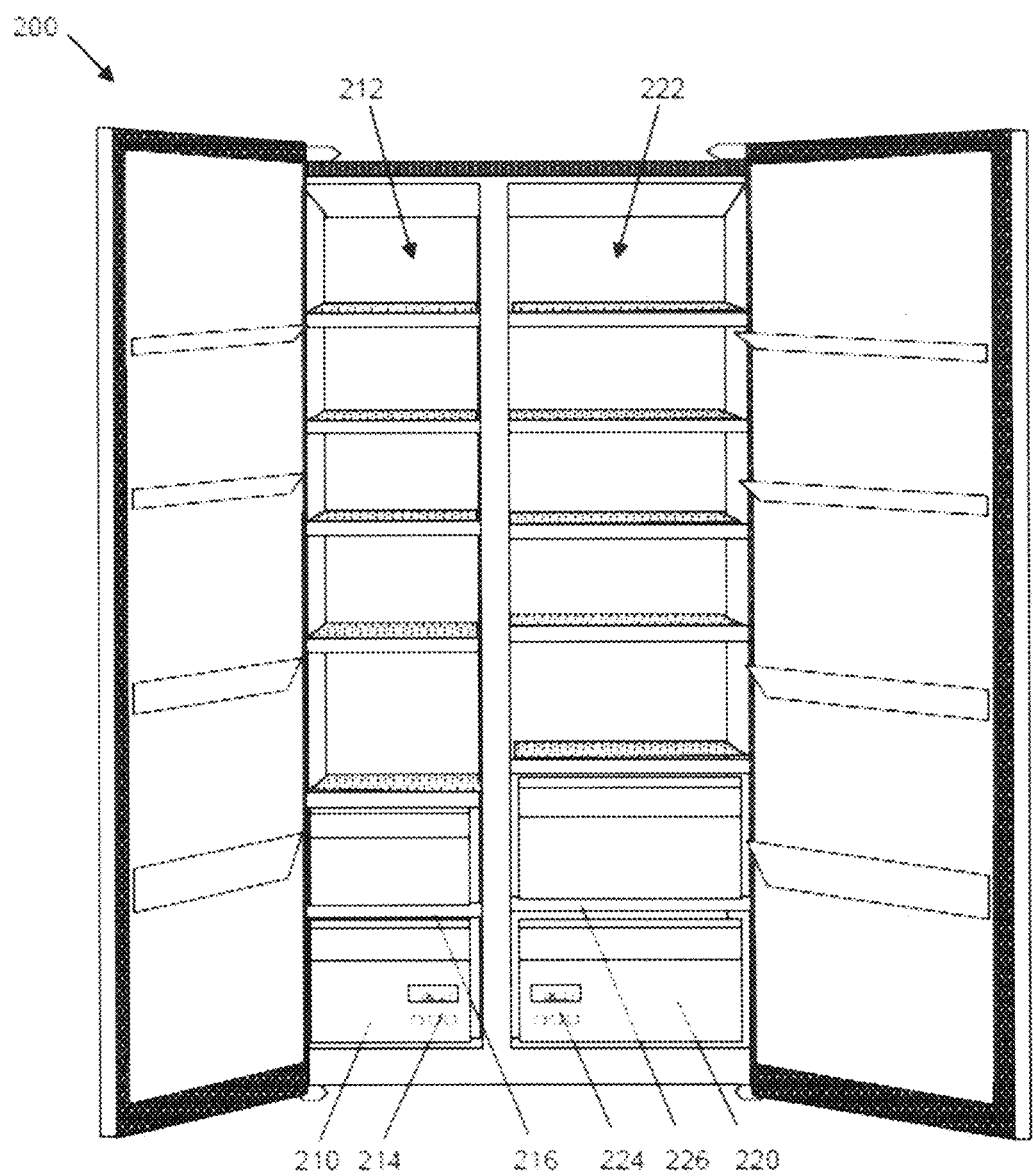
FIG. 2B is a perspective view of a refrigerator/freezer appliance that includes other example embodiments of defrosting systems.

The defrosting system 100 of FIG. 2A is embodied as a counter-top type of appliance. In a further embodiment, the defrosting system 100 also may include components and functionality for performing microwave cooking operations. Alternatively, components of a defrosting system may be incorporated into other types of systems or appliances. For example, FIG. 2B is a perspective view of a refrigerator/freezer appliance 200 that includes other example embodiments of defrosting systems 210, 220. More specifically, defrosting system 210 is shown to be incorporated within a freezer compartment 212 of the system 200, and defrosting system 220 is shown to be incorporated within a refrigerator compartment 222 of the system. An actual refrigerator/freezer appliance likely would include only one of the defrosting systems 210, 220, but both are shown in FIG. 2B to concisely convey both embodiments.

Figure 3:
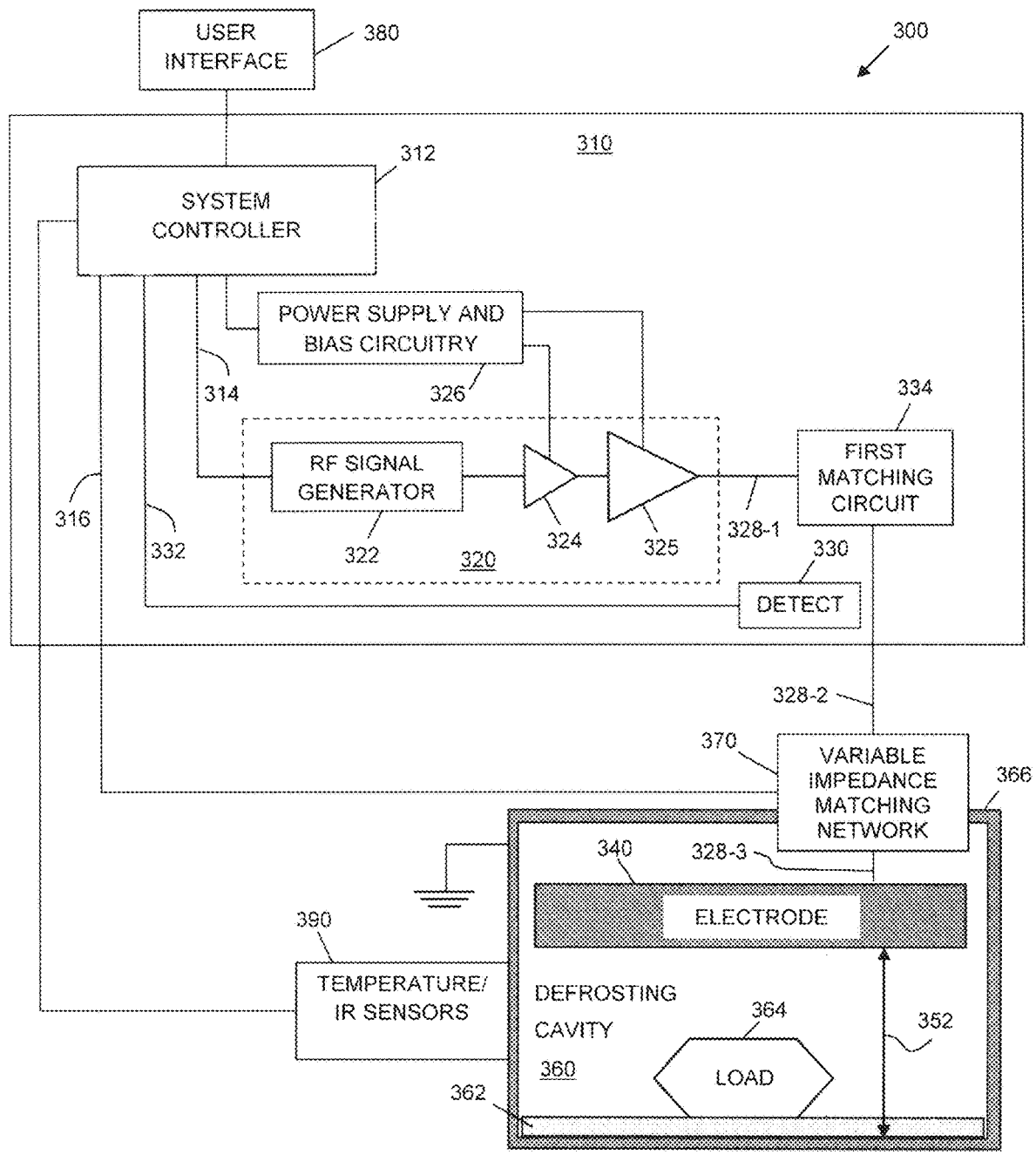
FIG. 3 is a simplified block diagram of an unbalanced defrosting apparatus, in accordance with an example embodiment.
Figure 7:
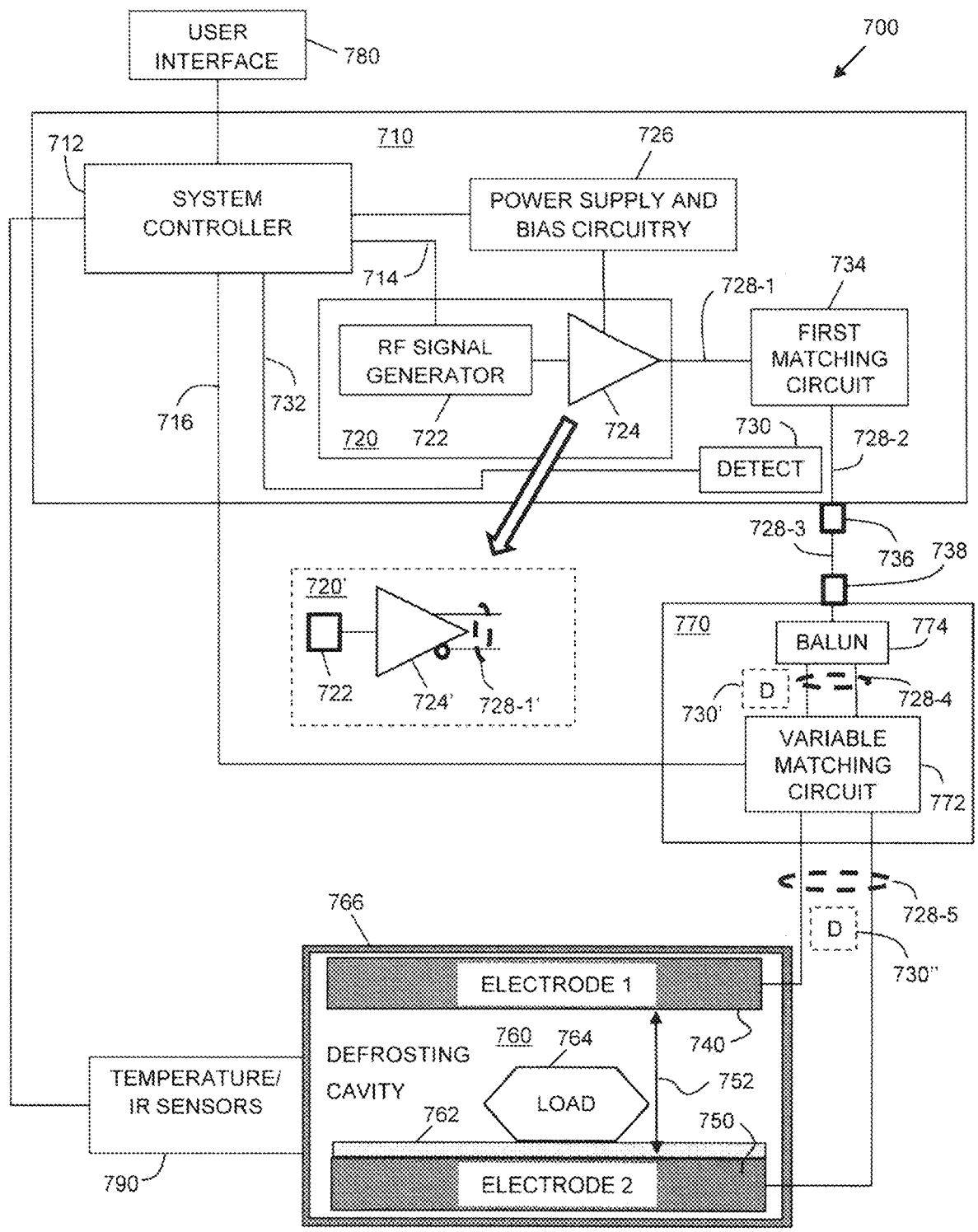
FIG. 7 is a simplified block diagram of a balanced defrosting apparatus, in accordance with an example embodiment.
Figure 11:
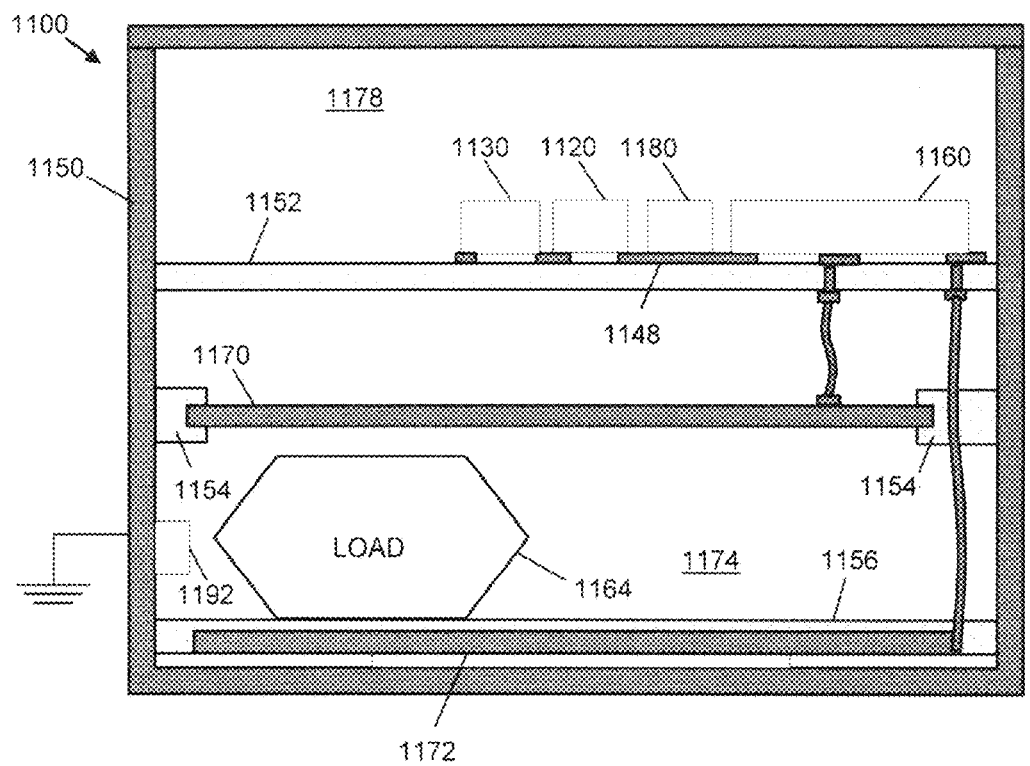
FIG. 11 is a cross-sectional, side view of a defrosting system, in accordance with an example embodiment.

Similar to the defrosting system 100, each of defrosting systems 210, 220 includes a defrosting cavity, a control panel 214, 224, one or more RF signal sources (e.g., RF signal source 320, 720, 1120, FIGS. 3, 7, 11), a power supply (e.g., power supply 326, 726, FIGS. 3, 7), a first electrode (e.g., electrode 340, 740, 1170, FIGS. 3, 7), a second electrode 172 (e.g., containment structure 366, electrode 750, FIGS. 3, 7, 11), impedance matching circuitry (e.g., circuits 334, 370, 734, 772, 1160, FIGS. 3, 7, 11), power detection circuitry (e.g., power detection circuitry 330, 730, 1180, FIGS. 3, 7, 11), and a system controller (e.g., system controller 312, 712, 1130, FIGS. 3, 7, 11). For example, the defrosting cavity may be defined by interior surfaces of bottom, side, front, and back walls of a drawer, and an interior top surface of a fixed shelf 216, 226 under which the drawer slides. With the drawer slid fully under the shelf, the drawer and shelf define the cavity as an enclosed air cavity. The components and functionalities of the defrosting systems 210, 220 may be substantially the same as the components and functionalities of defrosting system 100, in various embodiments.

In addition, according to an embodiment, each of the defrosting systems 210, 220 may have sufficient thermal communication with the freezer or refrigerator compartment 212, 222, respectively, in which the system 210, 220 is disposed. In such an embodiment, after completion of a defrosting operation, the load may be maintained at a safe temperature (i.e., a temperature at which food spoilage is retarded) until the load is removed from the system 210, 220. More specifically, upon completion of a defrosting operation by the freezer-based defrosting system 210, the cavity within which the defrosted load is contained may thermally communicate with the freezer compartment 212, and if the load is not promptly removed from the cavity, the load may re-freeze. Similarly, upon completion of a defrosting operation by the refrigerator-based defrosting system 220, the cavity within which the defrosted load is contained may thermally communicate with the refrigerator compartment 222, and if the load is not promptly removed from the cavity, the load may be maintained in a defrosted state at the temperature within the refrigerator compartment 222.

Those of skill in the art would understand, based on the description herein, that embodiments of defrosting systems may be incorporated into systems or appliances having other configurations, as well. Accordingly, the above-described implementations of defrosting systems in a stand-alone appliance, a microwave oven appliance, a freezer, and a refrigerator are not meant to limit use of the embodiments only to those types of systems.

Although defrosting systems 100, 200 are shown with their components in particular relative orientations with respect to one another, it should be understood that the various components may be oriented differently, as well. In addition, the physical configurations of the various components may be different. For example, control panels 120, 214, 224 may have more, fewer, or different user interface elements, and/or the user interface elements may be differently arranged. In addition, although a substantially cubic defrosting cavity 110 is illustrated in FIG. 2A, it should be understood that a defrosting cavity may have a different shape, in other embodiments (e.g., cylindrical, and so on). Further, defrosting systems 100, 210, 220 may include additional components (e.g., a fan, a stationary or rotating plate, a tray, an electrical cord, and so on) that are not specifically depicted in FIGS. 1, 2.

FIG. 3 is a simplified block diagram of an unbalanced defrosting system 300 (e.g., defrosting system 100, 210, 220, FIGS. 1, 2), in accordance with an example embodiment. Defrosting system 300 includes RF subsystem 310, defrosting cavity 360, user interface 380, system controller 312, RF signal source 320, power supply and bias circuitry 326, variable impedance matching network 370, electrode 340, containment structure 366, and power detection circuitry 330, in an embodiment. In addition, in other embodiments, defrosting system 300 may include temperature sensor(s), and/or infrared (IR) sensor(s) 390, although some or all of these sensor components may be excluded. It should be understood that FIG. 3 is a simplified representation of a defrosting system 300 for purposes of explanation and ease of description, and that practical embodiments may include other devices and components to provide additional functions and features, and/or the defrosting system 300 may be part of a larger electrical system.

User interface 380 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

Some embodiments of defrosting system 300 may include temperature sensor(s), and/or IR sensor(s) 390. The temperature sensor(s) and/or IR sensor(s) may be positioned in locations that enable the temperature of the load 364 to be sensed during the defrosting operation. When provided to the system controller 312, the temperature information enables the system controller 312 to alter the power of the RF signal supplied by the RF signal source 320 (e.g., by controlling the bias and/or supply voltages provided by the power supply and bias circuitry 326), to adjust the configuration of the variable impedance matching network 370, and/or to determine when the defrosting operation should be terminated. The system controller 312 may use this information, for example, to determine a desired power level for the RF signal supplied by the RF signal source 320, to determine an initial setting for the variable impedance matching network 370, and/or to determine an approximate duration for the defrosting operation.

The RF subsystem 310 includes a system controller 312, an RF signal source 320, first impedance matching circuit 334 (herein "first matching circuit"), power supply and bias circuitry 326, and power detection circuitry 330, in an embodiment. System controller 312 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 312 is coupled to user interface 380, RF signal source 320, variable impedance matching network 370, power detection circuitry 330, and sensors 390 (if included). System controller 312 is configured to receive signals indicating user inputs received via user interface 380, and to receive signals indicating RF signal reflected power (and possibly RF signal forward power) from power detection circuitry 330. Responsive to the received signals and measurements, and as will be described in more detail later, system controller 312 provides control signals to the power supply and bias circuitry 326 and to the RF signal generator 322 of the RF signal source 320. In addition, system controller 312 provides control signals to the variable impedance matching network 370, which cause the network 370 to change its state or configuration.

Defrosting cavity 360 includes a capacitive defrosting arrangement with first and second parallel plate electrodes that are separated by an air cavity within which a load 364 to be defrosted may be placed. For example, a first electrode 340 may be positioned above the air cavity, and a second electrode may be provided by a portion of a containment structure 366. More specifically, the containment structure 366 may include bottom, top, and side walls, the interior surfaces of which define the cavity 360 (e.g., cavity 110, FIG. 2A). According to an embodiment, the cavity 360 may be sealed (e.g., with a door 116, FIG. 2A or by sliding a drawer closed under a shelf 216, 226, FIG. 2B) to contain the electromagnetic energy that is introduced into the cavity 360 during a defrosting operation. The system 300 may include one or more interlock mechanisms that ensure that the seal is intact during a defrosting operation. If one or more of the interlock mechanisms indicates that the seal is breached, the system controller 312 may cease the defrosting operation. According to an embodiment, the containment structure 366 is at least partially formed from conductive material, and the conductive portion(s) of the containment structure may be grounded. Alternatively, at least the portion of the containment structure 366 that corresponds to the bottom surface of the cavity 360 may be formed from conductive material and grounded. Either way, the containment structure 366 (or at least the portion of the containment structure 366 that is parallel with the first electrode 340) functions as a second electrode of the capacitive defrosting arrangement. To avoid direct contact between the load 364 and the grounded bottom surface of the cavity 360, a non-conductive barrier 362 may be positioned over the bottom surface of the cavity 360.

Essentially, defrosting cavity 360 includes a capacitive defrosting arrangement with first and second parallel plate electrodes 340, 366 that are separated by an air cavity within which a load 364 to be defrosted may be placed. The first electrode 340 is positioned within containment structure 366 to define a distance 352 between the electrode 340 and an opposed surface of the containment structure 366 (e.g., the bottom surface, which functions as a second electrode), where the distance 352 renders the cavity 360 a sub-resonant cavity, in an embodiment.

In various embodiments, the distance 352 is in a range of about 0.10 meters to about 1.0 meter, although the distance may be smaller or larger, as well. According to an embodiment, distance 352 is less than one wavelength of the RF signal produced by the RF subsystem 310. In other words, as mentioned above, the cavity 360 is a sub-resonant cavity. In some embodiments, the distance 352 is less than about half of one wavelength of the RF signal. In other embodiments, the distance 352 is less than about one quarter of one wavelength of the RF signal. In still other embodiments, the distance 352 is less than about one eighth of one wavelength of the RF signal. In still other embodiments, the distance 352 is less than about one 50th of one wavelength of the RF signal. In still other embodiments, the distance 352 is less than about one 100th of one wavelength of the RF signal.

In general, a system 300 designed for lower operational frequencies (e.g., frequencies between 10 megahertz (MHz) and 100 MHz) may be designed to have a distance 352 that is a smaller fraction of one wavelength. For example, when system 300 is designed to produce an RF signal with an operational frequency of about 10 MHz (corresponding to a wavelength of about 30 meters), and distance 352 is selected to be about 0.5 meters, the distance 352 is about one 60th of one wavelength of the RF signal. Conversely, when system 300 is designed for an operational frequency of about 300 MHz (corresponding to a wavelength of about 1 meter), and distance 352 is selected to be about 0.5 meters, the distance 352 is about one half of one wavelength of the RF signal.

With the operational frequency and the distance 352 between electrode 340 and containment structure 366 being selected to define a sub-resonant interior cavity 360, the first electrode 340 and the containment structure 366 are capacitively coupled. More specifically, the first electrode 340 may be analogized to a first plate of a capacitor, the containment structure 366 may be analogized to a second plate of a capacitor, and the load 364, barrier 362, and air within the cavity 360 may be analogized to a capacitor dielectric. Accordingly, the first electrode 340 alternatively may be referred to herein as an "anode," and the containment structure 366 may alternatively be referred to herein as a "cathode."

Essentially, the voltage across the first electrode 340 and the containment structure 366 heats the load 364 within the cavity 360. According to various embodiments, the RF subsystem 310 is configured to generate the RF signal to produce voltages between the electrode 340 and the containment structure 366 in a range of about 90 volts to about 3,000 volts, in one embodiment, or in a range of about 3000 volts to about 10,000 volts, in another embodiment, although the system may be configured to produce lower or higher voltages between the electrode 340 and the containment structure 366, as well.

The first electrode 340 is electrically coupled to the RF signal source 320 through a first matching circuit 334, a variable impedance matching network 370, and a conductive transmission path, in an embodiment. The first matching circuit 334 is configured to perform an impedance transformation from an impedance of the RF signal source 320 (e.g., less than about 10 ohms) to an intermediate impedance (e.g., 50 ohms, 75 ohms, or some other value). According to an embodiment, the conductive transmission path includes a plurality of conductors 328-1, 328-2, and 328-3 connected in series, and referred to collectively as transmission path 328. According to an embodiment, the conductive transmission path 328 is an "unbalanced" path, which is configured to carry an unbalanced RF signal (i.e., a single RF signal referenced against ground). In some embodiments, one or more connectors (not shown, but each having male and female connector portions) may be electrically coupled along the transmission path 328, and the portion of the transmission path 328 between the connectors may comprise a coaxial cable or other suitable connector. Such a connection is shown in FIG. 7 and described later (e.g., including connectors 736, 738 and a conductor 728-3 such as a coaxial cable between the connectors 736, 738).

As will be described in more detail later, the variable impedance matching circuit 370 is configured to perform an impedance transformation from the above-mentioned intermediate impedance to an input impedance of defrosting cavity 320 as modified by the load 364 (e.g., on the order of hundreds or thousands of ohms, such as about 1000 ohms to about 4000 ohms or more). In an embodiment, the variable impedance matching network 370 includes a network of passive components (e.g., inductors, capacitors, resistors).

According to one more specific embodiment, the variable impedance matching network 370 includes a plurality of fixed-value lumped inductors (e.g., inductors 412-414, FIG. 4A) that are positioned within the cavity 360 and which are electrically coupled to the first electrode 340. In addition, the variable impedance matching network 370 includes a plurality of variable inductance networks (e.g., networks 410, 411, 500, FIGS. 4A, 5A), which may be located inside or outside of the cavity 360. According to another more specific embodiment, the variable impedance matching network 370 includes a plurality of variable capacitance networks (e.g., networks 442, 446, 540, FIG. 4B, 5B), which may be located inside or outside of the cavity 360. The inductance or capacitance value provided by each of the variable inductance or capacitance networks is established using control signals from the system controller 312, as will be described in more detail later. In any event, by changing the configuration of the variable impedance matching network 370 over the course of a defrosting operation to dynamically match the ever-changing cavity plus load impedance, the amount of RF power that is absorbed by the load 364 may be maintained at a high level despite variations in the load impedance during the defrosting operation.

According to an embodiment, RF signal source 320 includes an RF signal generator 322 and a power amplifier (e.g., including one or more power amplifier stages 324, 325). In response to control signals provided by system controller 312 over connection 314, RF signal generator 322 is configured to produce an oscillating electrical signal having a frequency in the ISM (industrial, scientific, and medical) band, although the system could be modified to support operations in other frequency bands, as well. The RF signal generator 322 may be controlled to produce oscillating signals of different power levels and/or different frequencies, in various embodiments. For example, the RF signal generator 322 may produce a signal that oscillates in a range of about 10.0 megahertz (MHz) to about 100 MHz and/or from about 100 MHz to about 3.0 gigahertz (GHz). Some desirable frequencies may be, for example, 13.56 MHz (+/−5 percent), 27.125 MHz (+/−5 percent), 40.68 MHz (+/−5 percent), and 2.45 GHz (+/−5 percent). In one particular embodiment, for example, the RF signal generator 322 may produce a signal that oscillates in a range of about 40.66 MHz to about 40.70 MHz and at a power level in a range of about 10 decibel-milliwatts (dBm) to about 15 dBm. Alternatively, the frequency of oscillation and/or the power level may be lower or higher.

In the embodiment of FIG. 3, the power amplifier includes a driver amplifier stage 324 and a final amplifier stage 325. The power amplifier is configured to receive the oscillating signal from the RF signal generator 322, and to amplify the signal to produce a significantly higher-power signal at an output of the power amplifier. For example, the output signal may have a power level in a range of about 100 watts to about 400 watts or more. The gain applied by the power amplifier may be controlled using gate bias voltages and/or drain supply voltages provided by the power supply and bias circuitry 326 to each amplifier stage 324, 325. More specifically, power supply and bias circuitry 326 provides bias and supply voltages to each RF amplifier stage 324, 325 in accordance with control signals received from system controller 312.

In an embodiment, each amplifier stage 324, 325 is implemented as a power transistor, such as a field effect transistor (FET), having an input terminal (e.g., a gate or control terminal) and two current carrying terminals (e.g., source and drain terminals). Impedance matching circuits (not illustrated) may be coupled to the input (e.g., gate) of the driver amplifier stage 324, between the driver and final amplifier stages 325, and/or to the output (e.g., drain terminal) of the final amplifier stage 325, in various embodiments. In an embodiment, each transistor of the amplifier stages 324, 325 includes a laterally diffused metal oxide semiconductor FET (LDMOSFET) transistor. However, it should be noted that the transistors are not intended to be limited to any particular semiconductor technology, and in other embodiments, each transistor may be realized as a gallium nitride (GaN) transistor, another type of MOSFET transistor, a bipolar junction transistor (BJT), or a transistor utilizing another semiconductor technology.

In FIG. 3, the power amplifier arrangement is depicted to include two amplifier stages 324, 325 coupled in a particular manner to other circuit components. In other embodiments, the power amplifier arrangement may include other amplifier topologies and/or the amplifier arrangement may include only one amplifier stage (e.g., as shown in the embodiment of amplifier 724, FIG. 7), or more than two amplifier stages. For example, the power amplifier arrangement may include various embodiments of a single-ended amplifier, a Doherty amplifier, a Switch Mode Power Amplifier (SMPA), or another type of amplifier.

Defrosting cavity 360 and any load 364 (e.g., food, liquids, and so on) positioned in the defrosting cavity 360 present a cumulative load for the electromagnetic energy (or RF power) that is radiated into the cavity 360 by the first electrode 340. More specifically, the cavity 360 and the load 364 present an impedance to the system, referred to herein as a "cavity plus load impedance." The cavity plus load impedance changes during a defrosting operation as the temperature of the load 364 increases. The cavity plus load impedance has a direct effect on the magnitude of reflected signal power along the conductive transmission path 328 between the RF signal source 320 and electrodes 340. In most cases, it is desirable to maximize the magnitude of transferred signal power into the cavity 360, and/or to minimize the reflected-to-forward signal power ratio along the conductive transmission path 328.

In order to at least partially match the output impedance of the RF signal generator 320 to the cavity plus load impedance, a first matching circuit 334 is electrically coupled along the transmission path 328, in an embodiment. The first matching circuit 334 may have any of a variety of configurations. According to an embodiment, the first matching circuit 334 includes fixed components (i.e., components with non-variable component values), although the first matching circuit 334 may include one or more variable components, in other embodiments. For example, the first matching circuit 334 may include any one or more circuits selected from an inductance/capacitance (LC) network, a series inductance network, a shunt inductance network, or a combination of bandpass, high-pass and low-pass circuits, in various embodiments. Essentially, the fixed matching circuit 334 is configured to raise the impedance to an intermediate level between the output impedance of the RF signal generator 320 and the cavity plus load impedance.

According to an embodiment, power detection circuitry 330 is coupled along the transmission path 328 between the output of the RF signal source 320 and the electrode 340. In a specific embodiment, the power detection circuitry 330 forms a portion of the RF subsystem 310, and is coupled to the conductor 328-2 between the output of the first matching circuit 334 and the input to the variable impedance matching network 370, in an embodiment. In alternate embodiments, the power detection circuitry 330 may be coupled to the portion 328-1 of the transmission path 328 between the output of the RF signal source 320 and the input to the first matching circuit 334, or to the portion 328-3 of the transmission path 328 between the output of the variable impedance matching network 370 and the first electrode 340.

Wherever it is coupled, power detection circuitry 330 is configured to monitor, measure, or otherwise detect the power of the reflected signals traveling along the transmission path 328 between the RF signal source 320 and electrode 340 (i.e., reflected RF signals traveling in a direction from electrode 340 toward RF signal source 320). In some embodiments, power detection circuitry 330 also is configured to detect the power of the forward signals traveling along the transmission path 328 between the RF signal source 320 and the electrode 340 (i.e., forward RF signals traveling in a direction from RF signal source 320 toward electrode 340). Over connection 332, power detection circuitry 330 supplies signals to system controller 312 conveying the magnitudes of the reflected signal power (and the forward signal power, in some embodiments) to system controller 312. In embodiments in which both the forward and reflected signal power magnitudes are conveyed, system controller 312 may calculate a reflected-to-forward signal power ratio, or the S11 parameter. As will be described in more detail below, when the reflected signal power magnitude exceeds a reflected signal power threshold, or when the reflected-to-forward signal power ratio exceeds an S11 parameter threshold, this indicates that the system 300 is not adequately matched to the cavity plus load impedance, and that energy absorption by the load 364 within the cavity 360 may be sub-optimal. In such a situation, system controller 312 orchestrates a process of altering the configuration of the variable matching network 370 to drive the reflected signal power or the S11 parameter toward or below a desired level (e.g., below the reflected signal power threshold and/or the reflected-to-forward signal power ratio threshold), thus re-establishing an acceptable match and facilitating more optimal energy absorption by the load 364.

More specifically, the system controller 312 may provide control signals over control path 316 to the variable matching circuit 370, which cause the variable matching circuit 370 to vary inductive, capacitive, and/or resistive values of one or more components within the circuit, thus adjusting the impedance transformation provided by the circuit 370. Adjustment of the configuration of the variable matching circuit 370 desirably decreases the magnitude of reflected signal power, which corresponds to decreasing the magnitude of the S11 parameter and increasing the power absorbed by the load 364.

As discussed above, the variable impedance matching network 370 is used to match the input impedance of the defrosting cavity 360 plus load 364 to maximize, to the extent possible, the RF power transfer into the load 364. The initial impedance of the defrosting cavity 360 and the load 364 may not be known with accuracy at the beginning of a defrosting operation. Further, the impedance of the load 364 changes during a defrosting operation as the load 364 warms up. According to an embodiment, the system controller 312 may provide control signals to the variable impedance matching network 370, which cause modifications to the configuration of the variable impedance matching network 370. This enables the system controller 312 to establish an initial configuration of the variable impedance matching network 370 at the beginning of the defrosting operation that has a relatively low reflected to forward power ratio, and thus a relatively high absorption of the RF power by the load 364. In addition, this enables the system controller 312 to modify the configuration of the variable impedance matching network 370 so that an acceptable match may be maintained throughout the defrosting operation, despite changes in the impedance of the load 364.

Non-limiting examples of configurations for the variable matching network 370 are shown in FIGS. 4A, 4B, 5A, and 5B. For example, the network 370 may include any one or more circuits selected from an inductance/capacitance (LC) network, an inductance-only network, a capacitance-only network, or a combination of bandpass, high-pass and low-pass circuits, in various embodiments. In an embodiment, the variable matching network 370 includes a single-ended network (e.g., network 400, 440, FIG. 4A, 4B). The inductance, capacitance, and/or resistance values provided by the variable matching network 370, which in turn affect the impedance transformation provided by the network 370, are established using control signals from the system controller 312, as will be described in more detail later. In any event, by changing the configuration of the variable matching network 370 over the course of a defrosting operation to dynamically match the ever-changing impedance of the cavity 360 plus the load 364 within the cavity 360, the system efficiency may be maintained at a high level throughout the defrosting operation.

The variable matching network 370 may have any of a wide variety of circuit configurations, and non-limiting examples of such configurations are shown in FIGS. 4A, 4B, 5A, and 5B. According to an embodiment, as exemplified in FIGS. 4A and 5A, the variable impedance matching network 370 may include a single-ended network of passive components, and more specifically a network of fixed-value inductors (e.g., lumped inductive components) and variable inductors (or variable inductance networks). According to another embodiment, as exemplified in FIGS. 4B and 5B, the variable impedance matching network 370 may include a single-ended network of passive components, and more specifically a network of variable capacitors (or variable capacitance networks). As used herein, the term "inductor" means a discrete inductor or a set of inductive components that are electrically coupled together without intervening components of other types (e.g., resistors or capacitors). Similarly, the term "capacitor" means a discrete capacitor or a set of capacitive components that are electrically coupled together without intervening components of other types (e.g., resistors or inductors).

Figure 4A:
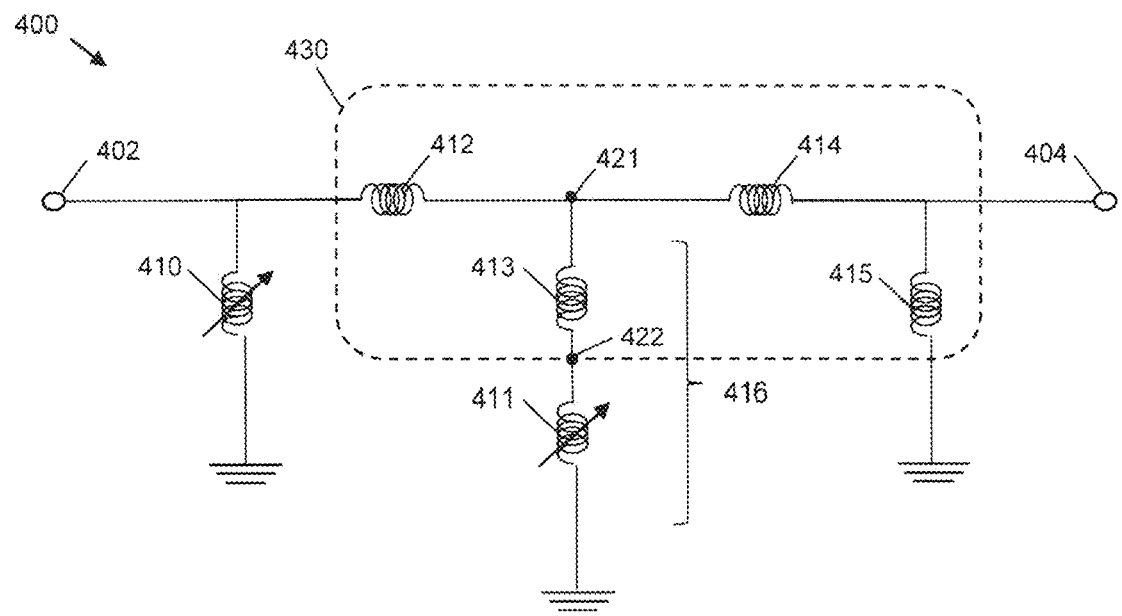
FIG. 4A is a schematic diagram of a single-ended variable inductance matching network, in accordance with an example embodiment.

Referring first to the variable-inductance impedance matching network embodiment, FIG. 4A is a schematic diagram of a single-ended variable impedance matching network 400 (e.g., variable impedance matching network 370, FIG. 3), in accordance with an example embodiment. As will be explained in more detail below, the variable impedance matching network 370 essentially has two portions: one portion to match the RF signal source (or the final stage power amplifier); and another portion to match the cavity plus load.

Variable impedance matching network 400 includes an input node 402, an output node 404, first and second variable inductance networks 410, 411, and a plurality of fixed-value inductors 412-415, according to an embodiment. When incorporated into a defrosting system (e.g., system 300, FIG. 3), the input node 402 is electrically coupled to an output of the RF signal source (e.g., RF signal source 320, FIG. 3), and the output node 404 is electrically coupled to an electrode (e.g., first electrode 340, FIG. 3) within the defrosting cavity (e.g., defrosting cavity 360, FIG. 3).

Between the input and output nodes 402, 404, the variable impedance matching network 400 includes first and second, series coupled lumped inductors 412, 414, in an embodiment. The first and second lumped inductors 412, 414 are relatively large in both size and inductance value, in an embodiment, as they may be designed for relatively low frequency (e.g., about 40.66 MHz to about 40.70 MHz) and high power (e.g., about 50 watts (W) to about 500 W) operation. For example, inductors 412, 414 may have values in a range of about 200 nanohenries (nH) to about 600 nH, although their values may be lower and/or higher, in other embodiments.

The first variable inductance network 410 is a first shunt inductive network that is coupled between the input node 402 and a ground reference terminal (e.g., the grounded containment structure 366, FIG. 3). According to an embodiment, the first variable inductance network 410 is configurable to match the impedance of the RF signal source (e.g., RF signal source 320, FIG. 3) as modified by the first matching circuit (e.g., circuit 334, FIG. 3), or more particularly to match the impedance of the final stage power amplifier (e.g., amplifier 325, FIG. 3) as modified by the first matching circuit 334 (e.g., circuit 334, FIG. 3). Accordingly, the first variable inductance network 410 may be referred to as the "RF signal source matching portion" of the variable impedance matching network 400. According to an embodiment, and as will be described in more detail in conjunction with FIG. 5, the first variable inductance network 410 includes a network of inductive components that may be selectively coupled together to provide inductances in a range of about 10 nH to about 400 nH, although the range may extend to lower or higher inductance values, as well.

In contrast, the "cavity matching portion" of the variable impedance matching network 400 is provided by a second shunt inductive network 416 that is coupled between a node 422 between the first and second lumped inductors 412, 414 and the ground reference terminal. According to an embodiment, the second shunt inductive network 416 includes a third lumped inductor 413 and a second variable inductance network 411 coupled in series, with an intermediate node 422 between the third lumped inductor 413 and the second variable inductance network 411. Because the configuration of the second variable inductance network 411 may be changed to provide multiple inductance values, the second shunt inductive network 416 is configurable to optimally match the impedance of the cavity plus load (e.g., cavity 360 plus load 364, FIG. 3). For example, inductor 413 may have a value in a range of about 400 nH to about 800 nH, although its value may be lower and/or higher, in other embodiments. According to an embodiment, and as will be described in more detail in conjunction with FIG. 5, the second variable inductance network 411 includes a network of inductive components that may be selectively coupled together to provide inductances in a range of about 50 nH to about 800 nH, although the range may extend to lower or higher inductance values, as well.

Finally, the variable impedance matching network 400 includes a fourth lumped inductor 415 coupled between the output node 404 and the ground reference terminal. For example, inductor 415 may have a value in a range of about 400 nH to about 800 nH, although its value may be lower and/or higher, in other embodiments.

As will be described in more detail in conjunction with FIG. 12A, the set 430 of lumped inductors 412-415 may form a portion of a module that is at least partially physically located within the cavity (e.g., cavity 360, FIG. 3), or at least within the confines of the containment structure (e.g., containment structure 366, FIG. 3). This enables the radiation produced by the lumped inductors 412-415 to be safely contained within the system, rather than being radiated out into the surrounding environment. In contrast, the variable inductance networks 410, 411 may or may not be contained within the cavity or the containment structure, in various embodiments.

According to an embodiment, the variable impedance matching network 400 embodiment of FIG. 4A includes "only inductors" to provide a match for the input impedance of the defrosting cavity 360 plus load 364. Thus, the network 400 may be considered an "inductor-only" matching network. As used herein, the phrases "only inductors" or "inductor-only" when describing the components of the variable impedance matching network means that the network does not include discrete resistors with significant resistance values or discrete capacitors with significant capacitance values. In some cases, conductive transmission lines between components of the matching network may have minimal resistances, and/or minimal parasitic capacitances may be present within the network. Such minimal resistances and/or minimal parasitic capacitances are not to be construed as converting embodiments of the "inductor-only" network into a matching network that also includes resistors and/or capacitors. Those of skill in the art would understand, however, that other embodiments of variable impedance matching networks may include differently configured inductor-only matching networks, and matching networks that include combinations of discrete inductors, discrete capacitors, and/or discrete resistors. As will be described in more detail in conjunction with FIG. 6, an "inductor-only" matching network alternatively may be defined as a matching network that enables impedance matching of a capacitive load using solely or primarily inductive components.

Figure 5A:
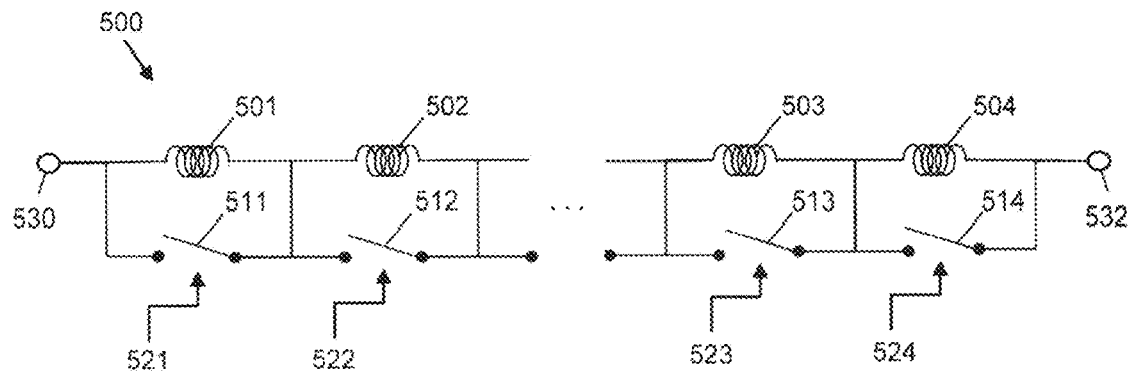
FIG. 5A is a schematic diagram of a single-ended variable inductance network, in accordance with an example embodiment.

FIG. 5A is a schematic diagram of a variable inductance network 500 that may be incorporated into a variable impedance matching network (e.g., as variable inductance networks 410 and/or 411, FIG. 4A), in accordance with an example embodiment. Network 500 includes an input node 530, an output node 532, and a plurality, N, of discrete inductors 501-504 coupled in series with each other between the input and output nodes 530, 532, where N may be an integer between 2 and 10, or more. In addition, network 500 includes a plurality, N, of bypass switches 511-514, where each switch 511-514 is coupled in parallel across the terminals of one of the inductors 501-504. Switches 511-514 may be implemented as transistors, mechanical relays or mechanical switches, for example. The electrically conductive state of each switch 511-514 (i.e., open or closed) is controlled through control signals 521-524 from the system controller (e.g., system controller 312, FIG. 3).

For each parallel inductor/switch combination, substantially all current flows through the inductor when its corresponding switch is in an open or non-conductive state, and substantially all current flows through the switch when the switch is in a closed or conductive state. For example, when all switches 511-514 are open, as illustrated in FIG. 5A, substantially all current flowing between input and output nodes 530, 532 flows through the series of inductors 501-504. This configuration represents the maximum inductance state of the network 500 (i.e., the configuration of network 500 in which a maximum inductance value is present between input and output nodes 530, 532). Conversely, when all switches 511-514 are closed, substantially all current flowing between input and output nodes 530, 532 bypasses the inductors 501-504 and flows instead through the switches 511-514 and the conductive interconnections between nodes 530, 532 and switches 511-514. This configuration represents the minimum inductance state of the network 500 (i.e., the configuration of network 500 in which a minimum inductance value is present between input and output nodes 530, 532). Ideally, the minimum inductance value would be near zero inductance. However, in practice a "trace" inductance is present in the minimum inductance state due to the cumulative inductances of the switches 511-514 and the conductive interconnections between nodes 530, 532 and the switches 511-514. For example, in the minimum inductance state, the trace inductance for the variable inductance network 500 may be in a range of about 10 nH to about 50 nH, although the trace inductance may be smaller or larger, as well. Larger, smaller, or substantially similar trace inductances also may be inherent in each of the other network configurations, as well, where the trace inductance for any given network configuration is a summation of the inductances of the sequence of conductors and switches through which the current primarily is carried through the network 500.

Starting from the maximum inductance state in which all switches 511-514 are open, the system controller may provide control signals 521-524 that result in the closure of any combination of switches 511-514 in order to reduce the inductance of the network 500 by bypassing corresponding combinations of inductors 501-504. In one embodiment, each inductor 501-504 has substantially the same inductance value, referred to herein as a normalized value of I. For example, each inductor 501-504 may have a value in a range of about 10 nH to about 200 nH, or some other value. In such an embodiment, the maximum inductance value for the network 500 (i.e., when all switches 511-514 are in an open state) would be about N×I, plus any trace inductance that may be present in the network 500 when it is in the maximum inductance configuration. When any n switches are in a closed state, the inductance value for the network 500 would be about (N−n)×J (plus trace inductance). In such an embodiment, the configuration of the network 500 may be configured to have any of N+1 values of inductance.

In an alternate embodiment, the inductors 501-504 may have different values from each other. For example, moving from the input node 530 toward the output node 532, the first inductor 501 may have a normalized inductance value of I, and each subsequent inductor 502-504 in the series may have a larger or smaller inductance value. For example, each subsequent inductor 502-504 may have an inductance value that is a multiple (e.g., about twice) the inductance value of the nearest downstream inductor 501-503, although the difference may not necessarily be an integer multiple. In such an embodiment, the configuration of the network 500 may be configured to have any of $2^N$ values of inductance. For example, when N=4 and each inductor 501-504 has a different value, the network 500 may be configured to have any of 16 values of inductance. For example, but not by way of limitation, assuming that inductor 501 has a value of I, inductor 502 has a value of 2×I, inductor 503 has a value of 4×I, and inductor 504 has a value of 8×I, Table 1, below indicates the total inductance value for all 16 possible configurations of the network 500 (not accounting for trace inductances):

TABLE 1

Total inductance values for all possible variable inductance network states

| Network state | Switch 511 state (501 value = I) | Switch 512 state (502 value = 2 × I) | Switch 513 state (503 value = 4 × I) | Switch 514 state (504 value = 8 × I) | Total network inductance (w/o trace inductance) |
|---|---|---|---|---|---|
| 0 | closed | closed | closed | closed | 0 |
| 1 | open | closed | closed | closed | I |
| 2 | closed | open | closed | closed | 2 × I |
| 3 | open | open | closed | closed | 3 × I |
| 4 | closed | closed | open | closed | 4 × I |
| 5 | open | closed | open | closed | 5 × I |
| 6 | closed | open | open | closed | 6 × I |
| 7 | open | open | open | closed | 7 × I |
| 8 | closed | closed | closed | open | 8 × I |
| 9 | open | closed | closed | open | 9 × I |
| 10 | closed | open | closed | open | 10 × I |
| 11 | open | open | closed | open | 11 × I |
| 12 | closed | closed | open | open | 12 × I |
| 13 | open | closed | open | open | 13 × I |
| 14 | closed | open | open | open | 14 × I |
| 15 | open | open | open | open | 15 × I |

Referring again to FIG. 4A, an embodiment of variable inductance network 410 may be implemented in the form of variable inductance network 500 with the above-described example characteristics (i.e., N=4 and each successive inductor is about twice the inductance of the preceding inductor). Assuming that the trace inductance in the minimum inductance state is about 10 nH, and the range of inductance values achievable by network 410 is about 10 nH (trace inductance) to about 400 nH, the values of inductors 501-504 may be, for example, about 30 nH, about 50 nH, about 100 nH, and about 200 nH, respectively. Similarly, if an embodiment of variable inductance network 411 is implemented in the same manner, and assuming that the trace inductance is about 50 nH and the range of inductance values achievable by network 411 is about 50 nH (trace inductance) to about 800 nH, the values of inductors 501-504 may be, for example, about 50 nH, about 100 nH, about 200 nH, and about 400 nH, respectively. Of course, more or fewer than four inductors 501-504 may be included in either variable inductance network 410, 411, and the inductors within each network 410, 411 may have different values.

Although the above example embodiment specifies that the number of switched inductances in the network 500 equals four, and that each inductor 501-504 has a value that is some multiple of a value of I, alternate embodiments of variable inductance networks may have more or fewer than four inductors, different relative values for the inductors, a different number of possible network configurations, and/or a different configuration of inductors (e.g., differently connected sets of parallel and/or series coupled inductors). Either way, by providing a variable inductance network in an impedance matching network of a defrosting system, the system may be better able to match the ever-changing cavity plus load impedance that is present during a defrosting operation.

Figure 4B:
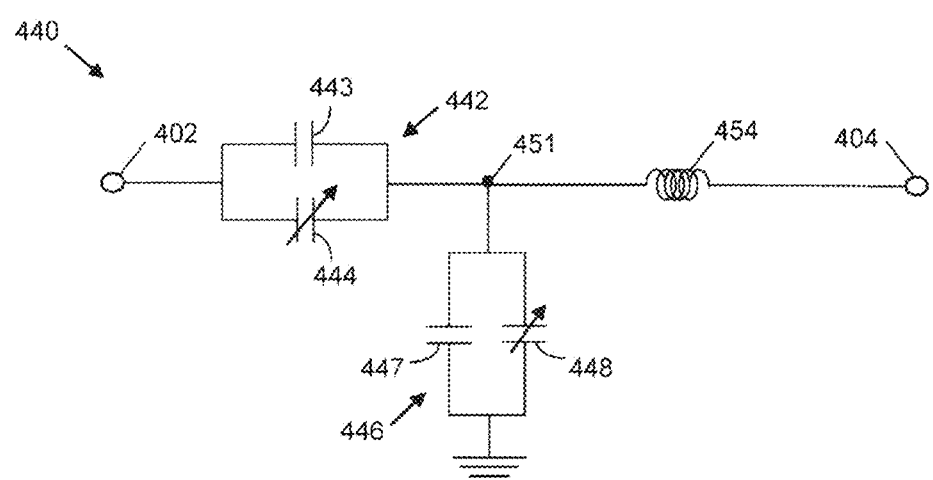
FIG. 4B is a schematic diagram of a single-ended variable capacitive matching network, in accordance with an example embodiment.

FIG. 4B is a schematic diagram of a single-ended variable capacitive matching network 440 (e.g., variable impedance matching network 370, FIG. 3), which may be implemented instead of the variable-inductance impedance matching network 400 (FIG. 4A), in accordance with an example embodiment. Variable impedance matching network 440 includes an input node 402, an output node 404, first and second variable capacitance networks 442, 446, and at least one inductor 454, according to an embodiment. When incorporated into a defrosting system (e.g., system 300, FIG. 3), the input node 402 is electrically coupled to an output of the RF signal source (e.g., RF signal source 320, FIG. 3), and the output node 404 is electrically coupled to an electrode (e.g., first electrode 340, FIG. 3) within the defrosting cavity (e.g., defrosting cavity 360, FIG. 3).

Between the input and output nodes 402, 404, the variable impedance matching network 440 includes a first variable capacitance network 442 coupled in series with an inductor 454, and a second variable capacitance network 446 coupled between an intermediate node 451 and a ground reference terminal (e.g., the grounded containment structure 366, FIG. 3), in an embodiment. The inductor 454 may be designed for relatively low frequency (e.g., about 40.66 MHz to about 40.70 MHz) and high power (e.g., about 50 W to about 500 W) operation, in an embodiment. For example, inductor 454 may have a value in a range of about 200 nH to about 600 nH, although its value may be lower and/or higher, in other embodiments. According to an embodiment, inductor 454 is a fixed-value, lumped inductor (e.g., a coil). In other embodiments, the inductance value of inductor 454 may be variable.

The first variable capacitance network 442 is coupled between the input node 402 and the intermediate node 451, and the first variable capacitance network 442 may be referred to as a "series matching portion" of the variable impedance matching network 440. According to an embodiment, the first variable capacitance network 442 includes a first fixed-value capacitor 443 coupled in parallel with a first variable capacitor 444. The first fixed-value capacitor 443 may have a capacitance value in a range of about 1 picofarad (pF) to about 100 pF, in an embodiment. As will be described in more detail in conjunction with FIG. 5B, the first variable capacitor 444 may include a network of capacitive components that may be selectively coupled together to provide capacitances in a range of 0 pF to about 100 pF. Accordingly, the total capacitance value provided by the first variable capacitance network 442 may be in a range of about 1 pF to about 200 pF, although the range may extend to lower or higher capacitance values, as well.

A "shunt matching portion" of the variable impedance matching network 440 is provided by the second variable capacitance network 446, which is coupled between node 451 (located between the first variable capacitance network 442 and lumped inductor 454) and the ground reference terminal. According to an embodiment, the second variable capacitance network 446 includes a second fixed-value capacitor 447 coupled in parallel with a second variable capacitor 448. The second fixed-value capacitor 447 may have a capacitance value in a range of about 1 pF to about 100 pF, in an embodiment. As will be described in more detail in conjunction with FIG. 5B, the second variable capacitor 448 may include a network of capacitive components that may be selectively coupled together to provide capacitances in a range of 0 pF to about 100 pF. Accordingly, the total capacitance value provided by the second variable capacitance network 446 may be in a range of about 1 pF to about 200 pF, although the range may extend to lower or higher capacitance values, as well. The configurations of the first and second variable capacitance networks 442, 446 may be changed to provide multiple capacitance values, and thus may be configurable to optimally match the impedance of the cavity plus load (e.g., cavity 360 plus load 364, FIG. 3) to the RF signal source (e.g., RF signal source 320, FIG. 3).

Figure 5B:
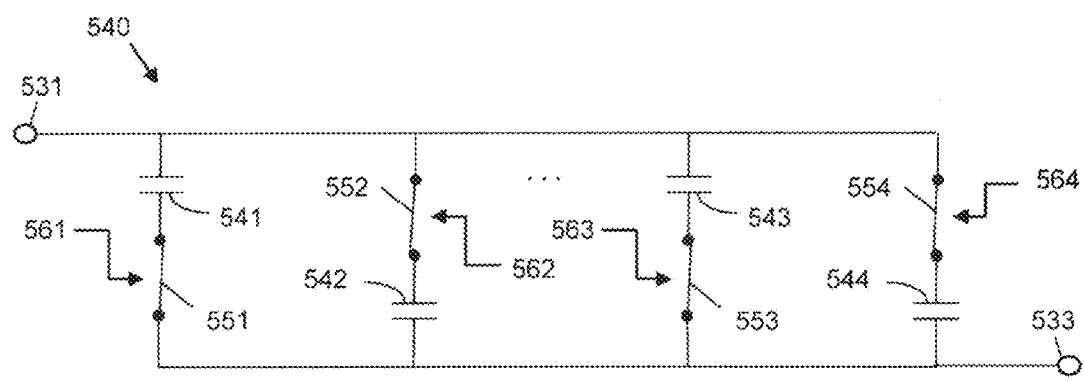
FIG. 5B is a schematic diagram of a single-ended variable capacitive network, in accordance with an example embodiment.

FIG. 5B is a schematic diagram of a single-ended variable capacitive network 540 that may be incorporated into a variable impedance matching network (e.g., for each instance of variable capacitors 444, 448, FIG. 4B), in accordance with an example embodiment. Network 540 includes an input node 531, an output node 533, and a plurality, N, of discrete capacitors 541-544 coupled in parallel with each other between the input and output nodes 531, 533, where N may be an integer between 2 and 10, or more. In addition, network 540 includes a plurality, N, of bypass switches 551-554, where each switch 551-554 is coupled in series with one of the terminals of one of the capacitors 541-544. Switches 551-554 may be implemented as transistors, mechanical relays or mechanical switches, for example. The electrically conductive state of each switch 551-554 (i.e., open or closed) is controlled through control signals 561-564 from the system controller (e.g., system controller 312, FIG. 3). In the embodiment illustrated in FIG. 5B, in each parallel-coupled branch, a single switch is connected to one of the terminals of each capacitor, and the terminal to which the switch is coupled alternates between a bottom terminal (e.g., for capacitors 541 and 543) and a top terminal (e.g., for capacitors 542 and 544) across the series of parallel-coupled capacitors 541-544. In alternate embodiments, the terminal to which the switch is coupled may be the same across the network (e.g., each switch is coupled to a top terminal or to a bottom terminal in each parallel-coupled branch, but not both), or two switches may be coupled to both the top and bottom terminals of each capacitor in each parallel-coupled branch. In the latter embodiment, the two switches coupled to each capacitor may be controlled to open and close in a synchronized manner.

In the illustrated embodiment, for each series capacitor/switch combination in each parallel-coupled branch, substantially all current flows through the capacitor when its corresponding switch is in a closed or conductive state, and substantially zero current flows through the capacitor when the switch is in an open or non-conductive state. For example, when all switches 551-554 are closed, as illustrated in FIG. 5B, substantially all current flowing between input and output nodes 531, 533 flows through the parallel combination of capacitors 541-544. This configuration represents the maximum capacitance configuration of the network 540 (i.e., the configuration of network 540 in which a maximum capacitance value is present between input and output nodes 531, 533). Conversely, when all switches 551-554 are open, substantially zero current flows between input and output nodes 531, 533. This configuration represents the minimum capacitance configuration of the network 540 (i.e., the configuration of network 540 in which a minimum capacitance value is present between input and output nodes 531, 533).

Starting from the maximum capacitance configuration in which all switches 551-554 are closed, the system controller may provide control signals 561-564 that result in the opening of any combination of switches 551-554 in order to reduce the capacitance of the network 540 by switching out corresponding combinations of capacitors 541-544. In one embodiment, each capacitor 541-544 has substantially the same capacitance value, referred to herein as a normalized value of J. For example, each capacitor 541-544 may have a value in a range of about 1 pF to about 25 pF, or some other value. In such an embodiment, the maximum capacitance value for the network 540 (i.e., when all switches 551-554 are in a closed state) would be about N×J. When any n switches are in an open state, the capacitance value for the network 540 would be about (N−n)×J. In such an embodiment, the configuration of the network 540 may be configured to have any of N+1 values of capacitance.

In an alternate embodiment, the capacitors 541-544 may have different values from each other. For example, moving from the input node 531 toward the output node 533, the first capacitor 541 may have a normalized capacitance value of J, and each subsequent capacitor 542-544 in the series may have a larger or smaller capacitance value. For example, each subsequent capacitor 542-544 may have a capacitance value that is a multiple (e.g., about twice) the capacitance value of the nearest downstream capacitor 541-543, although the difference may not necessarily be an integer multiple. In such an embodiment, the configuration of the network 540 may be configured to have any of $2^N$ values of capacitance. For example, when N=4 and each capacitor 541-544 has a different value, the network 540 may be configured to have any of 16 values of capacitance. For example, but not by way of limitation, assuming that capacitor 541 has a value of J, capacitor 542 has a value of 2×J, capacitor 543 has a value of 4×J, and capacitor 544 has a value of 8×J, the total capacitance value for all 16 possible configurations of the network 540 may be represented by a table similar to Table 1, above (except switching the value of I for J, and reversing the "open" and "closed" designations).

Figure 6:
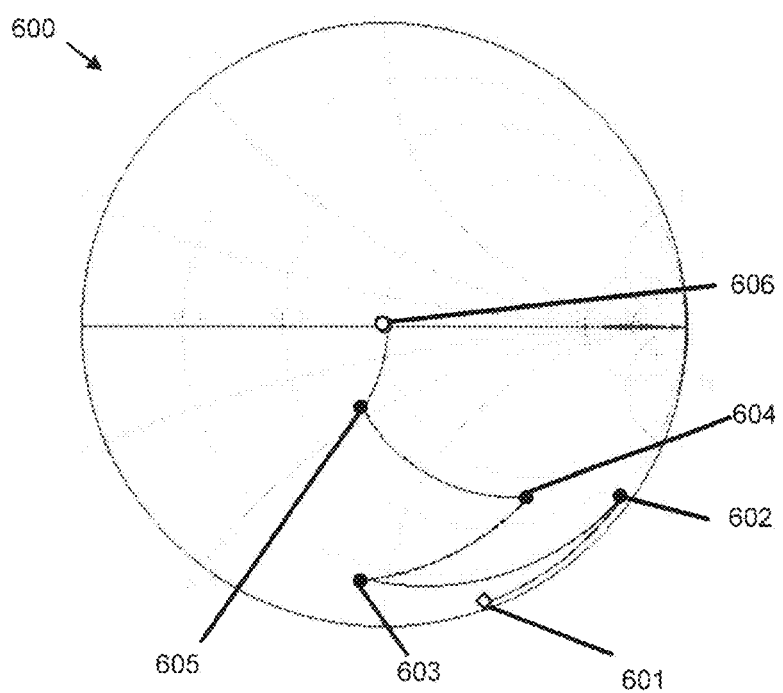
FIG. 6 is an example of a Smith chart depicting how a plurality of variable passive devices in embodiments of a variable impedance matching network may match the cavity plus load impedance to a radio frequency (RF) signal source.

FIG. 6 is an example of a Smith chart 600 depicting how the plurality of inductances in an embodiment of a variable impedance matching network (e.g., network 370, 400, FIGS. 3, 4A) may match the cavity plus load impedance to the RF signal source. Although not illustrated, a plurality of capacitances in an embodiment of a variable impedance matching network (e.g., network 370, 440, FIGS. 3, 4B) may similarly match the cavity plus load impedance to the RF signal source. The example Smith chart 600 assumes that the system is a 50 Ohm system, and that the output of the RF signal source is 50 Ohms. Those of skill in the art would understand, based on the description herein, how the Smith chart could be modified for a system and/or RF signal source with different characteristic impedances.

In Smith chart 600, point 601 corresponds to the point at which the load (e.g., the cavity 360 plus load 364, FIG. 3) would locate (e.g., at the beginning of a defrosting operation) absent the matching provided by the variable impedance matching network (e.g., network 370, 400, FIGS. 3, 4A). As indicated by the position of the load point 601 in the lower right quadrant of the Smith chart 600, the load is a capacitive load. According to an embodiment, the shunt and series inductances of the variable impedance matching network sequentially move the substantially-capacitive load impedance toward an optimal matching point 606 (e.g., 50 Ohms) at which RF electromagnetic energy transfer to the load may occur with minimal losses. More specifically, and referring also to FIG. 4A, shunt inductance 415 moves the impedance to point 602, series inductance 414 moves the impedance to point 603, shunt inductance 416 moves the impedance to point 604, series inductance 412 moves the impedance to point 605, and shunt inductance 410 moves the impedance to the optimal matching point 606.

It should be noted that the combination of impedance transformations provided by embodiments of the variable impedance matching network keep the impedance at any point within or very close to the lower right quadrant of the Smith chart 600. As this quadrant of the Smith chart 600 is characterized by relatively high impedances and relatively low currents, the impedance transformation is achieved without exposing components of the circuit to relatively high and potentially damaging currents. Accordingly, an alternate definition of an "inductor-only" matching network, as used herein, may be a matching network that enables impedance matching of a capacitive load using solely or primarily inductive components, where the impedance matching network performs the transformation substantially within the lower right quadrant of the Smith chart.

As discussed previously, the impedance of the load changes during the defrosting operation. Accordingly, point 601 correspondingly moves during the defrosting operation. Movement of load point 601 is compensated for, according to the previously-described embodiments, by varying the impedance of the first and second shunt inductances 410, 411 so that the final match provided by the variable impedance matching network still may arrive at or near the optimal matching point 606. Although a specific variable impedance matching network has been illustrated and described herein, those of skill in the art would understand, based on the description herein, that differently-configured variable impedance matching networks may achieve the same or similar results to those conveyed by Smith chart 600. For example, alternative embodiments of a variable impedance matching network may have more or fewer shunt and/or series inductances, and or different ones of the inductances may be configured as variable inductance networks (e.g., including one or more of the series inductances). Accordingly, although a particular variable inductance matching network has been illustrated and described herein, the inventive subject matter is not limited to the illustrated and described embodiment.

The description associated with FIGS. 3-6 discuss, in detail, an "unbalanced" defrosting apparatus, in which an RF signal is applied to one electrode (e.g., electrode 340, FIG. 3), and the other "electrode" (e.g., the containment structure 366, FIG. 3) is grounded. As mentioned above, an alternate embodiment of a defrosting apparatus comprises a "balanced" defrosting apparatus. In such an apparatus, balanced RF signals are provided to both electrodes.

For example, FIG. 7 is a simplified block diagram of a balanced defrosting system 700 (e.g., defrosting system 100, 210, 220, FIGS. 1, 2), in accordance with an example embodiment. Defrosting system 700 includes RF subsystem 710, defrosting cavity 760, user interface 780, system controller 712, RF signal source 720, power supply and bias circuitry 726, variable impedance matching network 770, two electrodes 740, 750, and power detection circuitry 730, in an embodiment. In addition, in other embodiments, defrosting system 700 may include temperature sensor(s), and/or infrared (IR) sensor(s) 790, although some or all of these sensor components may be excluded. It should be understood that FIG. 7 is a simplified representation of a defrosting system 700 for purposes of explanation and ease of description, and that practical embodiments may include other devices and components to provide additional functions and features, and/or the defrosting system 700 may be part of a larger electrical system.

User interface 780 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

The RF subsystem 710 includes a system controller 712, an RF signal source 720, a first impedance matching circuit 734 (herein "first matching circuit"), power supply and bias circuitry 726, and power detection circuitry 730, in an embodiment. System controller 712 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, system controller 712 is operatively and communicatively coupled to user interface 780, RF signal source 720, power supply and bias circuitry 726, power detection circuitry 730 (or 730' or 730"), variable matching subsystem 770, and sensor(s) 790 (if included). System controller 712 is configured to receive signals indicating user inputs received via user interface 780, to receive signals indicating RF signal reflected power (and possibly RF signal forward power) from power detection circuitry 730 (or 730' or 730"), and to receive sensor signals from sensor(s) 790. Responsive to the received signals and measurements, and as will be described in more detail later, system controller 712 provides control signals to the power supply and bias circuitry 726 and/or to the RF signal generator 722 of the RF signal source 720. In addition, system controller 712 provides control signals to the variable matching subsystem 770 (over path 716), which cause the subsystem 770 to change the state or configuration of a variable impedance matching circuit 772 of the subsystem 770 (herein "variable matching circuit").

Defrosting cavity 760 includes a capacitive defrosting arrangement with first and second parallel plate electrodes 740, 750 that are separated by an air cavity within which a load 764 to be defrosted may be placed. Within a containment structure 766, first and second electrodes 740, 750 (e.g., electrodes 140, 150, FIG. 2A) are positioned in a fixed physical relationship with respect to each other on either side of an interior defrosting cavity 760 (e.g., interior cavity 260, FIG. 2B). According to an embodiment, a distance 752 between the electrodes 740, 750 renders the cavity 760 a sub-resonant cavity, in an embodiment.

The first and second electrodes 740, 750 are separated across the cavity 760 by a distance 752. In various embodiments, the distance 752 is in a range of about 0.10 meters to about 1.0 meter, although the distance may be smaller or larger, as well. According to an embodiment, distance 752 is less than one wavelength of the RF signal produced by the RF subsystem 710. In other words, as mentioned above, the cavity 760 is a sub-resonant cavity. In some embodiments, the distance 752 is less than about half of one wavelength of the RF signal. In other embodiments, the distance 752 is less than about one quarter of one wavelength of the RF signal. In still other embodiments, the distance 752 is less than about one eighth of one wavelength of the RF signal. In still other embodiments, the distance 752 is less than about one 50th of one wavelength of the RF signal. In still other embodiments, the distance 752 is less than about one 100th of one wavelength of the RF signal.

In general, a system 700 designed for lower operational frequencies (e.g., frequencies between 10 MHz and 100 MHz) may be designed to have a distance 752 that is a smaller fraction of one wavelength. For example, when system 700 is designed to produce an RF signal with an operational frequency of about 10 MHz (corresponding to a wavelength of about 30 meters), and distance 752 is selected to be about 0.5 meters, the distance 752 is about one 60th of one wavelength of the RF signal. Conversely, when system 700 is designed for an operational frequency of about 300 MHz (corresponding to a wavelength of about 1 meter), and distance 752 is selected to be about 0.5 meters, the distance 752 is about one half of one wavelength of the RF signal.

With the operational frequency and the distance 752 between electrodes 740, 750 being selected to define a sub-resonant interior cavity 760, the first and second electrodes 740, 750 are capacitively coupled. More specifically, the first electrode 740 may be analogized to a first plate of a capacitor, the second electrode 750 may be analogized to a second plate of a capacitor, and the load 764, barrier 762, and air within the cavity 760 may be analogized to a capacitor dielectric. Accordingly, the first electrode 740 alternatively may be referred to herein as an "anode," and the second electrode 750 may alternatively be referred to herein as a "cathode."

Essentially, the voltage across the first and second electrodes 740, 750 heats the load 764 within the cavity 760. According to various embodiments, the RF subsystem 710 is configured to generate the RF signal to produce voltages across the electrodes 740, 750 in a range of about 70 volts to about 3000 volts, in one embodiment, or in a range of about 3000 volts to about 10,000 volts, in another embodiment, although the system may be configured to produce lower or higher voltages across electrodes 740, 750, as well.

An output of the RF subsystem 710, and more particularly an output of RF signal source 720, is electrically coupled to the variable matching subsystem 770 through a conductive transmission path, which includes a plurality of conductors 728-1, 728-2, 728-3, 728-4, and 728-5 connected in series, and referred to collectively as transmission path 728. According to an embodiment, the conductive transmission path 728 includes an "unbalanced" portion and a "balanced" portion, where the "unbalanced" portion is configured to carry an unbalanced RF signal (i.e., a single RF signal referenced against ground), and the "balanced" portion is configured to carry a balanced RF signal (i.e., two signals referenced against each other). The "unbalanced" portion of the transmission path 728 may include unbalanced first and second conductors 728-1, 728-2 within the RF subsystem 710, one or more connectors 736, 738 (each having male and female connector portions), and an unbalanced third conductor 728-3 electrically coupled between the connectors 736, 738. According to an embodiment, the third conductor 728-3 comprises a coaxial cable, although the electrical length may be shorter or longer, as well. In an alternate embodiment, the variable matching subsystem 770 may be housed with the RF subsystem 710, and in such an embodiment, the conductive transmission path 728 may exclude the connectors 736, 738 and the third conductor 728-3. Either way, the "balanced" portion of the conductive transmission path 728 includes a balanced fourth conductor 728-4 within the variable matching subsystem 770, and a balanced fifth conductor 728-5 electrically coupled between the variable matching subsystem 770 and electrodes 740, 750, in an embodiment.

As indicated in FIG. 7, the variable matching subsystem 770 houses an apparatus configured to receive, at an input of the apparatus, the unbalanced RF signal from the RF signal source 720 over the unbalanced portion of the transmission path (i.e., the portion that includes unbalanced conductors 728-1, 728-2, and 728-3), to convert the unbalanced RF signal into two balanced RF signals (e.g., two RF signals having a phase difference between 120 and 240 degrees, such as about 180 degrees), and to produce the two balanced RF signals at two outputs of the apparatus. For example, the conversion apparatus may be a balun 774, in an embodiment. The balanced RF signals are conveyed over balanced conductors 728-4 to the variable matching circuit 772 and, ultimately, over balanced conductors 728-5 to the electrodes 740, 750.

In an alternate embodiment, as indicated in a dashed box in the center of FIG. 7, and as will be discussed in more detail below, an alternate RF signal generator 720' may produce balanced RF signals on balanced conductors 728-1', which may be directly coupled to the variable matching circuit 772 (or coupled through various intermediate conductors and connectors). In such an embodiment, the balun 774 may be excluded from the system 700. Either way, as will be described in more detail below, a double-ended variable matching circuit 772 (e.g., variable matching circuit 800, 900, 1000, FIGS. 8-10) is configured to receive the balanced RF signals (e.g., over connections 728-4 or 728-1'), to perform an impedance transformation corresponding to a then-current configuration of the double-ended variable matching circuit 772, and to provide the balanced RF signals to the first and second electrodes 740, 750 over connections 728-5.

According to an embodiment, RF signal source 720 includes an RF signal generator 722 and a power amplifier 724 (e.g., including one or more power amplifier stages). In response to control signals provided by system controller 712 over connection 714, RF signal generator 722 is configured to produce an oscillating electrical signal having a frequency in an ISM (industrial, scientific, and medical) band, although the system could be modified to support operations in other frequency bands, as well. The RF signal generator 722 may be controlled to produce oscillating signals of different power levels and/or different frequencies, in various embodiments. For example, the RF signal generator 722 may produce a signal that oscillates in a range of about 10.0 MHz to about 100 MHz and/or from about 100 MHz to about 3.0 GHz. Some desirable frequencies may be, for example, 13.56 MHz (+/−5 percent), 27.125 MHz (+/−5 percent), 40.68 MHz (+/−5 percent), and 2.45 GHz (+/−5 percent). Alternatively, the frequency of oscillation may be lower or higher than the above-given ranges or values.

The power amplifier 724 is configured to receive the oscillating signal from the RF signal generator 722, and to amplify the signal to produce a significantly higher-power signal at an output of the power amplifier 724. For example, the output signal may have a power level in a range of about 100 watts to about 400 watts or more, although the power level may be lower or higher, as well. The gain applied by the power amplifier 724 may be controlled using gate bias voltages and/or drain bias voltages provided by the power supply and bias circuitry 726 to one or more stages of amplifier 724. More specifically, power supply and bias circuitry 726 provides bias and supply voltages to the inputs and/or outputs (e.g., gates and/or drains) of each RF amplifier stage in accordance with control signals received from system controller 712.

The power amplifier may include one or more amplification stages. In an embodiment, each stage of amplifier 724 is implemented as a power transistor, such as a FET, having an input terminal (e.g., a gate or control terminal) and two current carrying terminals (e.g., source and drain terminals). Impedance matching circuits (not illustrated) may be coupled to the input (e.g., gate) and/or output (e.g., drain terminal) of some or all of the amplifier stages, in various embodiments. In an embodiment, each transistor of the amplifier stages includes an LDMOS FET. However, it should be noted that the transistors are not intended to be limited to any particular semiconductor technology, and in other embodiments, each transistor may be realized as a GaN transistor, another type of MOS FET transistor, a BJT, or a transistor utilizing another semiconductor technology.

In FIG. 7, the power amplifier arrangement 724 is depicted to include one amplifier stage coupled in a particular manner to other circuit components. In other embodiments, the power amplifier arrangement 724 may include other amplifier topologies and/or the amplifier arrangement may include two or more amplifier stages (e.g., as shown in the embodiment of amplifier 324/325, FIG. 3). For example, the power amplifier arrangement may include various embodiments of a single-ended amplifier, a double-ended (balanced) amplifier, a push-pull amplifier, a Doherty amplifier, a Switch Mode Power Amplifier (SMPA), or another type of amplifier.

For example, as indicated in the dashed box in the center of FIG. 7, an alternate RF signal generator 720' may include a push-pull or balanced amplifier 724', which is configured to receive, at an input, an unbalanced RF signal from the RF signal generator 722, to amplify the unbalanced RF signal, and to produce two balanced RF signals at two outputs of the amplifier 724', where the two balanced RF signals are thereafter conveyed over conductors 728-1' to the electrodes 740, 750. In such an embodiment, the balun 774 may be excluded from the system 700, and the conductors 728-1' may be directly connected to the variable matching circuit 772 (or connected through multiple coaxial cables and connectors or other multi-conductor structures).

Defrosting cavity 760 and any load 764 (e.g., food, liquids, and so on) positioned in the defrosting cavity 760 present a cumulative load for the electromagnetic energy (or RF power) that is radiated into the interior chamber 762 by the electrodes 740, 750. More specifically, and as described previously, the defrosting cavity 760 and the load 764 present an impedance to the system, referred to herein as a "cavity plus load impedance." The cavity plus load impedance changes during a defrosting operation as the temperature of the load 764 increases. The cavity plus load impedance has a direct effect on the magnitude of reflected signal power along the conductive transmission path 728 between the RF signal source 720 and the electrodes 740, 750. In most cases, it is desirable to maximize the magnitude of transferred signal power into the cavity 760, and/or to minimize the reflected-to-forward signal power ratio along the conductive transmission path 728.

In order to at least partially match the output impedance of the RF signal generator 720 to the cavity plus load impedance, a first matching circuit 734 is electrically coupled along the transmission path 728, in an embodiment. The first matching circuit 734 is configured to perform an impedance transformation from an impedance of the RF signal source 720 (e.g., less than about 10 ohms) to an intermediate impedance (e.g., 50 ohms, 75 ohms, or some other value). The first matching circuit 734 may have any of a variety of configurations. According to an embodiment, the first matching circuit 734 includes fixed components (i.e., components with non-variable component values), although the first matching circuit 734 may include one or more variable components, in other embodiments. For example, the first matching circuit 734 may include any one or more circuits selected from an inductance/capacitance (LC) network, a series inductance network, a shunt inductance network, or a combination of bandpass, high-pass and low-pass circuits, in various embodiments. Essentially, the first matching circuit 734 is configured to raise the impedance to an intermediate level between the output impedance of the RF signal generator 720 and the cavity plus load impedance.

According to an embodiment, and as mentioned above, power detection circuitry 730 is coupled along the transmission path 728 between the output of the RF signal source 720 and the electrodes 740, 750. In a specific embodiment, the power detection circuitry 730 forms a portion of the RF subsystem 710, and is coupled to the conductor 728-2 between the RF signal source 720 and connector 736. In alternate embodiments, the power detection circuitry 730 may be coupled to any other portion of the transmission path 728, such as to conductor 728-1, to conductor 728-3, to conductor 728-4 between the RF signal source 720 (or balun 774) and the variable matching circuit 772 (i.e., as indicated with power detection circuitry 730'), or to conductor 728-5 between the variable matching circuit 772 and the electrode(s) 740, 750 (i.e., as indicated with power detection circuitry 730"). For purposes of brevity, the power detection circuitry is referred to herein with reference number 730, although the circuitry may be positioned in other locations, as indicated by reference numbers 730' and 730".

Wherever it is coupled, power detection circuitry 730 is configured to monitor, measure, or otherwise detect the power of the reflected signals traveling along the transmission path 728 between the RF signal source 720 and one or both of the electrode(s) 740, 750 (i.e., reflected RF signals traveling in a direction from electrode(s) 740, 750 toward RF signal source 720). In some embodiments, power detection circuitry 730 also is configured to detect the power of the forward signals traveling along the transmission path 728 between the RF signal source 720 and the electrode(s) 740, 750 (i.e., forward RF signals traveling in a direction from RF signal source 720 toward electrode(s) 740, 750).

Over connection 732, power detection circuitry 730 supplies signals to system controller 712 conveying the measured magnitudes of the reflected signal power, and in some embodiments, also the measured magnitude of the forward signal power. In embodiments in which both the forward and reflected signal power magnitudes are conveyed, system controller 712 may calculate a reflected-to-forward signal power ratio, or the S11 parameter. As will be described in more detail below, when the reflected signal power magnitude exceeds a reflected signal power threshold, or when the reflected-to-forward signal power ratio exceeds an S11 parameter threshold, this indicates that the system 700 is not adequately matched to the cavity plus load impedance, and that energy absorption by the load 764 within the cavity 760 may be sub-optimal. In such a situation, system controller 712 orchestrates a process of altering the configuration of the variable matching circuit 772 to drive the reflected signal power or the S11 parameter toward or below a desired level (e.g., below the reflected signal power threshold and/or the reflected-to-forward signal power ratio threshold), thus re-establishing an acceptable match and facilitating more optimal energy absorption by the load 764.

More specifically, the system controller 712 may provide control signals over control path 716 to the variable matching circuit 772, which cause the variable matching circuit 772 to vary inductive, capacitive, and/or resistive values of one or more components within the circuit, thus adjusting the impedance transformation provided by the circuit 772. Adjustment of the configuration of the variable matching circuit 772 desirably decreases the magnitude of reflected signal power, which corresponds to decreasing the magnitude of the S11 parameter and increasing the power absorbed by the load 764.

As discussed above, the variable matching circuit 772 is used to match the input impedance of the defrosting cavity 760 plus load 764 to maximize, to the extent possible, the RF power transfer into the load 764. The initial impedance of the defrosting cavity 760 and the load 764 may not be known with accuracy at the beginning of a defrosting operation. Further, the impedance of the load 764 changes during a defrosting operation as the load 764 warms up. According to an embodiment, the system controller 712 may provide control signals to the variable matching circuit 772, which cause modifications to the configuration of the variable matching circuit 772. This enables the system controller 712 to establish an initial configuration of the variable matching circuit 772 at the beginning of the defrosting operation that has a relatively low reflected to forward power ratio, and thus a relatively high absorption of the RF power by the load 764. In addition, this enables the system controller 712 to modify the configuration of the variable matching circuit 772 so that an acceptable match may be maintained throughout the defrosting operation, despite changes in the impedance of the load 764.

The variable matching circuit 772 may have any of a variety of configurations. For example, the circuit 772 may include any one or more circuits selected from an inductance/capacitance (LC) network, an inductance-only network, a capacitance-only network, or a combination of bandpass, high-pass and low-pass circuits, in various embodiments. In an embodiment in which the variable matching circuit 772 is implemented in a balanced portion of the transmission path 728, the variable matching circuit 772 is a double-ended circuit with two inputs and two outputs. In an alternate embodiment in which the variable matching circuit is implemented in an unbalanced portion of the transmission path 728, the variable matching circuit may be a single-ended circuit with a single input and a single output (e.g., similar to matching circuit 400 or 440, FIGS. 4A, 4B). According to a more specific embodiment, the variable matching circuit 772 includes a variable inductance network (e.g., double-ended network 800, 900, FIGS. 8, 9). According to another more specific embodiment, the variable matching circuit 772 includes a variable capacitance network (e.g., double-ended network 1000, FIG. 10). In still other embodiments, the variable matching circuit 772 may include both variable inductance and variable capacitance elements. The inductance, capacitance, and/or resistance values provided by the variable matching circuit 772, which in turn affect the impedance transformation provided by the circuit 772, are established through control signals from the system controller 712, as will be described in more detail later. In any event, by changing the configuration of the variable matching circuit 772 over the course of a treatment operation to dynamically match the ever-changing impedance of the cavity 760 plus the load 764 within the cavity 760, the system efficiency may be maintained at a high level throughout the defrosting operation.

Figure 8:
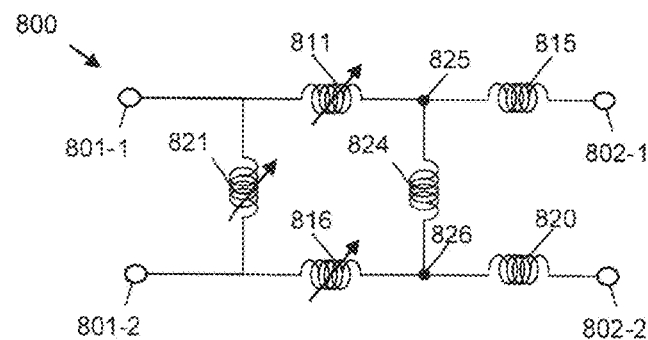
FIG. 8 is a schematic diagram of a double-ended variable impedance matching network with variable inductances, in accordance with another example embodiment.
Figure 9:
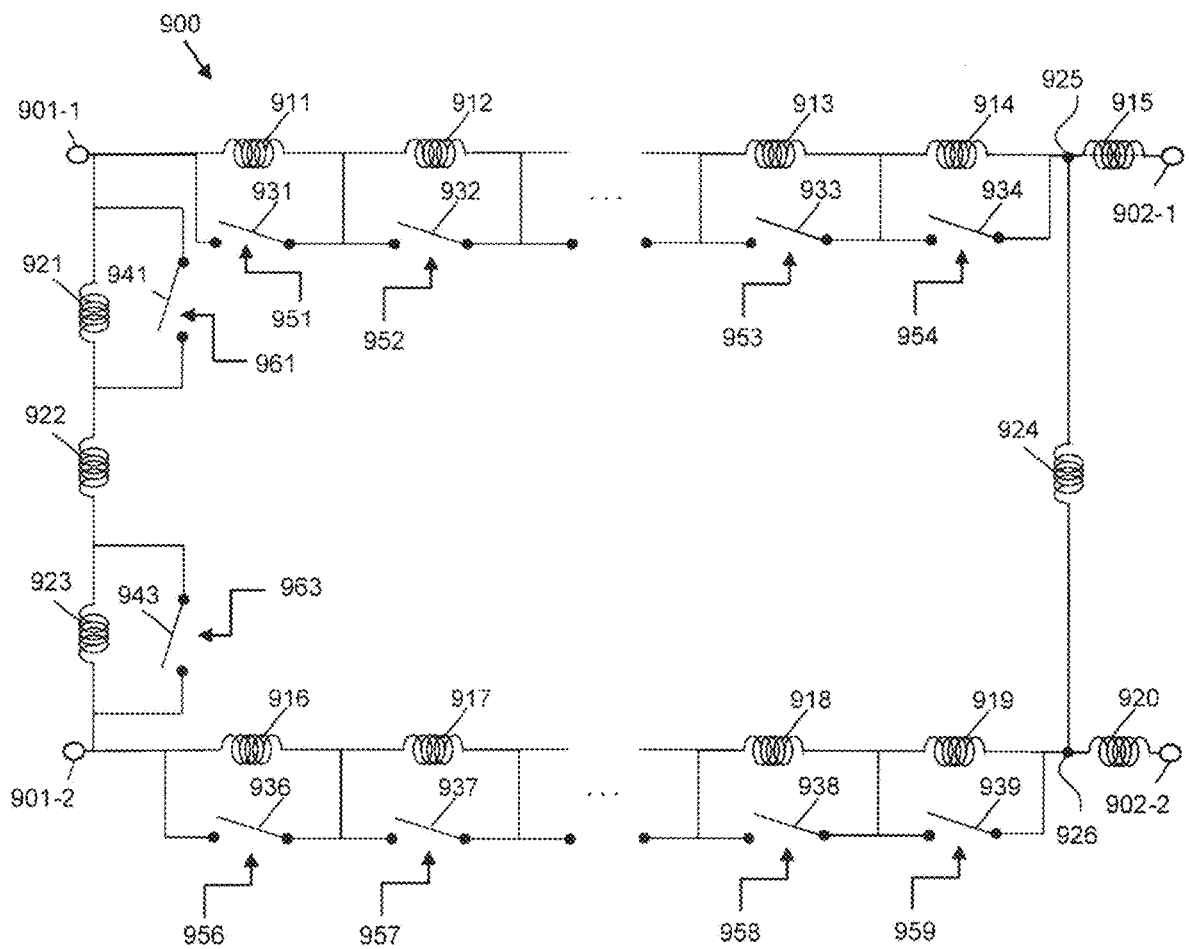
FIG. 9 is a schematic diagram of a double-ended variable impedance network with variable inductances, in accordance with another example embodiment.
Figure 10:
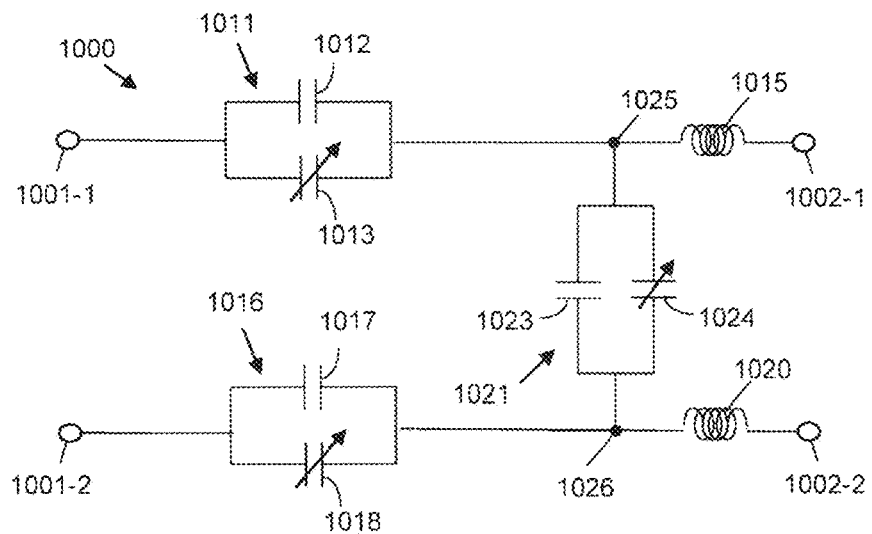
FIG. 10 is a schematic diagram of a double-ended variable impedance network with variable capacitances, in accordance with another example embodiment.

The variable matching circuit 772 may have any of a wide variety of circuit configurations, and non-limiting examples of such configurations are shown in FIGS. 8-10. For example, FIG. 8 is a schematic diagram of a double-ended variable impedance matching circuit 800 that may be incorporated into a defrosting system (e.g., system 100, 200, 700, FIGS. 1, 2, 7), in accordance with an example embodiment. According to an embodiment, the variable matching circuit 800 includes a network of fixed-value and variable passive components.

Circuit 800 includes a double-ended input 801-1, 801-2 (referred to as input 801), a double-ended output 802-1, 802-2 (referred to as output 802), and a network of passive components connected in a ladder arrangement between the input 801 and output 802. For example, when connected into system 700, the first input 801-1 may be connected to a first conductor of balanced conductor 728-4, and the second input 801-2 may be connected to a second conductor of balanced conductor 728-4. Similarly, the first output 802-1 may be connected to a first conductor of balanced conductor 728-5, and the second output 802-2 may be connected to a second conductor of balanced conductor 728-5.

In the specific embodiment illustrated in FIG. 8, circuit 800 includes a first variable inductor 811 and a first fixed inductor 815 connected in series between input 801-1 and output 802-1, a second variable inductor 816 and a second fixed inductor 820 connected in series between input 801-2 and output 802-2, a third variable inductor 821 connected between inputs 801-1 and 801-2, and a third fixed inductor 824 connected between nodes 825 and 826.

According to an embodiment, the third variable inductor 821 corresponds to an "RF signal source matching portion", which is configurable to match the impedance of the RF signal source (e.g., RF signal source 720, FIG. 7) as modified by the first matching circuit (e.g., circuit 734, FIG. 7), or more particularly to match the impedance of the final stage power amplifier (e.g., amplifier 724, FIG. 7) as modified by the first matching circuit (e.g., circuit 734, FIG. 7). According to an embodiment, the third variable inductor 821 includes a network of inductive components that may be selectively coupled together to provide inductances in a range of about 5 nH to about 200 nH, although the range may extend to lower or higher inductance values, as well.

In contrast, the "cavity matching portion" of the variable impedance matching network 800 is provided by the first and second variable inductors 811, 816, and fixed inductors 815, 820, and 824. Because the states of the first and second variable inductors 811, 816 may be changed to provide multiple inductance values, the first and second variable inductors 811, 816 are configurable to optimally match the impedance of the cavity plus load (e.g., cavity 760 plus load 764, FIG. 7). For example, inductors 811, 816 each may have a value in a range of about 10 nH to about 200 nH, although their values may be lower and/or higher, in other embodiments.

The fixed inductors 815, 820, 824 also may have inductance values in a range of about 50 nH to about 800 nH, although the inductance values may be lower or higher, as well. Inductors 811, 815, 816, 820, 821, 824 may include discrete inductors, distributed inductors (e.g., printed coils), wirebonds, transmission lines, and/or other inductive components, in various embodiments. In an embodiment, variable inductors 811 and 816 are operated in a paired manner, meaning that their inductance values during operation are controlled to be equal to each other, at any given time, in order to ensure that the RF signals conveyed to outputs 802-1 and 802-2 are balanced.

As discussed above, variable matching circuit 800 is a double-ended circuit that is configured to be connected along a balanced portion of the transmission path 728 (e.g., between connectors 728-4 and 728-5), and other embodiments may include a single-ended (i.e., one input and one output) variable matching circuit that is configured to be connected along the unbalanced portion of the transmission path 728.

By varying the inductance values of inductors 811, 816, 821 in circuit 800, the system controller 712 may increase or decrease the impedance transformation provided by circuit 800. Desirably, the inductance value changes improve the overall impedance match between the RF signal source 720 and the cavity plus load impedance, which should result in a reduction of the reflected signal power and/or the reflected-to-forward signal power ratio. In most cases, the system controller 712 may strive to configure the circuit 800 in a state in which a maximum electromagnetic field intensity is achieved in the cavity 760, and/or a maximum quantity of power is absorbed by the load 764, and/or a minimum quantity of power is reflected by the load 764.

FIG. 9 is a schematic diagram of a double-ended variable impedance matching network 900, in accordance with another example embodiment. Network 900 includes a double-ended input 901-1, 901-2 (referred to as input 901), a double-ended output 902-1, 902-2 (referred to as output 902), and a network of passive components connected in a ladder arrangement between the input 901 and output 902. The ladder arrangement includes a first plurality, N, of discrete inductors 911-914 coupled in series with each other between input 901-1 and output 902-1, where N may be an integer between 2 and 10, or more. The ladder arrangement also includes a second plurality, N, of discrete inductors 916-919 coupled in series with each other between input 901-2 and output 902-2. Additional discrete inductors 915 and 920 may be coupled between intermediate nodes 925, 926 and the output nodes 902-1, 902-2. Further still, the ladder arrangement includes a third plurality of discrete inductors 921-923 coupled in series with each other between inputs 901-1 and 901-2, and an additional discrete inductor 924 coupled between nodes 925 and 926. For example, the fixed inductors 915, 920, 924 each may have inductance values in a range of about 50 nH to about 800 nH, although the inductance values may be lower or higher, as well.

The series arrangement of inductors 911-914 may be considered a first variable inductor (e.g., inductor 811, FIG. 8), the series arrangement of inductors 916-919 may be considered a second variable inductor (e.g., inductor 816, FIG. 8), and series arrangement of inductors 921-923 may be considered a third variable inductor (e.g., inductor 821, FIG. 8). To control the variability of the "variable inductors", network 900 includes a plurality of bypass switches 931-934, 936-939, 941, and 943, where each switch 931-934, 936-939, 941, and 943 is coupled in parallel across the terminals of one of inductors 911-914, 916-919, 921, and 923. Switches 931-934, 936-939, 941, and 943 may be implemented as transistors, mechanical relays or mechanical switches, for example. The electrically conductive state of each switch 931-934, 936-939, 941, and 943 (i.e., open or closed) is controlled using control signals 951-954, 956-959, 961, 963 from the system controller (e.g., control signals from system controller 712 provided over connection 716, FIG. 7).

In an embodiment, sets of corresponding inductors in the two paths between input 901 and output 902 have substantially equal values, and the conductive state of the switches for each set of corresponding inductors is operated in a paired manner, meaning that the switch states during operation are controlled to be the same as each other, at any given time, in order to ensure that the RF signals conveyed to outputs 902-1 and 902-2 are balanced. For example, inductors 911 and 916 may constitute a first "set of corresponding inductors" or "paired inductors" with substantially equal values, and during operation, the states of switches 931 and 936 are controlled to be the same (e.g., either both open or both closed), at any given time. Similarly, inductors 912 and 917 may constitute a second set of corresponding inductors with equal inductance values that are operated in a paired manner, inductors 913 and 918 may constitute a third set of corresponding inductors with equal inductance values that are operated in a paired manner, and inductors 914 and 919 may constitute a fourth set of corresponding inductors with equal inductance values that are operated in a paired manner.

For each parallel inductor/switch combination, substantially all current flows through the inductor when its corresponding switch is in an open or non-conductive state, and substantially all current flows through the switch when the switch is in a closed or conductive state. For example, when all switches 931-934, 936-939, 941, and 943 are open, as illustrated in FIG. 9, substantially all current flowing between input and output nodes 901-1, 902-1 flows through the series of inductors 911-915, and substantially all current flowing between input and output nodes 901-2, 902-2 flows through the series of inductors 916-920 (as modified by any current flowing through inductors 921-923 or 924). This configuration represents the maximum inductance configuration of the network 900 (i.e., the configuration of network 900 in which a maximum inductance value is present between input and output nodes 901, 902). Conversely, when all switches 931-934, 936-939, 941, and 943 are closed, substantially all current flowing between input and output nodes 901, 902 bypasses the inductors 911-914 and 916-919 and flows instead through the switches 931-934 or 936-939, inductors 915 or 920, and the conductive interconnections between the input and output nodes 901, 902 and switches 931-934, 936-939. This configuration represents the minimum inductance configuration of the network 900 (i.e., the configuration of network 900 in which a minimum inductance value is present between input and output nodes 901, 902). Ideally, the minimum inductance value would be near zero inductance. However, in practice a relatively small inductance is present in the minimum inductance configuration due to the cumulative inductances of the switches 931-934 or 936-939, inductors 915 or 920, and the conductive interconnections between nodes 901, 902 and the switches 931-934 or 936-939. For example, in the minimum inductance configuration, a trace inductance for the series combination of switches 931-934 or 936-939 may be in a range of about 10 nH to about 400 nH, although the trace inductance may be smaller or larger, as well. Larger, smaller, or substantially similar trace inductances also may be inherent in each of the other network configurations, as well, where the trace inductance for any given network configuration is a summation of the inductances of the sequence of conductors and switches through which the current primarily is carried through the network 900.

Starting from the maximum inductance configuration in which all switches 931-934, 936-939 are open, the system controller may provide control signals 951-954, 956-959 that result in the closure of any combination of switches 931-934, 936-939 in order to reduce the inductance of the network 900 by bypassing corresponding combinations of inductors 911-914, 916-919.

Similar to the embodiment of FIG. 8, in circuit 900, the first and second pluralities of discrete inductors 911-914, 916-919 and fixed inductor 924 correspond to a "cavity matching portion" of the circuit. Similar to the embodiment described above in conjunction with FIG. 5A, in one embodiment, each inductor 911-914, 916-919 has substantially the same inductance value, referred to herein as a normalized value of I. For example, each inductor 911-914, 916-919 may have a value in a range of about 1 nH to about 400 nH, or some other value. In such an embodiment, the maximum inductance value between input node 901-1 and 902-2, and the maximum inductance value between input node 901-2 and 902-2 (i.e., when all switches 931-934, 936-939 are in an open state) would be about N×I, plus any trace inductance that may be present in the network 900 when it is in the maximum inductance configuration. When any n switches are in a closed state, the inductance value between corresponding input and output nodes would be about (N−n)×I (plus trace inductance).

As also explained in conjunction with FIG. 5A, above, in an alternate embodiment, the inductors 911-914, 916-919 may have different values from each other. For example, moving from the input node 901-1 toward the output node 902-1, the first inductor 911 may have a normalized inductance value of I, and each subsequent inductor 912-914 in the series may have a larger or smaller inductance value. Similarly, moving from the input node 901-2 toward the output node 902-2, the first inductor 916 may have a normalized inductance value of I, and each subsequent inductor 917-919 in the series may have a larger or smaller inductance value. For example, each subsequent inductor 912-914 or 917-919 may have an inductance value that is a multiple (e.g., about twice or half) the inductance value of the nearest downstream inductor 911-914 or 916-918. The example of Table 1, above, applies also to the first series inductance path between input and output nodes 901-1 and 902-1, and the second series inductance path between input and output nodes 901-2 and 902-1. More specifically, inductor/switch combinations 911/931 and 916/956 each are analogous to inductor/switch combination 501/511, inductor/switch combinations 912/932 and 917/957 each are analogous to inductor/switch combination 502/512, inductor/switch combinations 913/933 and 918/958 each are analogous to inductor/switch combination 503/513, and inductor/switch combinations 914/934 and 919/959 each are analogous to inductor/switch combination 504/514.

Assuming that the trace inductance through series inductors 911-914 in the minimum inductance configuration is about 10 nH, and the range of inductance values achievable by the series inductors 911-914 is about 10 nH (trace inductance) to about 400 nH, the values of inductors 911-914 may be, for example, about 10 nH, about 20 nH, about 40 nH, about 80 nH, and about 160 nH, respectively. The combination of series inductors 916-919 may be similarly or identically configured. Of course, more or fewer than four inductors 911-914 or 916-919 may be included in either series combination between input and output nodes 901-1/902-1 or 901-2/902-2, and the inductors within each series combination may have different values from the example values given above.

Although the above example embodiment specifies that the number of switched inductances in each series combination between corresponding input and output nodes equals four, and that each inductor 911-914, 916-919 has a value that is some multiple of a value of I, alternate embodiments of variable series inductance networks may have more or fewer than four inductors, different relative values for the inductors, and/or a different configuration of inductors (e.g., differently connected sets of parallel and/or series coupled inductors). Either way, by providing a variable inductance network in an impedance matching network of a defrosting system, the system may be better able to match the ever-changing cavity plus load impedance that is present during a defrosting operation.

As with the embodiment of FIG. 8, the third plurality of discrete inductors 921-923 corresponds to an "RF signal source matching portion" of the circuit. The third variable inductor comprises the series arrangement of inductors 921-923, where bypass switches 941 and 943 enable inductors 921 and 923 selectively to be connected into the series arrangement or bypassed based on control signals 961 and 963. In an embodiment, each of inductors 921-923 may have equal values (e.g., values in a range of about 1 nH to about 100 nH. In an alternate embodiment, the inductors 921-923 may have different values from each other. Inductor 922 is electrically connected between input terminals 901-1 and 901-2 regardless of the state of bypass switches 941 and 943. Accordingly, the inductance value of inductor 922 serves as a baseline (i.e., minimum) inductance between input terminals 901-1 and 901-2. According to an embodiment, the first and third inductors 921, 923 may have inductance values that are a ratio of each other. For example, when the first inductor 921 has a normalized inductance value of J, inductor 923 may have a value of 2*J, 3*J, 4*J, or some other ratio, in various embodiments.

FIG. 10 is a schematic diagram of a double-ended variable impedance matching circuit 1000 that may be incorporated into a defrosting system (e.g., system 100, 200, 700, FIGS. 1, 2, 7), in accordance with another example embodiment. As with the matching circuits 800, 900 (FIGS. 8 and 9), according to an embodiment, the variable matching circuit 1000 includes a network of fixed-value and variable passive components.

Circuit 1000 includes a double-ended input 1001-1, 1001-2 (referred to as input 1001), a double-ended output 1002-1, 1002-2 (referred to as output 1002), and a network of passive components connected between the input 1001 and output 1002. For example, when connected into system 700, the first input 1001-1 may be connected to a first conductor of balanced conductor 728-4, and the second input 1001-2 may be connected to a second conductor of balanced conductor 728-4. Similarly, the first output 1002-1 may be connected to a first conductor of balanced conductor 728-5, and the second output 1002-2 may be connected to a second conductor of balanced conductor 728-5.

In the specific embodiment illustrated in FIG. 10, circuit 1000 includes a first variable capacitance network 1011 and a first inductor 1015 connected in series between input 1001-1 and output 1002-1, a second variable capacitance network 1016 and a second inductor 1020 connected in series between input 1001-2 and output 1002-2, and a third variable capacitance network 1021 connected between nodes 1025 and 1026. The inductors 1015, 1020 are relatively large in both size and inductance value, in an embodiment, as they may be designed for relatively low frequency (e.g., about 40.66 MHz to about 40.70 MHz) and high power (e.g., about 50 W to about 500 W) operation. For example, inductors 1015, 1020 each may have a value in a range of about 100 nH to about 1000 nH (e.g., in a range of about 200 nH to about 600 nH), although their values may be lower and/or higher, in other embodiments. According to an embodiment, inductors 1015, 1020 are fixed-value, lumped inductors (e.g., coils, discrete inductors, distributed inductors (e.g., printed coils), wirebonds, transmission lines, and/or other inductive components, in various embodiments). In other embodiments, the inductance value of inductors 1015, 1020 may be variable. In any event, the inductance values of inductors 1015, 1020 are substantially the same either permanently (when inductors 1015, 1020 are fixed-value) or at any given time (when inductors 1015, 1020 are variable, they are operated in a paired manner), in an embodiment.

The first and second variable capacitance networks 1011, 1016 correspond to "series matching portions" of the circuit 1000. According to an embodiment, the first variable capacitance network 1011 includes a first fixed-value capacitor 1012 coupled in parallel with a first variable capacitor 1013. The first fixed-value capacitor 1012 may have a capacitance value in a range of about 1 pF to about 100 pF, in an embodiment. As was described previously in conjunction with FIG. 5B, the first variable capacitor 1013 may include a network of capacitive components that may be selectively coupled together to provide capacitances in a range of 0 pF to about 100 pF. Accordingly, the total capacitance value provided by the first variable capacitance network 1011 may be in a range of about 1 pF to about 200 pF, although the range may extend to lower or higher capacitance values, as well.

Similarly, the second variable capacitance network 1016 includes a second fixed-value capacitor 1017 coupled in parallel with a second variable capacitor 1018. The second fixed-value capacitor 1017 may have a capacitance value in a range of about 1 pF to about 100 pF, in an embodiment. As was described previously in conjunction with FIG. 5B, the second variable capacitor 1018 may include a network of capacitive components that may be selectively coupled together to provide capacitances in a range of 0 pF to about 100 pF. Accordingly, the total capacitance value provided by the second variable capacitance network 1016 may be in a range of about 1 pF to about 200 pF, although the range may extend to lower or higher capacitance values, as well.

In any event, to ensure the balance of the signals provided to outputs 1002-1 and 1002-2, the capacitance values of the first and second variable capacitance networks 1011, 1016 are controlled to be substantially the same at any given time, in an embodiment. For example, the capacitance values of the first and second variable capacitors 1013, 1018 may be controlled so that the capacitance values of the first and second variable capacitance networks 1011, 1016 are substantially the same at any given time. The first and second variable capacitors 1013, 1018 are operated in a paired manner, meaning that their capacitance values during operation are controlled, at any given time, to ensure that the RF signals conveyed to outputs 1002-1 and 1002-2 are balanced. The capacitance values of the first and second fixed-value capacitors 1012, 1017 may be substantially the same, in some embodiments, although they may be different, in others.

The "shunt matching portion" of the variable impedance matching network 1000 is provided by the third variable capacitance network 1021 and fixed inductors 1015, 1020. According to an embodiment, the third variable capacitance network 1021 includes a third fixed-value capacitor 1023 coupled in parallel with a third variable capacitor 1024. The third fixed-value capacitor 1023 may have a capacitance value in a range of about 1 pF to about 500 pF, in an embodiment. As was described previously in conjunction with FIG. 5B, the third variable capacitor 1024 may include a network of capacitive components that may be selectively coupled together to provide capacitances in a range of 0 pF to about 200 pF. Accordingly, the total capacitance value provided by the third variable capacitance network 1021 may be in a range of about 1 pF to about 700 pF, although the range may extend to lower or higher capacitance values, as well.

Because the configurations of the variable capacitance networks 1011, 1016, 1021 may be changed to provide multiple capacitance values, the variable capacitance networks 1011, 1016, 1021 are configurable to optimally match the impedance of the cavity plus load (e.g., cavity 760 plus load 764, FIG. 7) to the RF signal source (e.g., RF signal source 720, 720', FIG. 7). By varying the capacitance values of capacitors 1013, 1018, 1024 in circuit 1000, the system controller (e.g., system controller 712, FIG. 7) may increase or decrease the impedance transformation provided by circuit 1000. Desirably, the capacitance value changes improve the overall impedance match between the RF signal source 720 and the impedance of the cavity plus load, which should result in a reduction of the reflected signal power and/or the reflected-to-forward signal power ratio. In most cases, the system controller 712 may strive to configure the circuit 1000 in a configuration in which a maximum electromagnetic field intensity is achieved in the cavity 760, and/or a maximum quantity of power is absorbed by the load 764, and/or a minimum quantity of power is reflected by the load 764.

It should be understood that the variable impedance matching circuits 800, 900, 1000 illustrated in FIGS. 8-10 are but three possible circuit configurations that may perform the desired double-ended variable impedance transformations. Other embodiments of double-ended variable impedance matching circuits may include differently arranged inductive or capacitive networks, or may include passive networks that include various combinations of inductors, capacitors, and/or resistors, where some of the passive components may be fixed-value components, and some of the passive components may be variable-value components (e.g., variable inductors, variable capacitors, and/or variable resistors). Further, the double-ended variable impedance matching circuits may include active devices (e.g., transistors) that switch passive components into and out of the network to alter the overall impedance transformation provided by the circuit.

A particular physical configuration of a defrosting system will now be described in conjunction with FIG. 11. More particularly, FIG. 11 is a cross-sectional, side view of a defrosting system 1100, in accordance with an example embodiment. The defrosting system 1100 generally includes a defrosting cavity 1174, a user interface (not shown), a system controller 1130, an RF signal source 1120, power supply and bias circuitry (not shown), power detection circuitry 1180, a variable impedance matching network 1160, a first electrode 1170, and a second electrode 1172, in an embodiment. According to an embodiment, the system controller 1130, RF signal source 1120, power supply and bias circuitry, and power detection circuitry 1180, may form portions of a first module (e.g., RF module 1300, FIG. 13), and the variable impedance matching network 1160 may form portions of a second module (e.g., either module 1200 or 1240, FIGS. 12A, 12B). In addition, in some embodiments, defrosting system 1100 may include temperature sensor(s), and/or IR sensor(s) 1192.

The defrosting system 1100 is contained within a containment structure 1150, in an embodiment. According to an embodiment, the containment structure 1150 may define two or more interior areas, such as the defrosting cavity 1174 and a circuit housing area 1178. The containment structure 1150 includes bottom, top, and side walls. Portions of the interior surfaces of some of the walls of the containment structure 1150 may define the defrosting cavity 1174. The defrosting cavity 1174 includes a capacitive defrosting arrangement with first and second parallel plate electrodes 1170, 1172 that are separated by an air cavity within which a load 1164 to be defrosted may be placed. For example, the first electrode 1170 may be positioned above the air cavity, and a second electrode 1172 may be, in the single-ended system embodiment, provided by a conductive portion of the containment structure 1150 (e.g., a portion of the bottom wall of the containment structure 1150). Alternatively, in the single- or double-ended system embodiments, the second electrode 1172 may be formed from a conductive plate, as shown, that is distinct from the containment structure 1150. According to an embodiment, non-electrically conductive support structure(s) 1154 may be employed to suspend the first electrode 1170 above the air cavity, to electrically isolate the first electrode 1170 from the containment structure 1150, and to hold the first electrode 1170 in a fixed physical orientation with respect to the air cavity. In addition, to avoid direct contact between the load 1164 and the second electrode 1172, a non-conductive support and barrier structure 1156 may be positioned over the bottom surface of the containment structure 1150.

According to an embodiment, the containment structure 1150 is at least partially formed from conductive material, and the conductive portion(s) of the containment structure may be grounded to provide a ground reference for various electrical components of the system. Alternatively, at least the portion of the containment structure 1150 that corresponds to the second electrode 1172 may be formed from conductive material and grounded.

The temperature sensor(s) and/or IR sensor(s) 1192 may be positioned in locations that enable the temperature of the load 1164 to be sensed both before, during, and after a defrosting operation. According to an embodiment, the temperature sensor(s) and/or IR sensor(s) 1192 are configured to provide load temperature estimates to the system controller 1130.

Some or all of the various components of the system controller 1130, the RF signal source 1120, the power supply and bias circuitry (not shown), the power detection circuitry 1180, and the variable impedance matching network 1160, may be coupled to one or more common substrates (e.g., substrate 1152) within the circuit housing area 1178 of the containment structure 1150, in an embodiment. For example, some of all of the above-listed components may be included in an RF module (e.g., RF module 1300, FIG. 13) and a variable impedance matching circuit module (e.g., a variation of module 1200 or 1240, FIGS. 12A, 12B), which are housed within the circuit housing area 1178 of the containment structure 1150. According to an embodiment, the system controller 1130 is coupled to the user interface, RF signal source 1120, variable impedance matching network 1160, and power detection circuitry 1180 through various conductive interconnects on or within the common substrate 1152, and/or through various cables (e.g., coaxial cables), not shown. In addition, the power detection circuitry 1180 is coupled along the transmission path 1148 between the output of the RF signal source 1120 and the input to the variable impedance matching network 1160, in an embodiment. For example, the substrate 1152 (or the substrates defining an RF module 1300 or variable impedance matching network module 1200, 1240) may include a microwave or RF laminate, a polytetrafluoroethylene (PTFE) substrate, a printed circuit board (PCB) material substrate (e.g., FR-4), an alumina substrate, a ceramic tile, or another type of substrate. In various alternate embodiments, various ones of the components may be coupled to different substrates with electrical interconnections between the substrates and components. In still other alternate embodiments, some or all of the components may be coupled to a cavity wall, rather than being coupled to a distinct substrate.

In either a single-ended or double-ended embodiment, the first electrode 1170 is electrically coupled to the RF signal source 1120 through a variable impedance matching network 1160 and a transmission path 1148, in an embodiment. In a double-ended embodiment, the second electrode 1172 also is electrically coupled to the RF signal source 1120 through a variable impedance matching network 1160 and a transmission path 1148. As discussed previously, single-ended embodiments of the variable impedance matching network 1160 may include a single-ended variable inductance network (e.g., network 400, FIG. 4A) or a single-ended variable capacitance network (e.g., network 440, FIG. 4B). Alternatively, double-ended embodiments of the variable impedance matching network 1160 may include a double-ended variable inductance network (e.g., network 800, 900, FIGS. 8, 9) or a double-ended variable capacitance network (e.g., network 1000, FIG. 10). In an embodiment, the variable impedance matching network 1160 is implemented as a module (e.g., one of modules 1200, 1240, FIGS. 12A, 12B), or is coupled to the common substrate 1152 and located within the circuit housing area 1178. Conductive structures (e.g., conductive vias, traces, cables, wires, and other structures) may provide for electrical communication between the circuitry within the circuit housing area 1178 and electrodes 1170, 1172.

According to various embodiments, the circuitry associated with the single-ended or double-ended variable impedance matching networks discussed herein may be implemented in the form of one or more modules, where a "module" is defined herein as an assembly of electrical components coupled to a common substrate. For example, FIGS. 12A and 12B are a perspective views of examples of modules 1200, 1240 that include a double-ended variable impedance matching network (e.g., networks 800, 900, 1000, FIGS. 8-10), in accordance with two example embodiments. More specifically, FIG. 12A illustrates a module 1200 that houses a variable inductance impedance matching network (e.g., networks 800, 900, FIGS. 8, 9), and FIG. 12B illustrates a module 1240 that houses a variable capacitance impedance matching network (e.g., network 1000, FIG. 10).

Each of the modules 1200, 1240 includes a printed circuit board (PCB) 1204, 1244 with a front side 1206, 1246 and an opposite back side 1208, 1248. The PCB 1204, 1244 is formed from one or more dielectric layers, and two or more printed conductive layers. Conductive vias (not visible in FIGS. 12A, 12B) may provide for electrical connections between the multiple conductive layers. At the front side 1206, 1246, a plurality of printed conductive traces formed from a first printed conductive layer provides for electrical connectivity between the various components that are coupled to the front side 1206, 1246 of the PCB 1204, 1244. Similarly, at the back side 1208, 1248, a plurality of printed conductive traces formed from a second printed conductive layer provides for electrical connectivity between the various components that are coupled to the back side 1208, 1248 of the PCB 1204, 1244.

Figure 12A:
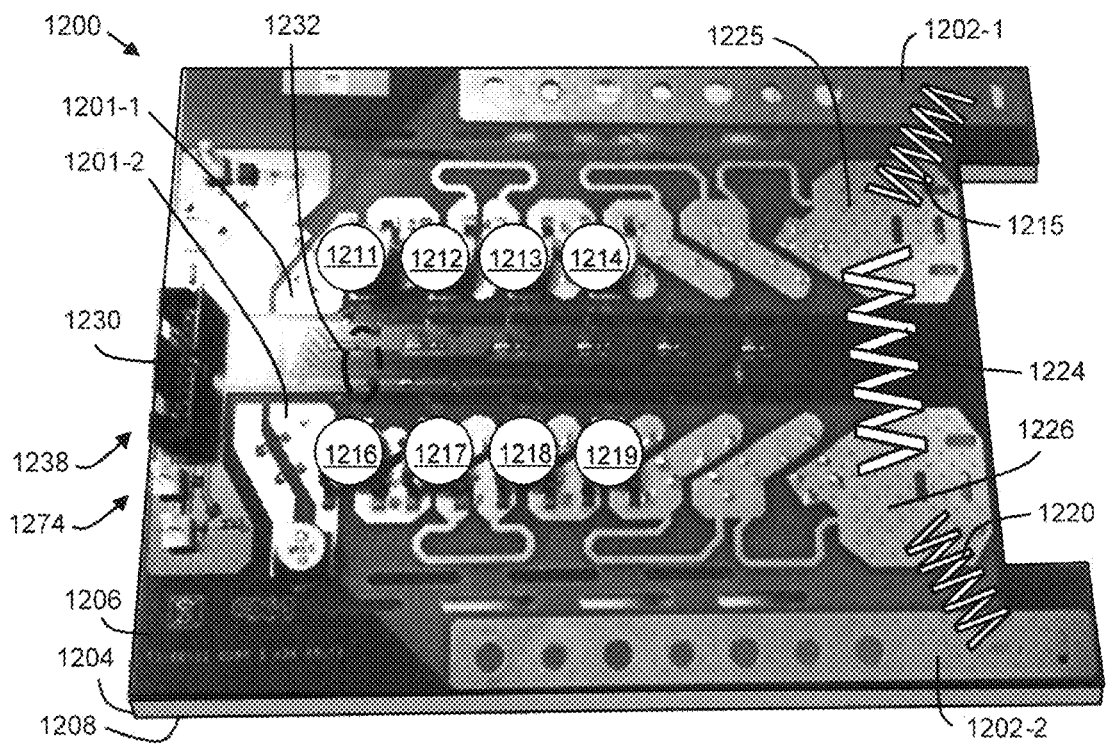
FIG. 12A is a perspective view of a double-ended variable impedance matching network module with variable inductances, in accordance with an example embodiment.
Figure 12B:
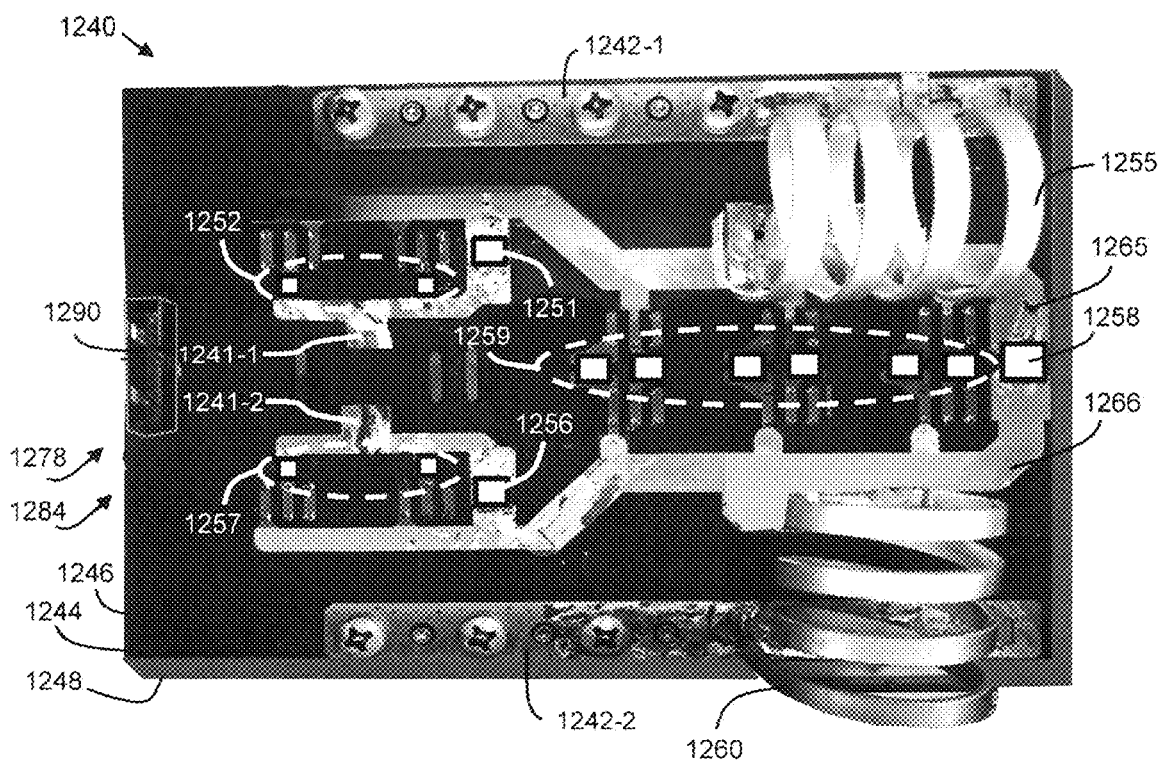
FIG. 12B is a perspective view of a double-ended variable impedance matching network module with variable capacitances, in accordance with another example embodiment.

According to an embodiment, each PCB 1204, 1244 houses an RF input connector 1238, 1278 (e.g., coupled to back side 1208, 1248 and thus not visible in the views of FIGS. 12A, 12B, but corresponding to connector 738, FIG. 7) and a balun 1274, 1284 (e.g., coupled to back side 1208, 1248 and thus not visible in the view of FIGS. 12A, 12B, but corresponding to balun 774, FIG. 7). The input connector 1238, 1278 is configured to be electrically connected to an RF subsystem (e.g., subsystem 310, 710, FIGS. 3, 7) with a connection (e.g., connection 728-3, FIG. 7) such as a coaxial cable or other type of conductor. In such an embodiment, an unbalanced RF signal received by the balun 1274, 1284 from the RF input connector 1238, 1278 is converted to a balanced signal, which is provided over a pair of balanced conductors (e.g., connections 728-4, FIG. 7) to a double-ended input that includes first and second inputs 1201-1, 1201-2 or 1241-1, 1242-2. The connection between the input connector 1238, 1278 and the balun 1274, 1284, and the connections between the balun 1274, 1284 and the inputs 1201-1, 1201-2, 1241-1, 1241-2 each may be implemented using conductive traces and vias formed on and in the PCB 1204, 1244. In an alternate embodiment, as discussed above, an alternate embodiment may include a balanced amplifier (e.g., balanced amplifier 724', FIG. 7), which produces a balanced signal on connections (e.g., conductors 728-1', FIG. 7) that can be directly coupled to the inputs 1201-1, 1201-2, 1241-1, 1241-2. In such an embodiment, the balun 1274, 1284 may be excluded from the module 1200, 1240.

In addition, each PCB 1204, 1244 houses circuitry associated with a double-ended variable impedance matching network (e.g., network 772, 800, 900, 1000, FIGS. 7-10). Referring first to FIG. 12A, which corresponds to a module 1200 that houses a variable inductance impedance matching network (e.g., networks 800, 900, FIGS. 8, 9), the circuitry housed by the PCB 1204 includes the double-ended input 1201-1, 1201-2 (e.g., inputs 901-1, 901-2, FIG. 9), a double-ended output 1202-1, 1202-2 (e.g., outputs 902-1, 902-2, FIG. 9), a first plurality of inductors 1211, 1212, 1213, 1214, 1215 (e.g., inductors 911-915, FIG. 9) coupled in series between a first input 1201-1 of the double-ended input and a first output 1202-1 of the double-ended output, a second plurality of inductors 1216, 1217, 1218, 1219, 1220 (e.g., inductors 916-920, FIG. 9) coupled in series between a second input 1201-2 of the double-ended input and a second output 1202-2 of the double-ended output, a third plurality of inductors (not visible in the view of FIG. 12, but corresponding to inductors 921-923, FIG. 9, for example) coupled in series between the first and second inputs 1201-1, 1201-2, and one or more additional inductors 1224 (e.g., inductor 924, FIG. 9) coupled between nodes 1225 and 1226 (e.g., nodes 925, 926).

A plurality of switches or relays (e.g., not visible in the view of FIG. 12, but corresponding to switches 931-934, 936-939, 941, 943, FIG. 9, for example) also are coupled to the PCB 1204. For example, the plurality of switches or relays may be coupled to the front side 1206 or to the back side 1208 of the PCB 1204. Each of the switches or relays is electrically connected in parallel across one of the inductors 1211-1214, 1216-1219, or one of the inductors (e.g., inductors 921, 923, FIG. 9) between inputs 1202-1 and 1202-2, in an embodiment. A control connector 1230 is coupled to the PCB 1204, and conductors of the control connector 1230 are electrically coupled to conductive traces 1232 to provide control signals to the switches (e.g., control signals 951-954, 956-959, 961, 963, FIG. 9), and thus to switch the inductors into or out of the circuit, as described previously. As shown in FIG. 12A, fixed-value inductors 1215, 1220 (e.g., inductors 915, 920, FIG. 9) may be formed from relatively large coils, although they may be implemented using other structures as well. Further, as shown in the embodiment of FIG. 12A, the conductive features corresponding to outputs 1202-1, 1202-2 may be relatively large, and may be elongated for direct attachment to the electrodes (e.g., electrodes 740, 750, FIG. 7) of the system.

Referring now to FIG. 12B, which corresponds to a module 1240 that houses a variable capacitance impedance matching network (e.g., network 1000, FIG. 10), the circuitry housed by the PCB 1244 includes a double-ended input 1241-1, 1241-2 (e.g., inputs 1001-1, 1001-2, FIG. 10), a double-ended output 1242-1, 1242-2 (e.g., outputs 1002-1, 1002-2, FIG. 10), a first plurality of capacitors 1251, 1252 (e.g., capacitors 1012, 1013, FIG. 10) that comprise a first variable capacitance network (e.g., network 1011, FIG. 10) coupled between a first input 1241-1 of the double-ended input and a first intermediate node 1265 (e.g., node 1025, FIG. 10), a second plurality of capacitors 1256, 1257 (e.g., capacitors 1017, 1018, FIG. 10) that comprise a second variable capacitance network (e.g., network 1016, FIG. 10) coupled between a second input 1241-2 of the double-ended input and a second intermediate node 1266 (e.g., node 1026, FIG. 10), a third plurality of capacitors 1258, 1259 (e.g., capacitors 1023, 1024, FIG. 10) coupled between nodes 1265, 1266 (e.g., nodes 1025, 1026), and one or more additional inductors 1255, 1260 (e.g., inductors 1015, 1020, FIG. 10) coupled between nodes 1265 and 1266 and outputs 1242-1, 1242-2.

The first, second, and third pluralities of capacitors each include a fixed capacitor 1251, 1256, 1258 (e.g., capacitors 1012, 1017, 1023, FIG. 10), and a set of one or more capacitors 1252, 1257, 1259 that make up a variable capacitor (e.g., variable capacitors 1013, 1018, 1024). Each set of variable capacitors 1252, 1257, 1259 may be implemented using a capacitive network, such as network 500, FIG. 5. A plurality of switches or relays (e.g., not visible in the view of FIG. 12B, but corresponding to switches 551-554, FIG. 5, for example) also are coupled to the PCB 1244. For example, the plurality of switches or relays may be coupled to the front side 1246 or to the back side 1248 of the PCB 1244. Each of the switches or relays is electrically connected in series with a terminal of a different one of the capacitors associated with the variable capacitors 1252, 1257, 1259. A control connector 1290 is coupled to the PCB 1244, and conductors of the control connector (not shown in FIG. 12B) are electrically coupled to conductive traces within PCB 1244 to provide control signals to the switches (e.g., control signals 561-564, FIG. 5), and thus to switch the capacitors into or out of the circuit, as described previously.

As shown in FIG. 12B, fixed-value inductors 1255, 1260 (e.g., inductors 1015, 1020, FIG. 10) are electrically coupled between intermediate nodes 1265 and 1266 and outputs 1242-1, 1242-2. The inductors 1255, 1260 may be formed from relatively large coils, although they may be implemented using other structures as well. Further, as shown in the embodiment of FIG. 12B, the conductive features corresponding to outputs 1242-1, 1242-2 may be relatively large, and may be elongated for direct attachment to the electrodes (e.g., electrodes 740, 750, FIG. 7) of the system. According to an embodiment, and as illustrated in FIG. 12B, the inductors 1255, 1260 are arranged so that their primary axes are perpendicular to each other (i.e., the axes extending through the centers of the inductors 1255, 1260 are at about 90 degree angles). This may result in significantly reduced electromagnetic coupling between the inductors 1255, 1260. In other embodiments, the inductors 1255, 1260 may be arranged so that their primary axes are parallel, or may be arranged with other angular offsets.

Figure 13:
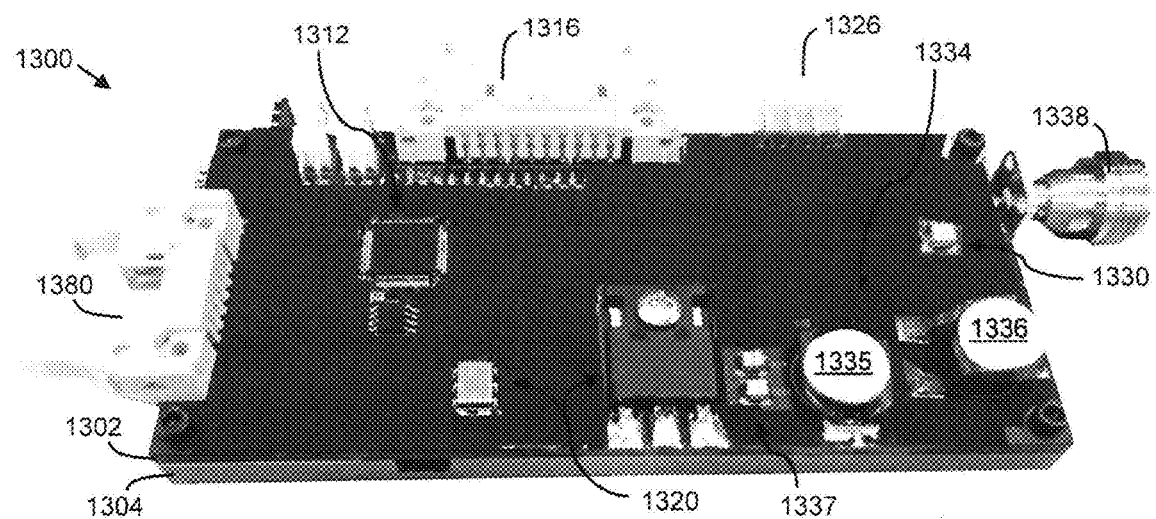
FIG. 13 is a perspective view of an RF module, in accordance with an example embodiment.

In various embodiments, the circuitry associated with the RF subsystem (e.g., RF subsystem 310, 710, FIGS. 3, 7) also may be implemented in the form of one or more modules. For example, FIG. 13 is a perspective view of an RF module 1300 that includes an RF subsystem (e.g., RF subsystem 310, 710, FIGS. 3, 7), in accordance with an example embodiment. The RF module 1300 includes a PCB 1302 coupled to a ground substrate 1304. The ground substrate 1304 provides structural support for the PCB 1302, and also provides an electrical ground reference and heat sink functionality for the various electrical components coupled to the PCB 1302.

According to an embodiment, the PCB 1302 houses the circuitry associated with the RF subsystem (e.g., subsystem 310 or 710, FIGS. 3, 7). Accordingly, the circuitry housed by the PCB 1302 includes system controller circuitry 1312 (e.g., corresponding to system controller 312, 712, FIGS. 3, 7), RF signal source circuitry 1320 (e.g., corresponding to RF signal source 320, 720, FIGS. 3, 7, including an RF signal generator 322, 722 and power amplifier 324, 325, 724), power detection circuitry 1330 (e.g., corresponding to power detection circuitry 330, 730, FIGS. 3, 7), and impedance matching circuitry 1334 (e.g., corresponding to first matching circuitry 334, 734, FIGS. 3, 7).

In the embodiment of FIG. 13, the system controller circuitry 1312 includes a processor IC and a memory IC, the RF signal source circuitry 1320 includes a signal generator IC and one or more power amplifier devices, the power detection circuitry 1330 includes a power coupler device, and the impedance matching circuitry 1334 includes a plurality of passive components (e.g., inductors 1335, 1336 and capacitors 1337) connected together to form an impedance matching network. The circuitry 1312, 1320, 1330, 1334 and the various sub-components may be electrically coupled together through conductive traces on the PCB 1302 as discussed previously in reference to the various conductors and connections discussed in conjunction with FIGS. 3, 7.

RF module 1300 also includes a plurality of connectors 1316, 1326, 1338, 1380, in an embodiment. For example, connector 1380 may be configured to connect with a host system that includes a user interface (e.g., user interface 380, 780, FIGS. 3, 7) and other functionality. Connector 1316 may be configured to connect with a variable matching circuit (e.g., circuit 372, 772, FIGS. 3, 7) to provide control signals to the circuit, as previously described. Connector 1326 may be configured to connect to a power supply to receive system power. Finally, connector 1338 (e.g., connector 336, 736, FIGS. 3, 7) may be configured to connect to a coaxial cable or other transmission line, which enables the RF module 1300 to be electrically connected (e.g., through a coaxial cable implementation of conductor 328-2, 728-3, FIGS. 3, 7) to a variable matching subsystem (e.g., subsystem 370, 770, FIGS. 3, 7). In an alternate embodiment, components of the variable matching subsystem (e.g., variable matching network 370, balun 774, and/or variable matching circuit 772, FIGS. 3, 7) also may be integrated onto the PCB 1302, in which case connector 1336 may be excluded from the module 1300. Other variations in the layout, subsystems, and components of RF module 1300 may be made, as well.

Embodiments of an RF module (e.g., module 1300, FIG. 13) and a variable impedance matching network module (e.g., module 1200, 1240, FIGS. 12A, 12B) may be electrically connected together, and connected with other components, to form a defrosting apparatus or system (e.g., apparatus 100, 200, 300, 700, 1100, FIGS. 1-3, 7, 11). For example, an RF signal connection may be made through a connection (e.g., conductor 728-3, FIG. 7), such as a coaxial cable, between the RF connector 1338 (FIG. 13) and the RF connector 1238 (FIG. 12A) or RF connector 1278 (FIG. 12B), and control connections may be made through connections (e.g., conductors 716, FIG. 7), such as a multi-conductor cable, between the connector 1316 (FIG. 13) and the connector 1230 (FIG. 12A) or connector 1290 (FIG. 12B). To further assemble the system, a host system or user interface may be connected to the RF module 1300 through connector 1380, a power supply may be connected to the RF module 1300 through connector 1326, and electrodes (e.g., electrodes 740, 750, FIG. 7) may be connected to the outputs 1202-1, 1202-2 (FIG. 12A) or 1242-1, 1242-2 (FIG. 12B). Of course, the above-described assembly also would be physically connected to various support structures and other system components so that the electrodes are held in a fixed relationship to each other across a defrosting cavity (e.g., cavity 110, 360, 760, FIGS. 1, 3, 7), and the defrosting apparatus may be integrated within a larger system (e.g., systems 100, 200, FIGS. 1, 2).

Figure 14A:
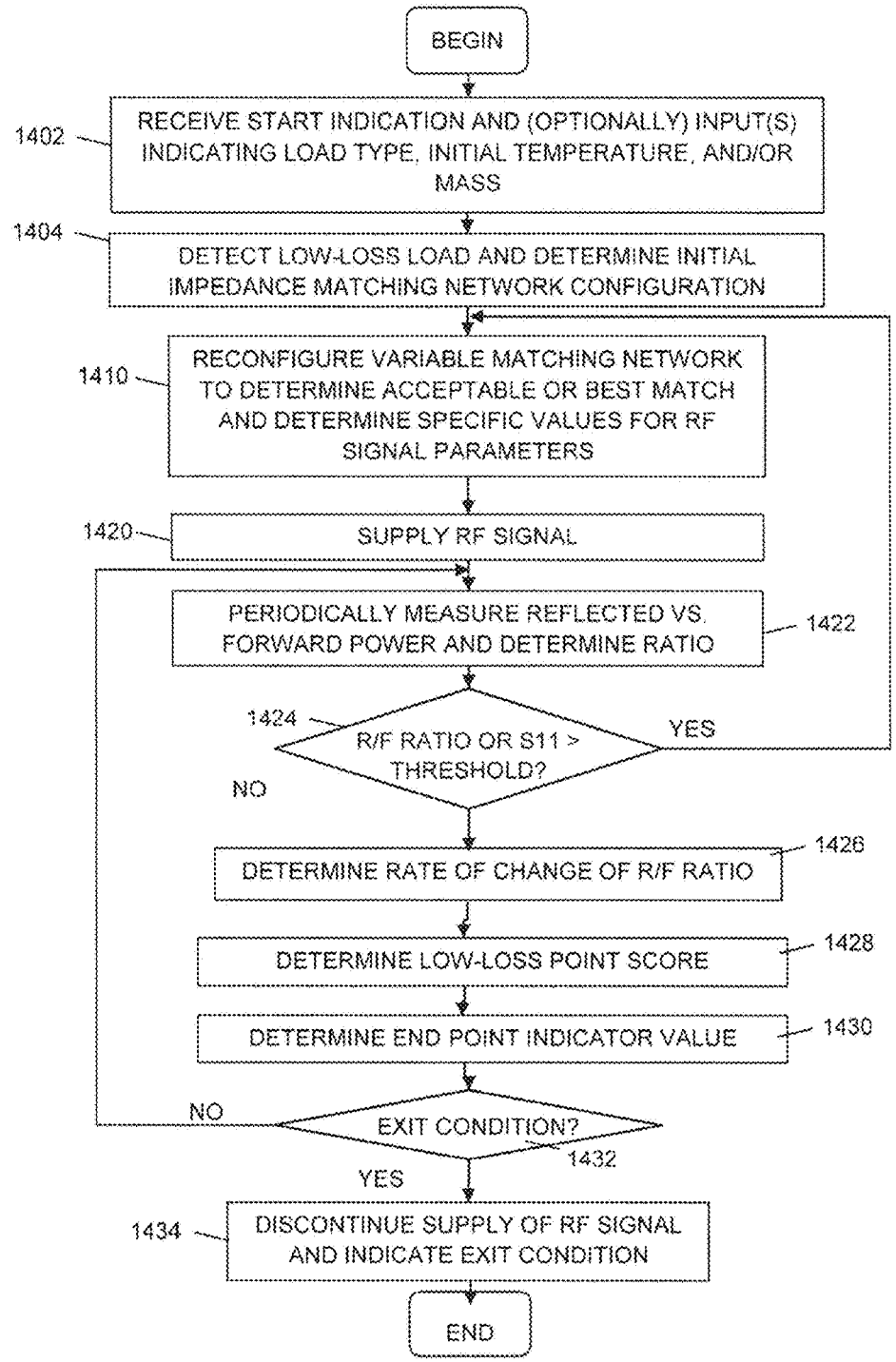
FIG. 14A is a flowchart of a method of operating a defrosting system with dynamic load matching, in accordance with an example embodiment.
Figure 14B:
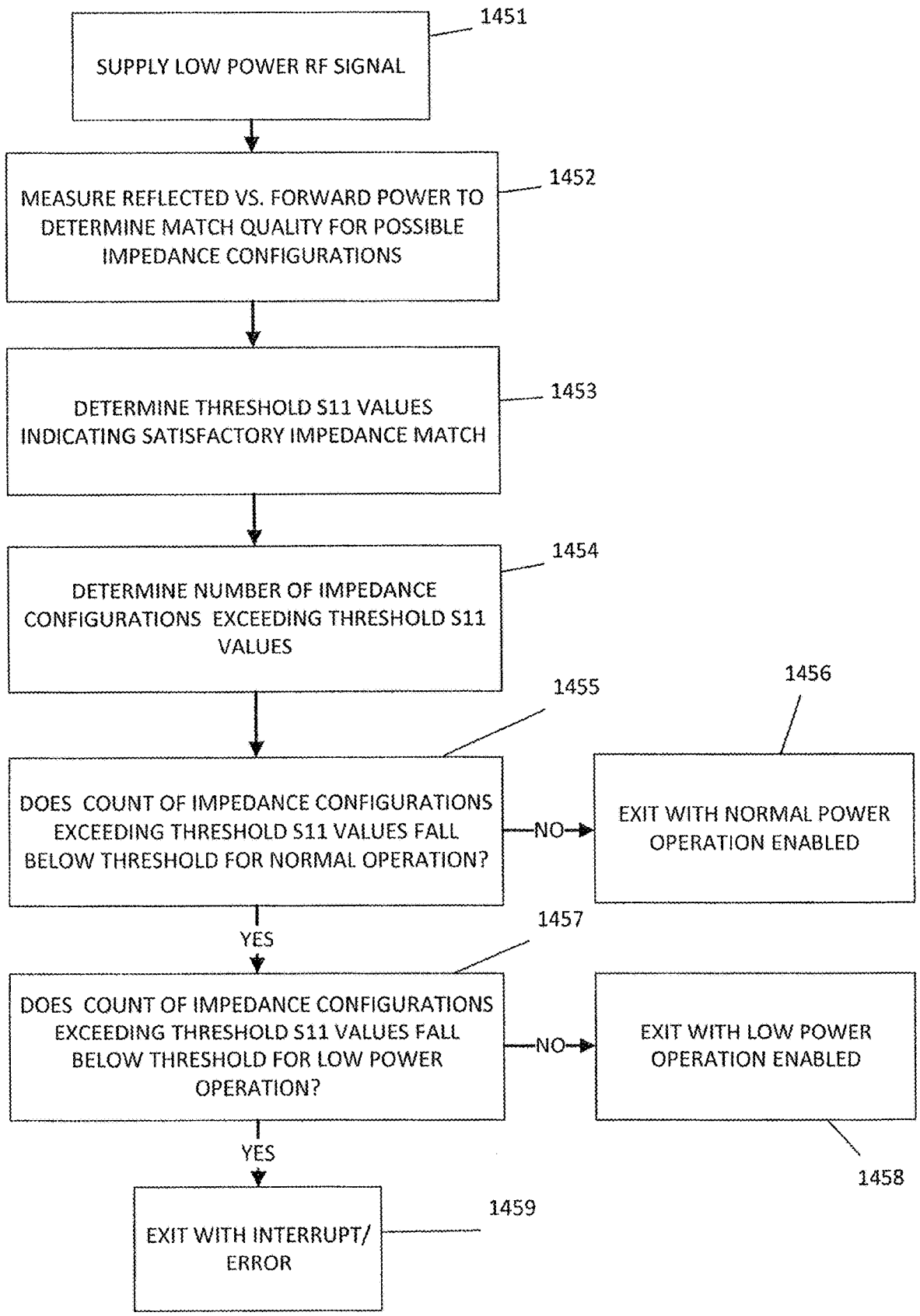
FIG. 14B is a flowchart of an example method for detecting a low-loss load present within the cavity of the defrosting system.

Now that embodiments of the electrical and physical aspects of defrosting systems have been described, various embodiments of methods for operating such defrosting systems will now be described in conjunction with FIGS. 14A, 14B, 17, 18, and 21. More specifically, FIG. 14A is a flowchart of a method of operating a defrosting system (e.g., system 100, 210, 220, 300, 700, 1100, FIGS. 1-3, 7, 11) with dynamic load matching, in accordance with an example embodiment. FIG. 14B is a flowchart of an example method for detecting a low-loss load present within the cavity of the defrosting system, where the method may be executed as part of one of the steps in the method of FIG. 14A or as an independent method.

Referring first to FIG. 14A, the method may begin, in block 1402, when the system controller (e.g., system controller 312, 712, 1130, FIGS. 3, 7, 11) receives an indication that a defrosting operation should start. Such an indication may be received, for example, after a user has placed a load (e.g., load 364, 764, 1164, FIGS. 3, 7, 11) into the system's defrosting cavity (e.g., cavity 360, 760, 1174, FIGS. 3, 7, 11), has sealed the cavity (e.g., by closing a door or drawer), and has pressed a start button (e.g., of the user interface 380, 780, FIGS. 3, 7). In an embodiment, sealing of the cavity may engage one or more safety interlock mechanisms, which when engaged, indicate that RF power supplied to the cavity will not substantially leak into the environment outside of the cavity. As will be described later, disengagement of a safety interlock mechanism may cause the system controller immediately to pause or terminate the defrosting operation.

According to various embodiments, the system controller optionally may receive additional inputs indicating the load type (e.g., meats, liquids, or other materials), the initial load temperature, and/or the load mass. For example, information regarding the load type may be received from the user through interaction with the user interface (e.g., by the user selecting from a list of recognized load types). Alternatively, the system may be configured to scan a barcode visible on the exterior of the load, or to receive an electronic signal from an RFID device on or embedded within the load.

Information regarding the initial load temperature may be received, for example, from one or more temperature sensors and/or IR sensors (e.g., sensors 390, 790, 1192, FIGS. 3, 7, 11) of the system. Information regarding the initial load temperature may be received from the user through interaction with the user interface, or from one or more temperature sensors and/or IR sensors (e.g., sensor 390, 790, 1192, FIGS. 3, 7, 11) of the system. As indicated above, receipt of inputs indicating the load type, initial load temperature, and/or load mass is optional, and the system alternatively may not receive some or all of these inputs. Upper and lower thresholds may be placed on these user-inputs. For example, if a user accidentally enters a mass that is too high (e.g., above a predefined threshold), a user interface (e.g., a user interface of the control panels 120, 214, 224, FIGS. 1, 2) may provide an indication that the input is invalid.

In block 1404, the system controller performs a process of detecting a low-loss load and establishing an initial configuration or state for the variable matching network. This process includes the system controller providing control signals to the variable impedance matching network (e.g., network 370, 400, 440, 772, 800, 900, 1000, 1160, FIGS. 3, 4A, 4B, 7-11). As described in detail in conjunction with FIGS. 4A, 4B, 5A, 5B, and 8-10, the control signals affect the values of various inductances and/or capacitances (e.g., inductances 410, 411, 414, 811, 816, 821, FIGS. 4A, 8, and capacitances 444, 448, 1013, 1018, 1024, FIGS. 4B, 10) within the variable matching network. For example, the control signals may affect the states of bypass switches (e.g., switches 511-514, 551-554, 931-934, 936-939, 941, 943, FIGS. 5A, 5B, 9), which are responsive to the control signals from the system controller (e.g., control signals 521-524, 561-564, 951-954, 956-959, 961, 963, FIGS. 5A, 5B, 9).

FIG. 14B is a flow chart depicting detailed steps that may be implemented by the system controller as part of the execution of block 1404 of FIG. 14A. At block 1451, the system controller causes the RF signal source to supply a relatively low power RF signal through the variable impedance matching network to the electrode(s) (e.g., first electrode 340 or both electrodes 740, 750, 1170, 1172, FIGS. 3, 7, 11). The system controller may control the RF signal power level through control signals to the power supply and bias circuitry (e.g., circuitry 326, 726, FIGS. 3, 7), where the control signals cause the power supply and bias circuitry to provide supply and bias voltages to the amplifiers (e.g., amplifier stages 324, 325, 724, FIGS. 3, 7) that are consistent with a desired signal power level. For example, the relatively low power RF signal may be a signal having a power level in a range of about 10 W to about 20 W, although different power levels alternatively may be used. Supplying a relatively low power level signal during block 1451 may be desirable to reduce the risk of damaging the cavity and/or load (e.g., if the initial match causes high reflected power), and to reduce the risk of damaging the switching components of the variable inductance or capacitance networks (e.g., due to arcing across the switch contacts). Although the application of a lower power level signal at block 1451 may provide the benefits described above, in some applications block 1451 may be optional and the method steps depicted in FIG. 14B may be executed using a relatively high or non-low power level signal.

In block 1452, the system controller provides a sequence of control signals to the variable matching network to cause the variable matching network to iterate or sweep through a sequence of all available network configurations (or a subset of the available configurations) and, consequently, a number of different impedance transformation values. This process, referred to herein as an impedance matching network configuration scan, may involve, for example, causing the variable inductance networks 410, 411, 415, 811, 816, 821 (FIGS. 4A, 8) or variable capacitance networks 422, 444, 446, 448, 1011, 1013, 1016, 1018, 1021, 1024 (FIGS. 4B, 10) to have different inductance or capacitance configurations, or by switching inductors 501-504, 911-914, 916-919, 921, 923, (FIGS. 5A, 9) or capacitors 541-544 (FIG. 5B) into or out of the circuit. Each configuration provides an associated impedance transformation with a given value (e.g., in ohms), which represents the magnitude of the impedance transformation provided by the variable matching network.

While causing the variable impedance matching network to iterate through available impedance transformation values (or impedance transformation network configurations), the system controller (e.g., using power detection circuitry 330, 730, 730', 730", 1180, FIGS. 3, 7, 11)) measures the reflected RF power (and in some embodiments the reflected-to-forward power) (e.g., by continuously or periodically measuring the reflected power along a transmission path (e.g., transmission path 328, 728, 1148, FIGS. 3, 7, 11) between the defrosting system's RF signal source (e.g., RF signal source 320, 720, 1120, FIGS. 3, 7, 11) and the electrode(s) 170, 172). In some embodiments, the measurements may be made for all possible impedance matching network configurations (or at least for a defined subset of impedance matching network configurations). At the completion of block 1452, the system controller has measured or determined, for all impedance matching network configurations (or a subset of possible configurations), a reflected RF power and/or a reflected-to-forward power ratio.

Figure 16A:
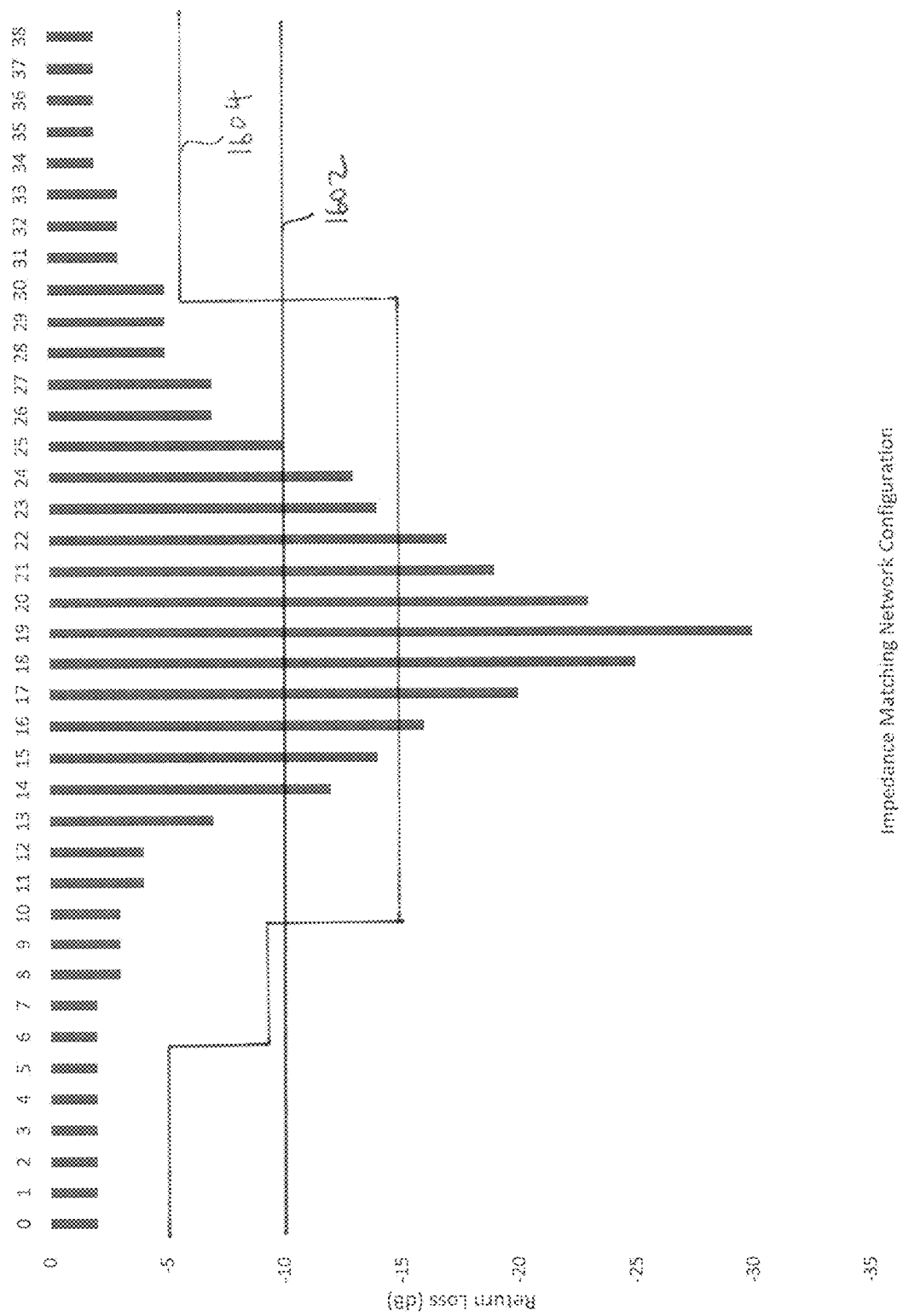
FIGS. 16A and 16B are charts depicting example data sets that may be captured by a system controller from a number of impedance matching network configurations as part of a defrosting process.
Figure 16B:
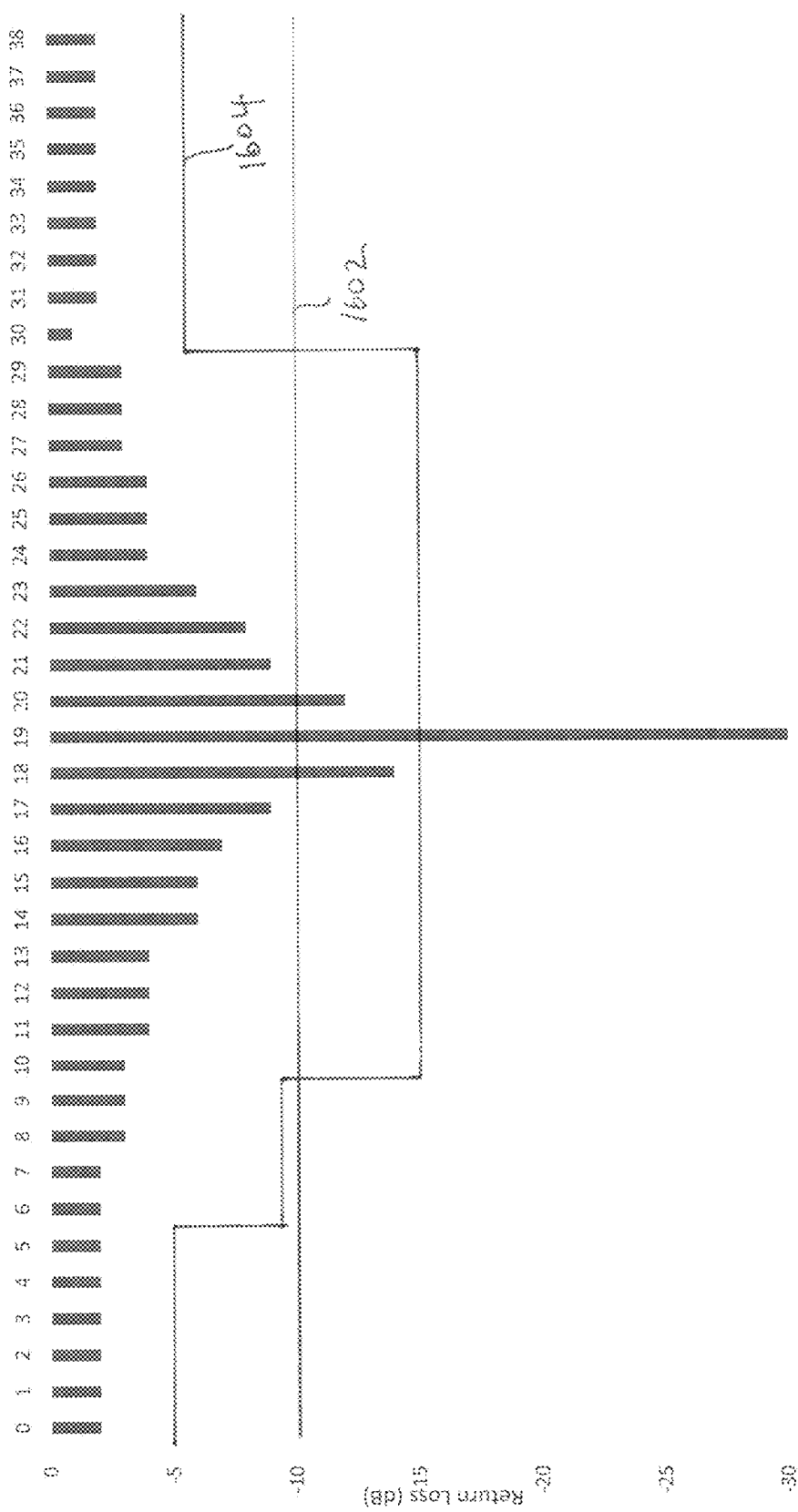

FIGS. 16A and 16B are charts depicting example data sets that may be captured by the system controller in block 1452. In each of FIGS. 16A and 16B, the horizontal axis identifies a specific configuration of the system's variable impedance matching network. More specifically, the impedance configurations along the horizontal axis each represent a different configuration of the system's variable impedance matching network, and the values along the vertical axis represent the return loss, in decibels (dB), for which lower (e.g., more negative) values indicate a better impedance match (i.e., higher absorption of electromagnetic energy by the load). Accordingly, each data point along the horizontal axis represents the impedance matching network being in a different configuration exhibiting a different impedance transformation. Generally, with reference to the figures, the overall impedance transformation provided by the impedance matching network increases from left to right along the horizontal axis. In this example, the vertical axis represents the measured reflected RF power, though in other embodiments, the data set may include reflected-to-forward power values or reflected-to-forward power ratios. Although FIGS. 16A and 16B represent the captured data in a visual chart, it should be understood that the system controller may instead store the captured data in the form of a table or other suitable data structure that relates a particular impedance matching network configuration to the corresponding measured reflected RF power and/or the reflected-to-forward power ratio. Typically, lower reflected RF power values in the charts of FIGS. 16A and 16B indicate a better match between the defrosting system's amplifier and the system's cavity plus load.

Referring also to FIG. 14B, at block 1453, the system controller determines reflected RF power thresholds or reflected-to-forward power thresholds (e.g., S11 parameter thresholds) that may be used to evaluate the data captured in block 1452 to identify a potential low-loss load. In an embodiment, the threshold identified at block 1453 may be used to determine whether a measured reflected RF power or reflected-to-forward power ratio (e.g., the S11 parameter) meets a minimum requirement for effective energy transfer into the load. As illustrated in FIG. 16A, the threshold determined in block 1453 may be a single value across all possible configurations of the variable impedance matching network (e.g., line 1602 represents a constant threshold across all impedance network configurations). Alternatively, different threshold values may be established for different impedance matching network configurations (e.g., line 1604 represents different thresholds being established for different configurations).

The thresholds determined in block 1453 (whether constant for all impedance configurations or being different for different network configurations) may be determined by the system controller using any suitable approach. Typically, the thresholds are predetermined so that the system controller may access a memory to retrieve the threshold or thresholds. Alternatively, the system controller may calculate a suitable threshold or set of thresholds using, for example, attributes of the load provided by a user of the system in block 1402 of FIG. 14A.

The thresholds themselves may be established using any suitable approach. For example, a typical defrosting apparatus may be tested using a number of different sample loads (including potentially both absorptive and low-loss loads) to determine measured reflected RF power values or reflected-to-forward power ratios that are indicative of adequate or satisfactory energy transfer into the load. Those values, once determined, may then be used to determine the threshold values used in block 1453. If a single threshold value is established (e.g., line 1602), that may involve taking an average of a number of different measured reflected RF power or reflected-to-forward power ratios during device characterization to establish the single threshold value.

Alternatively, if multiple threshold values are determined, that may involve, during device characterization, measuring reflected RF power or reflected-to-forward power ratios for each potential configuration of the system's variable impedance matching network. The measured reflected RF power or reflected-to-forward power ratio for each configuration can then be utilized to determine a threshold reflected RF power or reflected-to-forward power ratio indicating adequate energy transfer into the load for that particular network configuration. That analysis can therefore be utilized to determine a suitable threshold reflected RF power or reflected-to-forward power ratio for all possible impedance transformation values of the device's impedance matching network.

With the threshold value or values determined in block 1453, in block 1454 the system controller determines how many different network configurations resulted in a measured reflected RF power or reflected-to-forward power ratio value (i.e., the values that were captured in block 1452) that exceeded the threshold value (e.g., how many configurations resulted in a reflected RF power or reflected-to-forward power ratio below the threshold determined in block 1453).

As discussed above, although a particular impedance transformation value or configuration of the impedance matching network may establish a good match to both an absorptive load and a low-loss load, low-loss loads are characterized in that they tend to form a higher Q resonant circuit with the defrosting system than an absorptive load. Specifically, for a low-loss load, once an optimum impedance match between the system's amplifier and cavity plus load is achieved by setting the system's impedance matching network to a particular impedance matching configuration, small changes to that impedance matching configuration (i.e., small changes in the impedance transformation value of the impedance matching network) can significantly degrade the quality of that impedance match as compared to an absorptive load.

Accordingly, in analyzing the data captured in block 1452 it is the case that for a low-loss load fewer configurations of the impedance matching network would achieve a measured reflected RF power or reflected-to-forward power ratio that exceeds the associated threshold determined in block 1453 than for an absorptive load. Accordingly, by analyzing the data captured in block 1452 to determine the count of different impedance matching configurations for which the measured reflected RF power or reflected-to-forward power ratio exceeded the relevant threshold value it is possible for the system controller to determine whether the load is a low-loss load.

In the example data depicted in FIGS. 16A and 16B, the measured reflected RF power or reflected-to-forward power ratios are measured as negative values, where the lower the measured value, the better the impedance match. Additionally, the thresholds determined in block 1453 are negative values (e.g., the threshold indicated by line 1602 is a constant negative value of −10 dB for all impedance configurations, while the threshold indicated by line 1604 may include different negative values for different network configurations).

Accordingly, a reference to whether a particular threshold level was "exceeded" by the measured reflected RF power or reflected-to-forward power ratio will include determining whether the measured reflected RF power or reflected-to-forward power ratio falls below the threshold level. In other embodiments, though, it will be understood that the reflected RF power or reflected-to-forward power ratio may be measured in a different manner that may result in the measurements having positive values. In that case, the thresholds determined in block 1453 may also have positive values and the determination of whether a particular threshold was exceeded may involve determining whether the measured reflected RF power or reflected-to-forward power ratio was greater than the threshold level.

Accordingly, in block 1454, the system controller determines the number of variable impedance matching network configurations for which the measured reflected RF power or reflected-to-forward power ratio exceeds (in this case, is less than) the relevant threshold indicating that the impedance transformation value in the given configuration provided an acceptable impedance match.

To illustrate, the data depicted in FIGS. 16A and 16B may be evaluated in accordance with block 1454 using an example threshold value of −10 dB (line 1602), although the threshold value may be lower or higher, including having a positive value. In the case of the absorptive load (data for an absorptive load is depicted in FIG. 16A), 11 different impedance matching configurations (i.e., impedance matching configurations 16-24) exceed (or compare favorably to) the determined threshold value of −10 dB indicating that those impedance matching network configurations provided an adequate or acceptable impedance match. Conversely, for the low-loss load for which data is depicted in FIG. 16B, only 3 impedance matching configurations (i.e., impedance matching configurations 18-20) exceed (or compare favorably to) the determined threshold value of −10 dB.

As described below, the count value determined in block 1454 can be used to identify a low-loss load present within the cavity of the defrosting system, and when a low-loss load is identified, then control of the operation of the defrosting system may be modified based upon that determination. In an embodiment, depending on that count value, a defrosting operation may be enabled using normal power levels or low-power levels (e.g., when the value of the count is relatively low indicating that the load may be a low-loss load). In some cases, if, for example, the count determined in block 1454 is very low as compared to relevant threshold values, operation of the defrosting system may be inhibited (e.g., the defrosting operation may be ceased).

Accordingly, at block 1455, the system controller compares the count determined in block 1454 to a first count threshold to determine whether normal device operation is enabled. If the count compares favorably to the first count threshold (in this example, if the count exceeds the first count threshold), the system determines that the load is an absorptive load, and in block 1456, the method of FIG. 14B ends (i.e., returns to block 1410, FIG. 14A) with normal operation of the defrosting system being enabled. In an embodiment, the first count threshold may be at least partially determined by the identification of the impedance matching network configuration that provided the adequate impedance match. Accordingly, different impedance matching network configurations may be associated with different count thresholds.

If the count does not compare favorably to the first count threshold (in this example, if the count is less than the first count threshold), then in block 1457, the system controller compares the count determined in block 1454 to a second count threshold to determine whether low power defrosting system operation is enabled. Typically, the second count threshold is less than the first count threshold. If the count compares favorably to (e.g., is greater than) the second count threshold, that may indicate the load is not an ideal load for energy transfer (i.e., to some degree, the load may be a low-loss load), but that the load may be susceptible to at least partial warming by an applied defrosting process. In that case, in block 1457 the method of FIG. 14B ends (i.e., returns to block 1410, FIG. 14A) with the defrosting system being limited to a low power operation. Such low power operation may enable at least some warming of the load through the application of a defrosting process, but the low-power operation may limit, to at least some degree, the heating of and/or potential damage to components of the defrosting system that may result from the application of a high-power defrosting process to a low-loss load. Typically, the second count threshold (and in some cases the first count threshold) may be determined by system characterization through comparing known lossy and absorptive loads and measuring heating effects of the system's impedance matching network.

If, however, in block 1457 the system controller determines that the count determined in block 1454 falls below the second count threshold, the system controller may, at block 1459, exit the method of FIG. 14B with an error or interrupt message that interrupts or prevents operation of the defrosting system. This step may also cause the system controller to end the method of FIG. 14A and generate an appropriate output message or error to a user of the defrosting system indicating that a problem has occurred. Such a message may indicate that the defrosting system has detected an unsuitable load for the defrosting operation. This outcome may be beneficial because if the count falls below the second threshold value that may indicate that the load is a low-loss load (i.e., a load that is substantially transparent to RF electromagnetic energy). If a defrosting process is applied to such a load (even using a low-power operation of the defrosting system), the load may not be heated or warmed and instead the energy that otherwise would have been absorbed by the load may be dissipated by circuitry of the system, potentially resulting in undesirable heating of various components of the defrosting system.

Referring again to FIG. 14A, once the load has been analyzed, in block 1404, according to the method of FIG. 14B and an appropriate operating mode of the defrosting system is determined—either normal operation or low-power operation (or the defrosting process was interrupted at block 1459), the system controller may perform a process, at block 1410, of adjusting, when appropriate, the configuration of the variable impedance matching network to find an acceptable or optimum match based on actual measurements that are indicative of the quality of the match. While performing block 1410, the system controller may cause the RF signal source to supply a relatively low power RF signal through the variable impedance matching network to the electrode(s) (e.g., first electrode 340 or both electrodes 740, 750, 1170, 1172, FIGS. 3, 7, 11). The system controller may control the RF signal power level through control signals to the power supply and bias circuitry (e.g., circuitry 326, 726, FIGS. 3, 7), where the control signals cause the power supply and bias circuitry to provide supply and bias voltages to the amplifiers (e.g., amplifier stages 324, 325, 724, FIGS. 3, 7) that are consistent with a desired signal power level. For example, the relatively low power RF signal may be a signal having a power level in a range of about 10 W to about 20 W, although different power levels alternatively may be used. Supplying a relatively low power level signal may be desirable to reduce the risk of damaging the cavity and/or load (e.g., if the initial match causes high reflected power), and to reduce the risk of damaging the switching components of the variable inductance or capacitance networks (e.g., due to arcing across the switch contacts).

While supplying the low power signal, power detection circuitry (e.g., power detection circuitry 330, 730, 730', 730", 1180, FIGS. 3, 7, 11) then measures the reflected and (in some embodiments) forward power along the transmission path (e.g., path 328, 728, 1148, FIGS. 3, 7, 11) between the RF signal source and the electrode(s), and provides those measurements to the system controller. The system controller may then determine a ratio between the reflected and forward signal powers, and may determine the S11 parameter (e.g., corresponding to return loss) for the system based on the ratio. The system controller may store the received power measurements (e.g., the received reflected power measurements, the received forward power measurement, or both), and/or the calculated ratios, and/or S11 parameters for future evaluation or comparison, in an embodiment.

The system controller may determine, based on the reflected power measurements, and/or the reflected-to-forward signal power ratio, and/or the S11 parameter, whether or not the match provided by the variable impedance matching network at the evaluation time is acceptable (e.g., the reflected power is below a threshold, or the reflected-to-forward signal power ratio is 10 percent or less (or below some other threshold), or the measurements or values compare favorably with some other criteria). Alternatively, the system controller may be configured to determine whether the match is the "optimum" match. An "optimum" match may be determined, for example, by iteratively measuring the reflected RF power (and in some embodiments the reflected-to-forward power ratio) for all possible impedance matching network configurations (or at least for a defined subset of impedance matching network configurations), and determining which configuration results in the lowest reflected RF power and/or the lowest reflected-to-forward power ratio. In some embodiments, a binary search algorithm or a regional search algorithm may instead be used to identify the "optimum match" configuration that results in the lowest reflected RF power and/or the lowest reflected-to-forward power ratio, which may reduce the amount of time needed to find the optimum match configuration.

When the system controller determines that the match is not acceptable or is not the optimum match, the system controller may adjust the match by reconfiguring the variable impedance matching network. For example, this reconfiguration may be achieved by sending control signals to the variable impedance matching network, which cause the network to increase and/or decrease the variable inductances and/or variable capacitances within the network (e.g., by causing the variable inductance networks 410, 411, 415, 811, 816, 821 (FIGS. 4A, 8) or variable capacitance networks 422, 444, 446, 448, 1011, 1013, 1016, 1018, 1021, 1024 (FIGS. 4B, 10) to have different inductance or capacitance configurations, or by switching inductors 501-504, 911-914, 916-919, 921, 923, (FIGS. 5A, 9) or capacitors 541-544 (FIG. 5B) into or out of the circuit). Then-current inductance values or configurations of variable inductance networks (e.g., inductance values of inductors 410, 411, 415, 811, 816, 821, FIGS. 4A, 8) or capacitance values or configuration of variable capacitance networks (e.g., capacitance values of capacitors 442, 444, 446, 448, 1011, 1013, 1016, 1018, 1021, 1024, FIG. 4B, 10) in the variable impedance matching network may be stored in a memory of the system controller. For each of the variable inductors and variable capacitors, the inductance value and capacitance value associated with a particular evaluation time may be referred to herein as a "current variable component value," and a set of current variable component values for the one or more variable components in the variable inductance or capacitance networks at a particular evaluation time may be referred to herein as a "current variable component value set." After reconfiguring (or adjusting) the variable impedance network, the of adjusting, when appropriate, the configuration of the variable impedance matching network to find an acceptable or optimum match based on actual measurements that are indicative of the quality of the match may be iteratively performed until an acceptable or optimum match is identified.

Alternate methods of identifying the optimum match may instead be applied, which, rather than testing all possible configurations of the variable impedance matching network, only test configurations within a predetermined range of the current configuration. In some embodiments, the predetermined range may be based upon inputs provided by the user in block 1402. For example, for particular types of loads (e.g., frozen meat or frozen soup) having particular weights, optimum impedance configurations may typical fall in particular ranges or the available impedance configurations of the impedance matching network. Accordingly, based on the inputted data, particular ranges can be identified in which an optimum impedance is most likely to be found. That range of impedance configurations can then be iteratively tested to identify an optimum match impedance. For example, some methods may predict which variable impedance matching network configurations to test based on historical configuration data stored in the memory of the defrosting system (e.g., collected during previously performed defrosting/heating operations). In some embodiments, the optimum match may be identified as any variable impedance matching network configuration determined to allow more than a predetermined threshold percentage (e.g., 95%-99%) of the applied RF electromagnetic energy is absorbed by the load.

Once an acceptable or optimum match and the one or more desired signal parameters are determined, the defrosting operation may commence or continue. Commencement or continuation of the defrosting operation includes, in block 1420, causing the RF signal source (e.g., RF signal source 320, 720, 1120, FIGS. 3, 7, 11) to typically produce a RF signal that corresponds to a relatively high power RF signal. If, however, the method of FIG. 14B exited at block 1458, block 1420 may involve the system controller causing the RF signal source to produce an RF signal that corresponds to a relatively low power RF signal. The system controller may control the RF signal parameters, including the RF signal power level, through control signals to the RF signal source and to the power supply and bias circuitry (e.g., circuitry 326, 726, FIGS. 3, 7). The control signals to the RF signal source may control the frequency of the RF signal, for example, and the control signals to the power supply and bias circuitry may cause the power supply and bias circuitry to provide supply and bias voltages to the amplifiers (e.g., amplifier stages 324, 325, 724, FIGS. 3, 7) that are consistent with the desired signal power level. For example, the mass-estimate-based RF signal may be a signal having a power level in a range of about 50 W to about 500 W, although different power levels alternatively may be used.

In block 1422, power detection circuitry (e.g., power detection circuitry 330, 730, 730', 730", 1180, FIGS. 3, 7, 11) then periodically measures the reflected power and, in some embodiments, the forward power along the transmission path (e.g., path 328, 728, 1148, FIGS. 3, 7, 11) between the RF signal source and the electrode(s), and provides those measurements to the system controller. The system controller again may determine a ratio between the reflected and forward signal powers, and may determine the S11 parameter for the system based on the ratio. The system controller may store the received power measurements, and/or the calculated ratios, and/or S11 parameters for future evaluation or comparison, in an embodiment. According to an embodiment, the periodic measurements of the forward and reflected power may be taken at a fairly high frequency (e.g., on the order of milliseconds) or at a fairly low frequency (e.g., on the order of seconds). For example, a fairly low frequency for taking the periodic measurements may be a rate of one measurement every 10 seconds to 20 seconds.

In block 1424, the system controller may determine, based on one or more reflected signal power measurements, one or more calculated reflected-to-forward signal power ratios, and/or one or more calculated S11 parameters, whether or not the match provided by the variable impedance matching network is acceptable. For example, the system controller may use a single reflected signal power measurement, a single calculated reflected-to-forward signal power ratio, or a single calculated S11 parameter in making this determination, or may take an average (or other calculation) of a number of previously-received reflected signal power measurements, previously-calculated reflected-to-forward power ratios, or previously-calculated S11 parameters in making this determination. To determine whether or not the match is acceptable, the system controller may compare the received reflected signal power, the calculated ratio, and/or S11 parameter to one or more corresponding thresholds, for example. For example, in one embodiment, the system controller may compare the received reflected signal power to a threshold of, for example, 5 percent (or some other value) of the forward signal power. A reflected signal power below 5 percent of the forward signal power may indicate that the match remains acceptable, and a ratio above 5 percent may indicate that the match is no longer acceptable. In another embodiment, the system controller may compare the calculated reflected-to-forward signal power ratio to a threshold of 10 percent (or some other value). A ratio below 10 percent may indicate that the match remains acceptable, and a ratio above 10 percent may indicate that the match is no longer acceptable. When the measured reflected power, or the calculated ratio or S11 parameter is greater than the corresponding threshold (i.e., the comparison is unfavorable), indicating an unacceptable match, then the system controller may initiate re-configuration of the variable impedance matching network by returning to block 1410.

Figure 15:
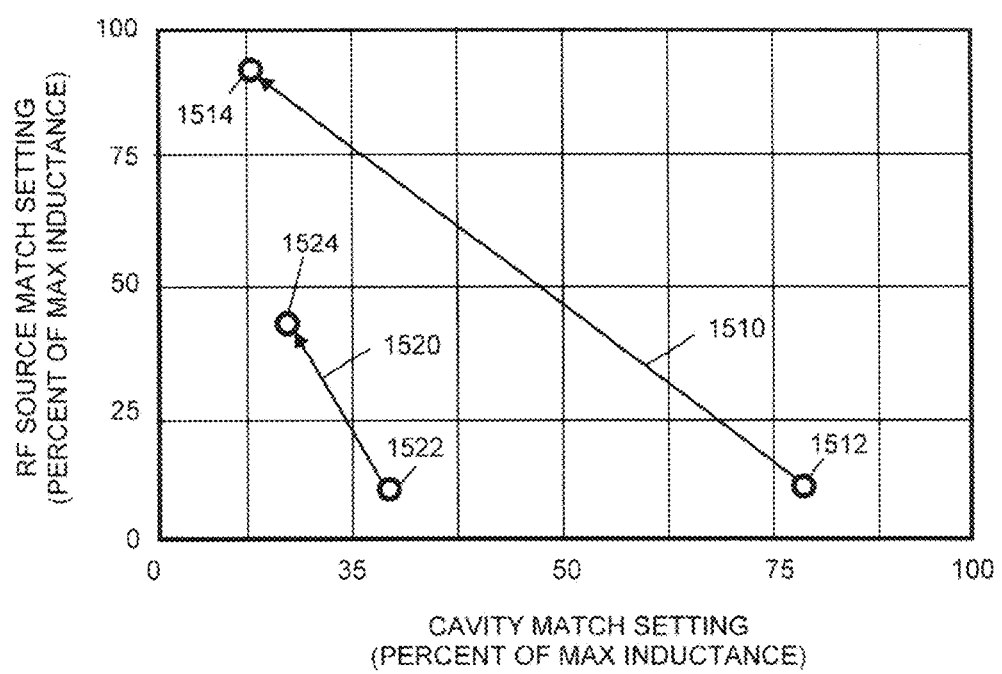
FIG. 15 is a chart plotting cavity match setting versus RF signal source match setting through a defrost operation for two different loads.

As discussed previously, the match provided by the variable impedance matching network may degrade over the course of a defrosting operation due to impedance changes of the load (e.g., load 364, 764, 1164, FIGS. 3, 7, 11) as the load warms up. It has been observed that, over the course of a defrosting operation, an optimal cavity match may be maintained by adjusting the cavity match inductance or capacitance and by also adjusting the RF signal source inductance or capacitance. Referring again to FIG. 15, for example, an optimal match for the first type of load at the end of a defrosting operation is indicated by point 1514, and an optimal match for the second type of load at the end of a defrosting operation is indicated by point 1524. In both cases, tracking of the optimal match between initiation and completion of the defrosting operations involves gradually decreasing the inductance of the cavity match and increasing the inductance of the RF signal source match.

According to an embodiment, in block 1410 when re-configuring the variable impedance matching network, the system controller may take into consideration this tendency. More particularly, when adjusting the match by reconfiguring the variable impedance matching network in block 1414, the system controller initially may select configurations of the variable inductance networks for the cavity and RF signal source matches that correspond to lower inductances (for the cavity match, or network 411, FIG. 4A) and higher inductances (for the RF signal source match, or network 410, FIG. 4B). Similar processes may be performed in embodiments that utilize variable capacitance networks for the cavity and RF signal source. By selecting impedance configurations that tend to follow the expected optimal match trajectories (e.g., those illustrated in FIG. 15), the time to perform the variable impedance matching network reconfiguration process (e.g., in block 1410) may be reduced, when compared with a reconfiguration process that does not take these tendencies into account.

In an alternate embodiment, the system controller may instead iteratively test each adjacent configuration to attempt to determine an acceptable configuration. For example, referring again to Table 1, above, if the current configuration corresponds to configuration 12 for the cavity matching network and to configuration 3 for the RF signal source matching network, the system controller may test configurations 11 and/or 13 for the cavity matching network, and may test configurations 2 and/or 4 for the RF signal source matching network. If those tests do not yield a favorable result (i.e., an acceptable match), the system controller may test configurations 10 and/or 14 for the cavity matching network, and may test configurations 1 and/or 5 for the RF signal source matching network, and so on.

In actuality, there are a variety of different searching methods that the system controller may employ to re-configure the system to have an acceptable impedance match, including testing all possible variable impedance matching network configurations. Any reasonable method of searching for an acceptable configuration is considered to fall within the scope of the inventive subject matter. In any event, once an acceptable match is determined in block 1413, the defrosting operation is resumed in block 1420, and the process continues to iterate.

Referring back to block 1424, when the system controller determines, based on one or more reflected power measurements, one or more calculated reflected-to-forward signal power ratios, and/or one or more calculated S11 parameters, that the match provided by the variable impedance matching network is still acceptable (e.g., the reflected power measurements, calculated ratio, or S11 parameter is less than a corresponding threshold, or the comparison is favorable), the system may undertake a number of steps to evaluate whether or not an exit condition indicating that the defrosting process should be stopped has occurred.

Specifically, in block 1426 the system controller determines a value (typically a numerical value) indicative of the rate of change in the reflected-to-forward signal power ratio, or the system's S11 parameter. As described above, during the defrosting process, the rate of change in the reflected-to-forward signal power ratio is relatively high at the beginning of the defrosting process (e.g., when the food load has a temperature less than −10 degrees Celsius). Towards the end of the defrosting process—as the food load begins to defrost—the rate of change in the reflected-to-forward signal power ratio may decrease somewhat abruptly. This change in the rate of change in the reflected-to-forward signal power ratio may be used to determine or otherwise detect an exit condition for the defrosting process.

Figure 19:
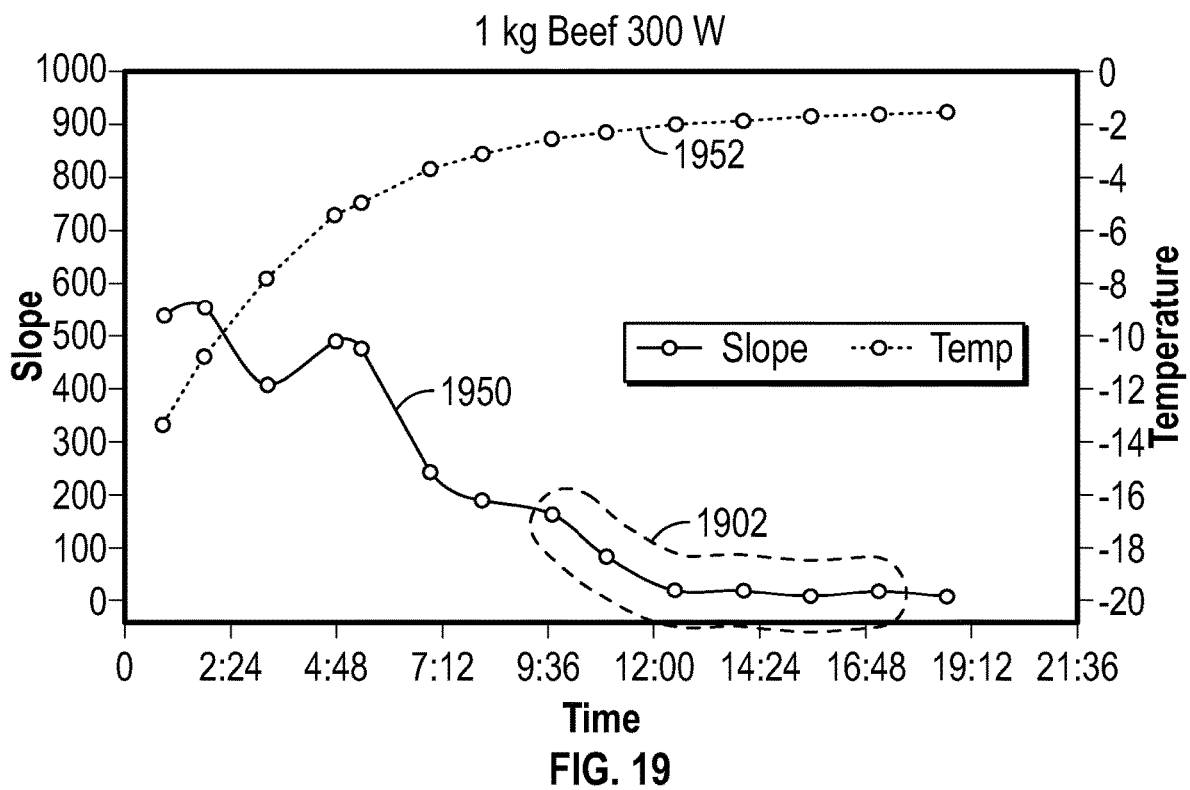
FIG. 19 is a chart depicting rate of change in reflected-to-forward signal power ratio over time for a typical food load during a defrosting process.

To illustrate, FIG. 19 is a chart depicting the rate of change in the reflected-to-forward signal power ratio (left vertical axis, trace 1950) over time (horizontal axis) compared to the load's temperature (right vertical axis, trace 1952) for a typical food load during a defrosting process. As illustrated, at the beginning of the defrosting process (towards the left hand side of the horizontal axis), the temperature of the load is significantly below freezing (e.g., after 2 minutes and 24 seconds of defrosting, the temperature of the load is approximately −10 degrees Celsius). At this time, the rate of change in the reflected-to-forward signal power ratio is relatively high (e.g., after 2 minutes and 24 seconds of defrosting the rate of change (or the slope) in the reflected-to-forward signal power ratio is a value of approximately 500. As the load begins to defrost, however, the temperature of the load increases and the rate of change in the reflected-to-forward signal power ratio decreases. For example, after 12 minutes of defrosting, the temperature of the load has risen to approximately −2 degrees and the rate of change or slope in the reflected-to-forward signal power ratio has fallen to approximately 20. The characteristics of the rate of change in the reflected-to-forward signal power ratio is typical of food loads being defrosted and is independent of the size of the food load being defrosted. Accordingly, as reflected in the data depicted in FIG. 19, therefore, it is possible to estimate the temperature of a food load being defrosted based upon the rate of change in the reflected-to-forward signal power ratio.

In block 1426, the system controller may determine the rate of change in the reflected-to-forward signal power ratio or a value indicative of the rate of change in the reflected-to-forward signal power ratio in any suitable manner. In an embodiment, for example, each time block 1426 is executed as part of the depicted control loop, the system controller may measure the current reflected-to-forward signal power ratio and store that value in a memory accessible to the system controller in association with a current time of the defrosting process. By storing multiple reflected-to-forward signal power ratios over time, the system controller can calculate a rate of change of the reflected-to-forward signal power ratio over time. For example, after multiple executions of block 1426, the system controller may have stored a number of values of reflected-to-forward signal power ratio with associated defrosting process times as depicted in Table 2, below.

TABLE 2

Historical reflected-to-forward signal power ratio data

| Reflected-to-Forward Signal Power Ratio | Defrosting Process Time |
|---|---|
| 0.0207 | 2 |
| 0.0242 | 4 |
| 0.0272 | 6 |
| 0.0306 | 8 |
| 0.0341 | 10 |
| 0.0379 | 12 |
| 0.0415 | 14 |
| 0.0464 | 16 |
| 0.0505 | 18 |
| 0.0554 | 20 |
| 0.0600 | 22 |
| 0.0649 | 24 |
| 0.0703 | 26 |
| 0.0755 | 28 |
| 0.0804 | 30 |
| 0.0859 | 32 |
| 0.0916 | 34 |
| 0.0965 | 36 |
| 0.1025 | 38 |
| 0.1080 | 40 |
| 0.1131 | 42 |
| 0.1188 | 44 |
| 0.1239 | 46 |

In Table 2, the first column represents the reflected-to-forward signal power ratios that have been detected in several executions of block 1426 and stored in the memory accessible to the system controller and the second column stores the defrosting time at which each of the measurements in the first column was detected.

The system controller can then determine the current rate of change in the reflected-to-forward signal power ratio by determining the difference between the most recently detected reflected-to-forward signal power ratio measurement and the immediately preceding reflected-to-forward signal power ratio and dividing that difference by the difference between the time the most recent reflected-to-forward signal power ratio was detected and the time the immediately preceding reflected-to-forward signal power ratio was detected. For example, using the data depicted in Table 2, the current rate of change in the reflected-to-forward signal power ratio may be determined by the following equation: Current Rate of Change=absolute $(RatioN-RatioN-1)/(TimeN-TimeN-1)$, in which RatioN is the most recently detected reflected-to-forward signal power ratio, RatioN−1 is the preceding detected reflected-to-forward signal power ratio, and TimeN and TimeN−1 are the time (e.g., measure in seconds or milliseconds) at which each ratio was detected, respectively. According to this equation, the current rate of change is always positive as the value is an indicator of the rate of change and it is not necessary to determine the direction (higher or lower) of that change.

In this manner, the system controller may determine the rate of change in the reflected-to-forward signal power ratio. Although this approach only relies on the current and preceding detected reflected-to-forward signal power ratios, in other embodiments, the system controller may use two or more previously-detected reflected-to-forward signal power ratio to calculate the current rate of change in the reflected-to-forward signal power ratio. For example, the rate of change in the reflected-to-forward signal power ratio may be calculated using the following equation: Current Rate of Change=$((RatioN-RatioN-1)/(TimeN-TimeN-1)+(RatioN-1-RatioN-2)/(TimeN-1-TimeN-2))/2$. By averaging together the rate of change over multiple detected reflected-to-forward signal power ratios in this manner, it may be possible to smooth fluctuations in the reflected-to-forward signal power ratio data that may otherwise create inaccurate rates of change estimations.

In block 1428 the system controller determines a value indicative of whether the load is a low-loss load. As described below, the value may be a numerical point score determined based upon an analysis of the impedance match generated by the defrosting system's impedance matching network. The defrosting system may be characterized to determine which of the system's impedance matching network configurations tend to establish an acceptable impedance match to low-loss loads and which configurations tend to establish an acceptable match to absorptive loads. The impedance matching network configurations associated with low-loss loads can then be associated with a lower point score or weight than the configurations that tend to match only absorptive loads. Those point scores or weights can then be used, as described below, to determine an overall point score for a particular load. The point score will be greater if the sweep of impedance matching network configurations identifies configurations typically associated with absorptive loads as establishing an acceptable impedance match rather than configurations that were associated with low-loss loads during system characterization.

For example, during characterization of a defrosting system, an impedance matching network configuration sweep may be performed across a number of different configurations of the variable impedance matching network using a known low-loss load (e.g., a plastic cup of water). It is then determined which impedance matching network configurations provided an acceptable match (e.g., a match with a relatively low return loss). Those configurations may then be associated with a relatively low point score (e.g., a score of "1" point). An additional impedance matching network configuration sweep may then be performed across a number of different configurations using a known absorptive load (e.g., a frozen steak). It is then determined which network configurations provided an acceptable match. Those configurations may then be associated with a relatively high point score (e.g., a score of "3" points). Impedance matching network configurations that provide an acceptable match for both low-loss and absorptive loads may be associated with an intermediate point score (e.g., a score of "2" points).

Following an impedance matching network configuration sweep for an unknown load (e.g., a load that may be a low-loss load or an absorptive load), a total score can be calculated based upon the point scores associated with each impedance matching network configuration that provided an acceptable impedance match, as described below. In this embodiment, the score will tend to be higher for absorptive loads than for low-loss loads.

Figure 20:
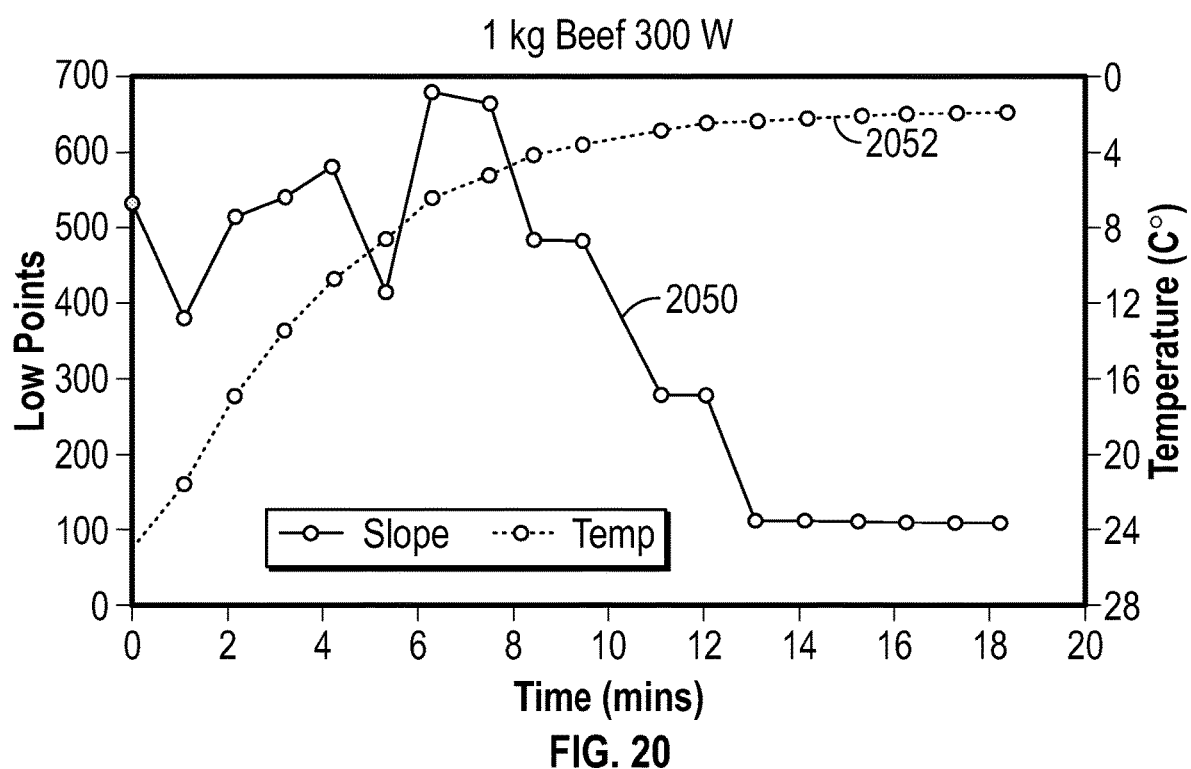
FIG. 20 is a chart depicting a relationship between a total point score indicating whether a load is a low-loss load versus time for a typical food load during a defrosting operation.

To illustrate, FIG. 20 is a chart depicting the relationship between the total point score (left vertical axis, trace 2050)

versus time (horizontal axis) compared to the load's temperature (right vertical axis, trace 2052) for a typical food load during a defrosting operation. As illustrated, at the beginning of the defrosting process (towards the left hand side of the horizontal axis), the temperature of the load is significantly below freezing (e.g., after 2 minutes of defrosting, the temperature of the load is approximately −18 degrees Celsius). At this time, the point score is relatively high (e.g., after 2 minutes of defrosting the point score is approximately 500 indicating that the load is an absorptive load. As the load begins to defrost, however, the temperature of the load increases and, as more of the load is converted into water, the point score decreases. For example, after 12 minutes of defrosting, the temperature of the load has risen to approximately −2 degrees and the point score has fallen to 290.

As reflected in the data depicted in FIG. 20, therefore, it is possible to estimate the temperature of a food load being defrosted based upon the current point score.

Figure 21:
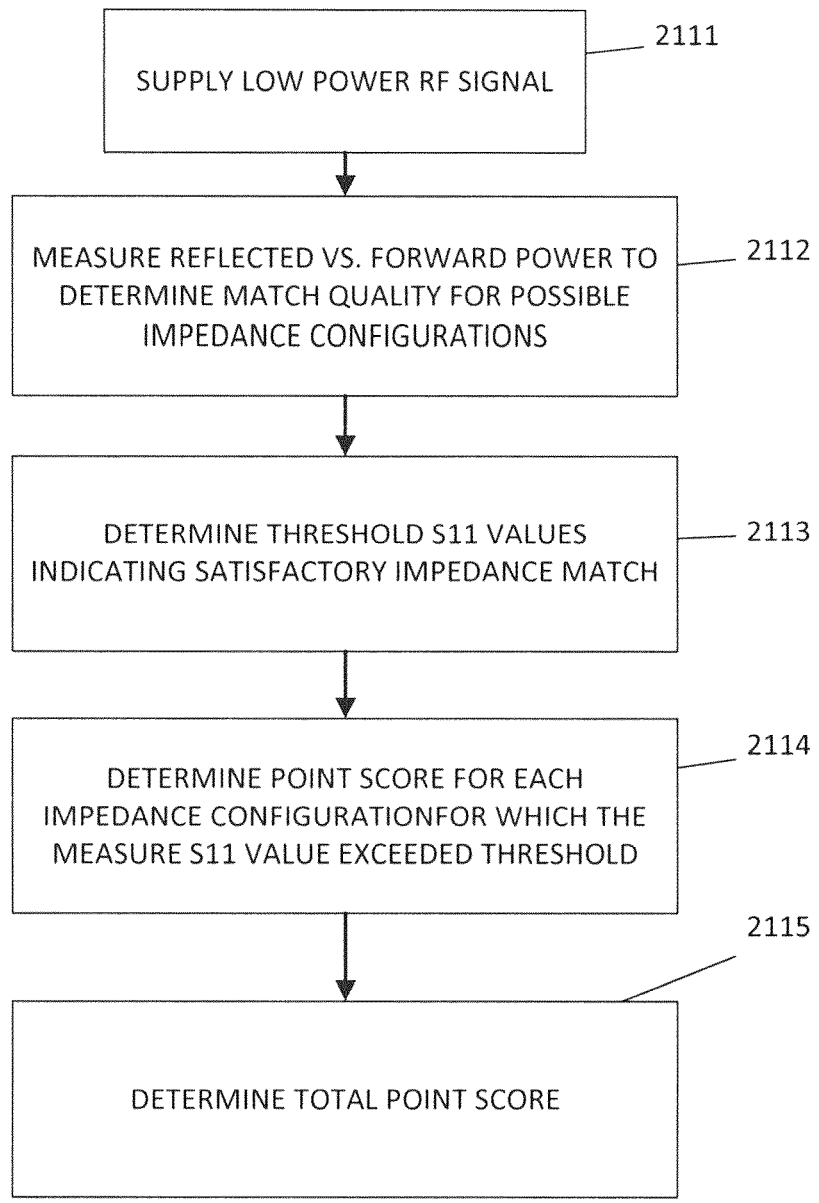
FIG. 21 is a flowchart depicting a method for determining a point score indicative of whether a load in a defrosting system is a low-loss load.

As a specific example, FIG. 21 is a flowchart of a method for determining a point score indicative of whether the load in the defrosting system is a low-loss load. At block 2111, the system controller causes the RF signal source to supply a relatively low power RF signal through the variable impedance matching network to the electrode(s) (e.g., first electrode 340 or both electrodes 740, 750, 1170, 1172, FIGS. 3, 7, 11). The system controller may control the RF signal power level through control signals to the power supply and bias circuitry (e.g., circuitry 326, 726, FIGS. 3, 7), where the control signals cause the power supply and bias circuitry to provide supply and bias voltages to the amplifiers (e.g., amplifier stages 324, 325, 724, FIGS. 3, 7) that are consistent with a desired signal power level. For example, the relatively low power RF signal may be a signal having a power level in a range of about 10 W to about 20 W, although different power levels alternatively may be used. The application of a lower power level signal at block 2111 may, in some applications, be optional and the method steps depicted in FIG. 21 may be executed using a relatively high or non-low power level signal.

In block 2112, the system controller provides a sequence of control signals to the variable impedance matching network to cause the variable matching network to iterate through a sequence of all available network configurations (or a subset of the available configurations). This may involve, for example, causing the variable inductance networks 410, 411, 415, 811, 816, 821 (FIGS. 4A, 8) or variable capacitance networks 422, 444, 446, 448, 1011, 1013, 1016, 1018, 1021, 1024 (FIGS. 4B, 10) to have different inductance or capacitance states, or by switching inductors 501-504, 911-914, 916-919, 921, 923, (FIGS. 5A, 9) or capacitors 541-544 (FIG. 5B) into or out of the circuit. Each configuration provides an associated impedance transformation with a given value (e.g., in ohms), which represents the magnitude of the impedance transformation provided by the variable matching network.

While causing the variable impedance matching network to iterate through available impedance transformation values (or impedance matching network configurations), the system controller (e.g., using power detection circuitry 330, 730, 1180, FIGS. 3, 7, 11)) measures the reflected RF power (and in some embodiments the reflected-to-forward power) (e.g., by continuously or periodically measuring the reflected power along a transmission path (e.g., transmission path 328, 728, 1148, FIGS. 3, 7, 11) between the defrosting system's RF signal source (e.g., RF signal source 320, 720, 1120, FIGS. 3, 7, 11) and the electrode(s) 170, 172). In some embodiments, the measurements may be made for all possible impedance matching network configurations (or at least for a defined subset of impedance matching network configurations). At the completion of block 2112, the system controller has measured or determined, for all possible impedance matching network configurations (or a subset of possible configurations), a reflected RF power and/or the reflected-to-forward power ratio.

At block 2113, the system controller determines reflected RF power thresholds or the reflected-to-forward power ratio that may be used to evaluate the data captured in block 2112 to identify a potential low-loss load. In an embodiment, the thresholds identified at block 2113 may be used to determine whether a measured reflected RF power or reflected-to-forward power ratio meets a minimum requirement for effective energy transfer into the load.

The thresholds determined in block 2113 may be a single value across all possible network configurations of the variable impedance matching network. Alternatively, different threshold values may be established for different network configurations.

The thresholds determined in block 2113 (whether constant for all impedance configurations or being different for different network configurations) may be determined using any suitable approach. Typically, the thresholds are predetermined so that the system controller may access a memory to retrieve the threshold or thresholds. Alternatively, the system controller may calculate a suitable threshold or set of thresholds using, for example, attributes of the load provided by a user of the system in block 1402 of FIG. 14A.

With the threshold value or values determined in block 2113, in block 2114 the system controller determines a point score associated with each impedance matching network configuration for which the measured reflected RF power or reflected-to-forward power ratio exceeded the threshold value for that network configuration. The point scores for those impedance matching network configurations may be stored a suitable data structure (e.g., a table or numerical array) in a memory accessible to the system controller. Typically the point scores are stored so that each configuration of the impedance matching network is associated with a particular point score. For example, Table 3, below provides an example listing of point scores that may be associated with particular impedance matching network configurations of an example impedance matching network.

TABLE 3

Point scores associated with different impedance matching network configurations

| Impedance Matching Network Configuration No. | Point Score |
|---|---|
| 0 | 1 |
| 1 | 1 |
| 2 | 2 |
| 3 | 2 |
| 4 | 2 |
| 5 | 3 |
| 6 | 3 |
| 7 | 3 |
| 8 | 3 |
| 9 | 3 |
| 10 | 3 |
| 11 | 3 |
| 12 | 3 |
| 13 | 3 |
| 14 | 3 |
| 15 | 3 |

TABLE 3-continued

Point scores associated with different impedance matching network configurations

| Impedance Matching Network Configuration No. | Point Score |
|---|---|
| 16 | 3 |
| 17 | 3 |
| 18 | 2 |
| 19 | 2 |
| 20 | 2 |
| 21 | 2 |
| 22 | 2 |
| 23 | 1 |
| 24 | 1 |
| 25 | 1 |
| 26 | 1 |

Accordingly, with reference to the listing of point scores, the system controller determines the point score associated with each impedance matching network configuration for which the measured reflected RF power or reflected-to-forward power ratio exceeded the threshold value for that network configuration. The scores are then added together or otherwise combined at block 2115 to determine a total point score.

In still other embodiments, the system controller may calculate a score indicative of whether the load is a low-loss load by varying other attributes of the defrosting system's energy delivery to the load to determine the rate at which the impedance match between the system's amplifier and the cavity containing the load degrades to detect a low-loss load. As an example, the system controller may be configured to modify the frequency of the RF signal generated by the system's amplifier and generate a score based upon the rate at which the impedance match between the load and the system's amplifier degrades in response to those frequency changes.

For example, the system controller may first identify the impedance matching network configuration that provides an optimal impedance match. This may involve, for a given RF signal frequency, measuring reflected RF power and/or forward-to-reflected RF power ratios at a number of different impedance matching network configurations and identifying the configuration that provides the lowest reflected RF power and/or forward-to-reflected RF power ratio. With the optimum configuration identified, the system controller modifies the frequency of the RF signal generated by the system's amplifier and delivered to the system's electrode (e.g., if the optimal match is established with an RF signal having a frequency of 10.0 MHz, the system may set the frequency of the RF signal to 11 MHz or 9 MHz for the next round of measurements). The system controller then again measures reflected RF power and/or forward-to-reflected RF power ratio while supplying the RF signal at the different frequency and calculates a ratio of the change in the impedance match (i.e., the rate of change of the measured reflected RF power and/or forward-to-reflected RF power ratio) to the change in frequency of the RF signal. The rate of change in the measured reflected RF power and/or forward-to-reflected RF power ratio will be greater for low-loss loads than for absorptive loads. Accordingly, the rate of change, once calculated may be utilized to calculate a numeric score indicative of the presence of a low-loss load.

After the completion of blocks 1426 and 1428 the system controller has determined numeric values that are indicative of attributes of the load that may be used to determine when the load has defrosted and the defrosting process should be stopped. Specifically, at the completion of block 1426 the system controller has determined a numerical value that is indicative of the rate of change in the reflected-to-forward signal power ratio. The numerical value may be the rate of change itself, or a scaled numerical value that is based on or at least partially determined by the rate of change in the reflected-to-forward signal power ratio (e.g., a weighted or scaled value). Similarly, at the completion of block 1428 the system controller has determined a score value that is indicative of the dielectric loss of the load, which can, in turn, be used to determine whether the load can be characterized as a low-loss load.

As explained above and illustrated in FIGS. 19 and 20, both of these numerical values change with the temperature of the load during the defrosting in a manner that is independent of the load's weight or contents (e.g., poultry, beef, pork, fish, dessert, fruit, and the like). And, as such, the values can be used to determine when the load has reached a defrosted state.

As depicted in both FIGS. 19 and 20, as the temperature of the load increases and the load begins to defrost, the rate of change of both the rate of change in the reflected-to-forward signal power ratio and the determined points indicative of the dielectric loss of the load decreases (see, for example, region 1902 of FIG. 19). This can make it difficult in both cases to determine when the values have transitioned across respective thresholds indicating that the load has reached a defrosted state.

To mitigate this difficulty, in block 1430 the system controller determines a numeric end point indicator value by combining the rate of change in the reflected-to-forward signal power ratio determined in block 1426 and the points indicative of the dielectric loss of the load determined in block 1428 via a numerical operation. The numerical operation may include multiplying or summing the two values together. In some cases, a weighting can be applied to one or more of the values to adjust their respective contributions to the final calculated end point indicator.

Although independently the rate of change in the reflected-to-forward signal power ratio determined and the points indicative of the dielectric loss of the load exhibit reduced rates of change as the load approaches the defrosted state, the end point indicator value, being a combination of the two values, exhibit a greater rate of change as the load approaches the defrosted state. This increased rate of change can make it easier to determine when the end point indicator has passed a predetermined threshold indicating that the load has reached a defrosted state.

Figure 22A:
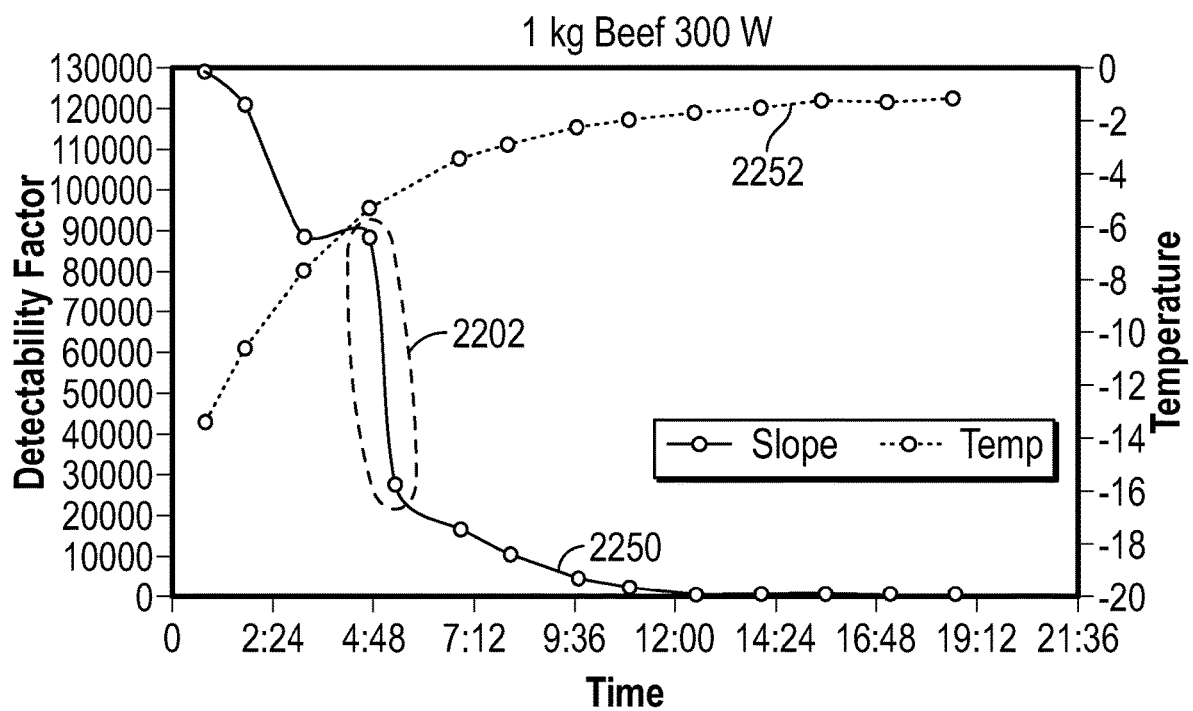
FIGS. 22A and 22B are charts depicting an end point indicator value versus time for a typical food load during a defrosting process.
Figure 22B:
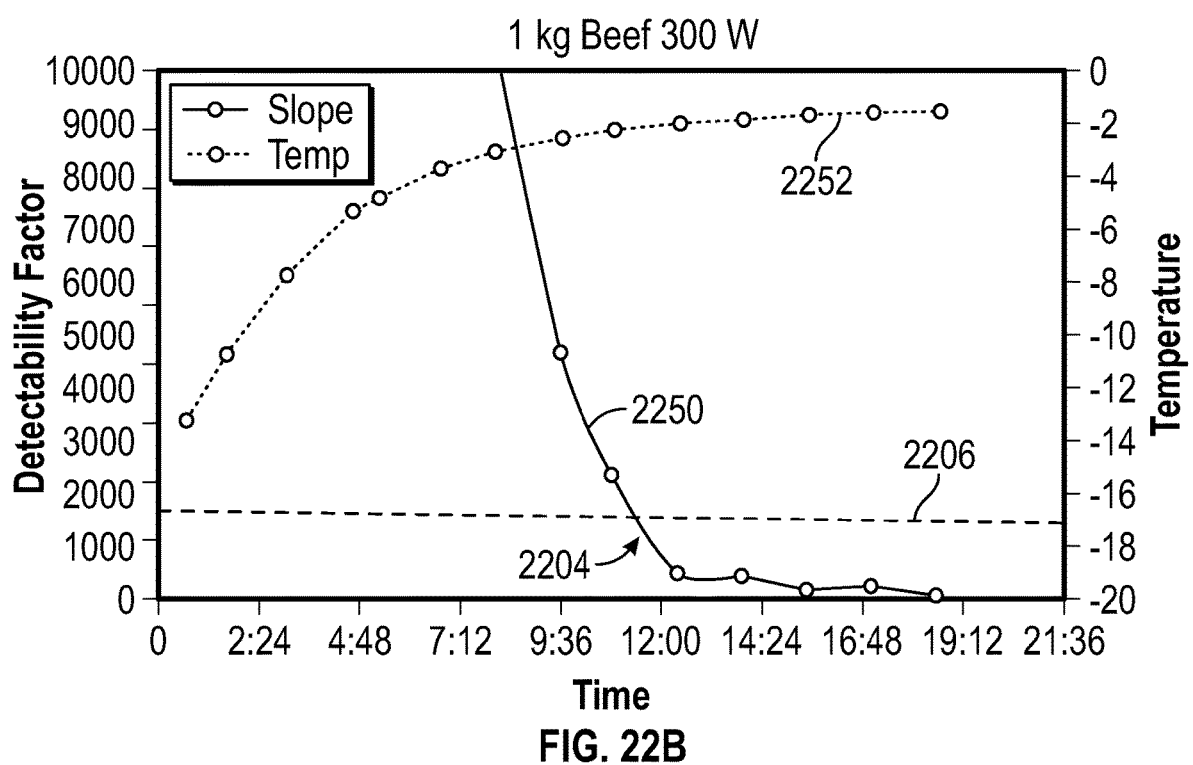

To illustrate, FIGS. 22A and 22B are charts depicting the end point indicator value (left vertical axis, trace 2250) versus time (horizontal axis) compared to the load's temperature (right vertical axis, trace 2252) for a typical food load during a defrosting process. FIG. 22B shows the same data as FIG. 22A, but with the scale of the vertical axis so as to show end point indicator values between 0 and 10,000. As illustrated, at the beginning of the defrosting process (towards the left hand side of the horizontal axis), the temperature of the load is significantly below freezing (e.g., after 2 minutes and 24 seconds of defrosting, the temperature of the load is approximately −9 degrees Celsius). As the defrosting process continues and the temperature of the load increases, the end point indicator value decreases. As the load approaches a defrosted state, the rate at which the end point indicator value decreases significantly (see, for example, region 2202 of FIG. 22A) until the end point indicator value reaches a minimum ranges of values (see point 2204 on FIG. 22B) at which time the rate of change in the end point indicator value decreases.

Because the end point indicator value varies with the temperature of the load and is not affected by the size of the load or the starting temperature of the load, the end point indicator value can be used to determine when the load has reached a desired defrosted state (e.g., a temperature slightly below freezing, such as −2 degrees Celsius). With reference to FIG. 22B, for example, a threshold 2206 end point indicator value may be defined. If the end point indicator value falls below that threshold 2206, the load may be determined to be defrosted and the defrosting process can be interrupted with the load being in a known defrosted state.

Accordingly, referring to FIG. 14A, at block 1432 the system controller, after determining the end point indicator value in block 1430, determines whether an exit condition has been satisfied in block 1432. The determination of whether an exit condition has met may involve comparing the end point indicator value to one or more thresholds to determine whether the current defrosting process should be stopped or interrupted, or whether the defrosting process can continue (either in a low-power or high-power operating mode). For example, with reference to FIG. 22B, the exit condition may be the end point indicator value determined in block 1430 falling below threshold 2206.

In some embodiments, a user may provide an input at block 1402 that at least partially determines the threshold to which the end point indicator value is compared. For example, the user may enter a desired temperature of the food load at the completion of the defrosting process (e.g., −4 degrees Celsius or −1 degrees Celsius). Upon receipt of the desired end temperature, the system controller can convert that input into an end point indicator value that correlates to that desired end state temperature.

In addition to the determination that the end point indicator value falls below the threshold, several other conditions, if detected, may also warrant cessation of the defrosting operation. For example, each of the rate of change in the reflected-to-forward signal power ratio and the points indicative of the dielectric loss of the load may be compared against independent thresholds and the system controller can determine an exit condition has been met if either value is determined to have fallen below its respective threshold. This comparison of each of the rate of change in the reflected-to-forward signal power ratio and the points indicative of the dielectric loss of the load to their own respective threshold may occur in addition to the comparison of the end point indicator value to its own threshold.

In some embodiments, the system controller may determine that an exit condition has occurred when a safety interlock is breached. Alternatively, the system may determine that an exit condition has occurred upon expiration of a timer that was set by the user (e.g., through user interface 380, 780, FIGS. 3, 7) or upon expiration of a timer that was established by the system controller based on the system controller's estimate of maximum amount of time that may be required from the defrosting operation to completed.

If an exit condition has not occurred, then the defrosting operation may continue by iteratively performing blocks 1422, 1424, 1426, 1428, and 1430 (and the matching network reconfiguration process 1410, as necessary). When an exit condition has occurred, then in block 1434, the system controller causes the supply of the RF signal by the RF signal source to be discontinued. For example, the system controller may disable the RF signal generator (e.g., RF signal generator 322, 722, FIGS. 3, 7) and/or may cause the power supply and bias circuitry (e.g., circuitry 326, 726, FIGS. 3, 7) to discontinue provision of the supply current. In addition, the system controller may send signals to the user interface (e.g., user interface 380, 780, FIGS. 3, 7) that cause the user interface to produce a user-perceptible indicia of the exit condition (e.g., by displaying "door open" or "done" on a display device, or providing an audible tone). The method may then end.

It should be understood that the order of operations associated with the blocks depicted in FIGS. 14A and 14B corresponds to an example embodiment, and should not be construed to limit the sequence of operations only to the illustrated order. Instead, some operations may be performed in different orders, and/or some operations may be performed in parallel.

As described above, FIG. 14B is a flowchart depicting a method for detecting a low-loss load present before or during the operation of a defrosting system. In that method, a sweep is performed of available configurations of the system's impedance matching network and a count is performed of the number of configurations that provide an acceptable match to perform the heating or defrost operation. The count (i.e., the total number of configurations that provide an acceptable match) can be compared to one or more count thresholds to detect a potential low-loss load and thereby control operation of the defrosting system.

In another embodiment, however, rather than rely on a simple count of a number of impedance matching network configurations, a number of points (or a weighting) may be associated with the different impedance matching configurations, enabling an overall score to be calculated for a particular load, where the score can be compared to various score thresholds to identify a potential low-loss load (or an absorptive load), and to control device operation accordingly.

The method of detecting a low-loss load depicted above with respect to FIG. 14B distinguishes a low-loss load by an analysis of reflect RF power or forward-to-reflected RF power ratios (e.g., the S11 parameter) captured for a number of different configurations of the device's impedance matching network. Specifically, a system controller determines, for a particular load in the defrosting system's heating cavity, a number of different impedance matching network configurations that provide an impedance transformation that enables RF electromagnetic energy transfer into the load. Then, depending upon the number of impedance matching network configurations that provide an acceptable impedance match, the system controller can distinguish an absorptive load from a low-loss load. As described above, because low-loss loads establish a high-Q network with the defrosting system as compared to absorptive loads, fewer configurations of the impedance matching network will provide an acceptable match for a low-loss load than for an absorptive load.

In some defrosting systems, different impedance matching network configurations may be more likely to establish an adequate impedance match for a low-loss load than other configurations. Similarly, some impedance matching network configurations may be more likely to establish an adequate impedance match for an absorptive load than other configurations. Accordingly, in addition to analyzing the count of impedance matching network configurations that provide an acceptable impedance match to detect low-loss loads, the system controller can analyze which specific configurations established an acceptable impedance match to detect low-loss loads. Specifically, different impedance matching network configurations may be associated with different point scores or weights and the system controller can use those point scores to calculate an overall (total) point score indicative of whether or not the current load is a low-loss load.

A defrosting system may be characterized to determine which of the system's impedance matching network configurations tend to establish an acceptable impedance match to low-loss loads and which configurations tend to establish an acceptable match to absorptive loads. The configurations associated with low-loss loads can then be associated with a lower point score or weight than the configurations that tend to match only absorptive loads. Those point scores or weights can then be used, as described below and illustrated in the method of FIG. 17, to determine an overall point score for a particular load. The point score will be greater if the sweep of impedance matching network configurations identifies configurations typically associated with absorptive loads as establishing an acceptable impedance match rather than configurations that were associated with low-loss loads during system characterization.

For example, during characterization of a defrosting system, an impedance matching network configuration sweep may be performed across a number of different configurations of the variable impedance matching network using a known low-loss load (e.g., a plastic cup of water). It is then determined which impedance matching network configurations provided an acceptable match (e.g., a match with a relatively low return loss). Those configurations may then be associated with a relatively low point score (e.g., a score of "1" point). An additional impedance matching network configuration sweep may then be performed across a number of different configurations using a known absorptive load (e.g., a frozen steak). It is then determined which network configurations provided an acceptable match. Those configurations may then be associated with a relatively high point score (e.g., a score of "3" points). Impedance matching network configurations that provide an acceptable match for both low-loss and absorptive loads may be associated with an intermediate point score (e.g., a score of "2" points).

Following an impedance matching network configuration sweep for an unknown load (e.g., a load that may be a low-loss load or an absorptive load), a total score can be calculated based upon the point scores associated with each impedance matching network configuration that provided an acceptable impedance match. In this embodiment, the score will tend to be higher for absorptive loads than for low-loss loads. Accordingly, by comparing the total score for an unknown load to a score threshold, the system controller can determine whether the load is likely to be a low-loss load or an absorptive load and can then take appropriate action. If the total score for a particular load exceeds the score threshold, the load is more likely to be an absorptive load than if the total score does not exceed the threshold.

Figure 17:
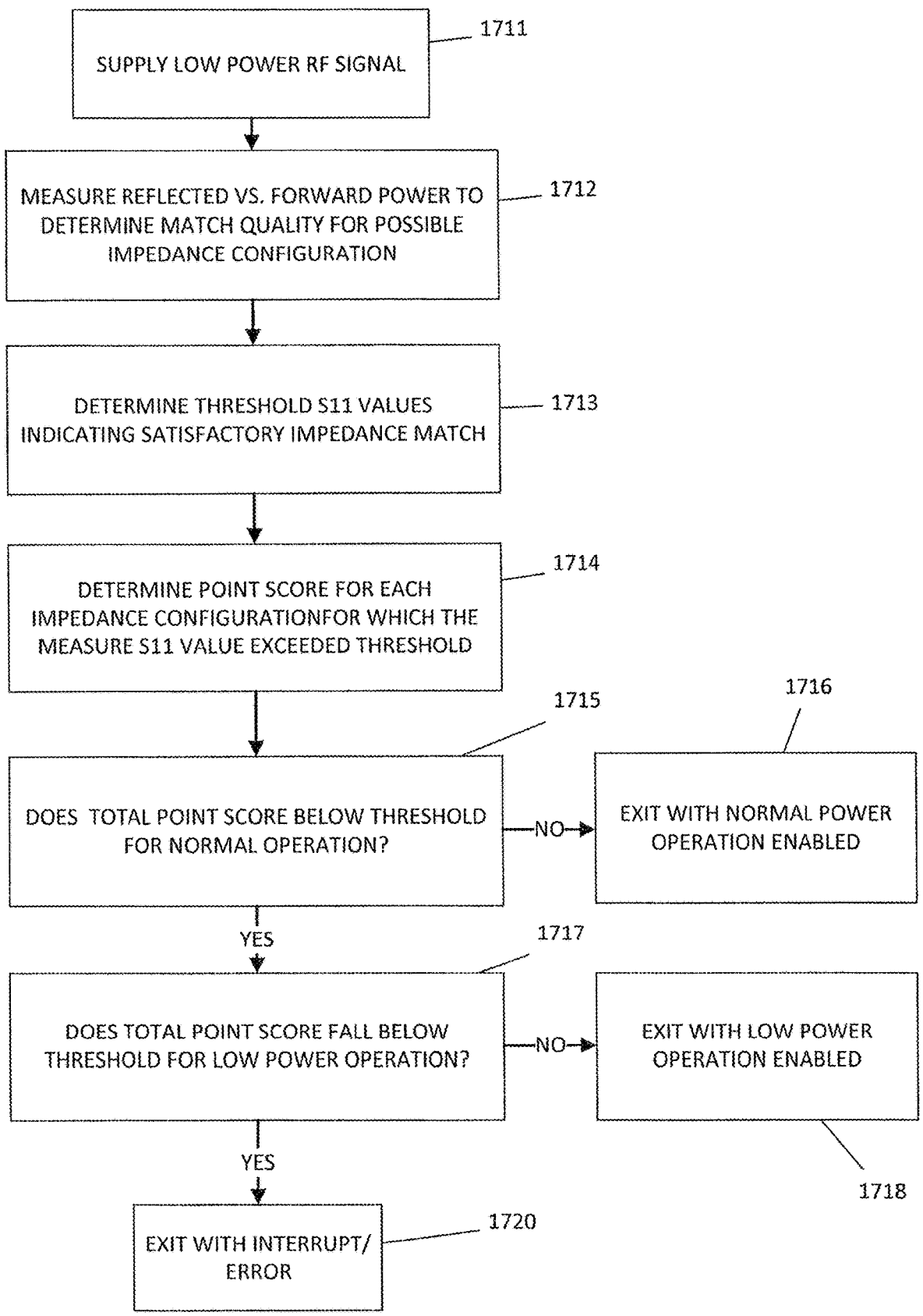
FIG. 17 is a flowchart of a method for detecting a low-loss load present within the cavity of the defrosting system by calculating a score based upon RF power measurements made for a variety of impedance matching network configurations.

To illustrate, FIG. 17 is a flowchart of a method for detecting a low-loss load present within the cavity of the defrosting system by calculating a score based upon RF power measurements made during a sweep of impedance matching network configurations. The method of FIG. 17 may be executed as part of one of the steps in the method of FIG. 14A or as an independent method. Specifically, FIG. 17 is a flow chart depicting detailed steps that may be implemented by the system controller as part of the execution of block 1404 of FIG. 14A. At block 1711, the system controller causes the RF signal source to supply a relatively low power RF signal through the variable impedance matching network to the electrode(s) (e.g., first electrode 340 or both electrodes 740, 750, 1170, 1172, FIGS. 3, 7, 11). The system controller may control the RF signal power level through control signals to the power supply and bias circuitry (e.g., circuitry 326, 726, FIGS. 3, 7), where the control signals cause the power supply and bias circuitry to provide supply and bias voltages to the amplifiers (e.g., amplifier stages 324, 325, 724, FIGS. 3, 7) that are consistent with a desired signal power level. For example, the relatively low power RF signal may be a signal having a power level in a range of about 10 W to about 20 W, although different power levels alternatively may be used. Supplying a relatively low power level signal during block 1711 may be desirable to reduce the risk of damaging the cavity and/or load (e.g., if the initial match causes high reflected power), and to reduce the risk of damaging the switching components of the variable inductance or capacitance networks (e.g., due to arcing across the switch contacts). Although the application of a lower power level signal at block 1711 may provide the benefits described above, in some applications block 1711 may be optional and the method steps depicted in FIG. 17 may be executed using a relatively high or non-low power level signal.

In block 1712, the system controller provides a sequence of control signals to the variable matching network to cause the variable matching network to iterate through a sequence of all available network configurations (or a subset of the available configurations). This may involve, for example, causing the variable inductance networks 410, 411, 415, 811, 816, 821 (FIGS. 4A, 8) or variable capacitance networks 422, 444, 446, 448, 1011, 1013, 1016, 1018, 1021, 1024 (FIGS. 4B, 10) to have different inductance or capacitance states, or by switching inductors 501-504, 911-914, 916-919, 921, 923, (FIGS. 5A, 9) or capacitors 541-544 (FIG. 5B) into or out of the circuit. Each configuration provides an associated impedance transformation with a given value (e.g., in ohms), which represents the magnitude of the impedance transformation provided by the variable matching network.

While causing the variable impedance matching network to iterate through available impedance transformation values (or impedance matching network configurations), the system controller (e.g., using power detection circuitry 330, 730, 1180, FIGS. 3, 7, 11)) measures the reflected RF power (and in some embodiments the reflected-to-forward power) (e.g., by continuously or periodically measuring the reflected power along a transmission path (e.g., transmission path 328, 728, 1148, FIGS. 3, 7, 11) between the defrosting system's RF signal source (e.g., RF signal source 320, 720, 1120, FIGS. 3, 7, 11) and the electrode(s) 170, 172). In some embodiments, the measurements may be made for all possible impedance matching network configurations (or at least for a defined subset of impedance matching network configurations). At the completion of block 1712, the system controller has measured or determined, for all possible impedance matching network configurations (or a subset of possible configurations), a reflected RF power and/or the reflected-to-forward power ratio.

At block 1713, the system controller determines reflected RF power thresholds or the reflected-to-forward power ratio that may be used to evaluate the data captured in block 1712 to identify a potential low-loss load. In an embodiment, the threshold identified at block 1713 may be used to determine whether a measured reflected RF power or reflected-to-forward power ratio meets a minimum requirement for effective energy transfer into the load.

As illustrated in FIG. 16A and described above, the threshold determined in block 1713 may be a single value across all possible network configurations of the variable impedance matching network (e.g., line 1602 represents a constant threshold across all impedance network configurations). Alternatively, different threshold values may be established for different network configurations (e.g., line 1604 represents different thresholds being established for different impedance configurations).

The thresholds determined in block 1713 (whether constant for all impedance configurations or being different for different network configurations) may be determined using any suitable approach. Typically, the thresholds are predetermined so that the system controller may access a memory to retrieve the threshold or thresholds. Alternatively, the system controller may calculate a suitable threshold or set of thresholds using, for example, attributes of the load provided by a user of the system in block 1402 of FIG. 14A.

With the threshold value or values determined in block 1713, in block 1714 the system controller determines a point score associated with each impedance matching network configuration for which the measured reflected RF power or reflected-to-forward power ratio exceeded the threshold value for that network configuration. The point scores for all acceptable configurations may be stored a suitable data structure (e.g., a table or numerical array) in a memory accessible to the system controller. Typically the point scores are stored so that each configuration of the impedance matching network is associated with a particular point score. For example, Table 4, below provides an example listing of point scores that may be associated with particular impedance matching network configurations of an example impedance matching network.

TABLE 4

Point scores associated with different impedance matching network configurations

| Impedance Matching Network Configuration No. | Point Score |
|---|---|
| 0 | 1 |
| 1 | 1 |
| 2 | 2 |
| 3 | 2 |
| 4 | 2 |
| 5 | 3 |
| 6 | 3 |
| 7 | 3 |
| 8 | 3 |
| 9 | 3 |
| 10 | 3 |
| 11 | 3 |
| 12 | 3 |
| 13 | 3 |
| 14 | 3 |
| 15 | 3 |
| 16 | 3 |
| 17 | 3 |
| 18 | 2 |
| 19 | 2 |
| 20 | 2 |
| 21 | 2 |
| 22 | 2 |
| 23 | 1 |
| 24 | 1 |
| 25 | 1 |
| 26 | 1 |

Accordingly, with reference to the listing of point scores, the system controller determines the point score associated with each impedance matching network configuration for which the measured reflected RF power or reflected-to-forward power ratio exceeded the threshold value for that network configuration. The scores are then added together or otherwise combined to determine a total point score.

To illustrate, the data depicted in FIGS. 16A and 16B may be evaluated in accordance with block 1714 using a threshold value of −10 dB (line 1602). In the case of the absorptive load (depicted in FIG. 16A), 11 different network configurations (i.e., network configurations 16-24) exceed (or compare favorably to) the determined threshold value of −10 dB. A total point score may therefore be calculated by combining the number of points associated with each of the acceptable impedance matching network configurations 16-24 in Table 4, above. For example, a total point score of 17 may be determined by summing 3, 3, 2, 2, 2, 2, 2, 1, and 1, the point scores associated with configurations 16, 17, 18, 19, 20, 21, 22, 23, and 24, respectively.

Conversely, for the low-loss load for which data is depicted in FIG. 16B, 3 impedance transformation values (i.e., impedance transformation values 18-20) exceed (or compare favorably to) the determined threshold value of −10 dB. A total point score may therefore be calculated by combining the number of points associated with each of impedance matching network configurations 18-20 in Table 4, above. For example, a total point score of 6 may be determined by summing 2, 2, and 2, the point scores associated with configurations 18, 19, and 20, respectively.

The total point scores determined in block 1714 can be used to potentially identify a low-loss load present within the cavity of the defrosting system and to control the operation of the defrosting system based upon that determination. In an embodiment, depending on the total point score, a defrosting operation may be enabled using normal power levels or low-power levels (e.g., when the total points are relatively low indicating that the load may be a low-loss load). In some cases, if, for example, the total point score determined in block 1714 is sufficiently low, operation of the defrosting system may be inhibited.

Accordingly, at block 1715, the system controller compares the total point score determined in block 1714 to a first point threshold to determine whether normal device operation is enabled. If the total point score compares favorably to the first point threshold (in this example, if the total point score exceeds the first point threshold), which indicates that the load is an absorptive load, in block 1716 the method of FIG. 17 ends (i.e., returns to block 1410, FIG. 14A) with normal operation of the defrosting system being enabled. In embodiments, the first count threshold may be a predetermined value or may be at least partially determined by the identification of the impedance matching network configuration that provided the adequate impedance match. Accordingly, different impedance matching network configurations may be associated with different point thresholds.

If the total point score calculated in block 1714 does not compare favorably to the first point threshold, in block 1717 the system controller compares the total point score determined in block 1714 to a second point threshold to determine whether low power defrosting system operation is enabled. Typically, the second point threshold is less than the first point threshold. If the total point score compares favorably to (e.g., is greater than) the second point threshold, that may indicate the load is not an ideal load for energy transfer (i.e., to some degree, the load may be a low-loss load), but that the load may be susceptible to at least partial warming by an applied defrosting process. In that case, in block 1718 the method of FIG. 17 ends (i.e., returns to block 1410, FIG. 14A) with the defrosting system being limited to a low power operation. Such low power operation may enable at least some warming of the load through the application of a defrosting process, but the low-power operation may limit, to at least some degree, undesirable heating of components of the defrosting system.

If, however, in block 1717 the system controller determines that the total point score determined in block 1714 falls below the second point threshold, that indicates that the load is a low-loss load and the system controller may, at block 1720, exit the method of FIG. 17 with an error or interrupt message that interrupts of prevents operation of the defrosting system. This step may also cause the system controller to end the method of FIG. 17 while generating an appropriate output message or error to a user of the defrosting system indicating that a problem has occurred. Such a message may indicate that the defrosting system has detected an unsuitable load for the defrosting operation. This outcome may be beneficial because if the total point score falls below the second threshold value, that may indicate that the load is a low-loss load (i.e., a load that is substantially transparent to RF electromagnetic energy). If a defrosting process is applied to such a load (even using a low-power operation of the defrosting system), the load may not warm and undesirable heating of various components of the defrosting system may result.

As described above, low-loss loads are distinguishable from absorptive loads in that low-loss loads form high Q networks with the defrosting system, while absorptive loads form lower Q networks with the system. Accordingly, for both types of loads, the system's impedance matching network may have at least one configuration that achieves an acceptable impedance match to the load (and, in that respect, the loads may appear similar), but by analyzing how the quality of the impedance match changes as the configuration of the impedance matching network or the RF signal being supplied to the load changes, it may be possible for the system controller of the defrosting system to detect a low-loss load, and to adjust or cease operations accordingly.

In one embodiment of the present system, therefore, the system controller is configured to determine the rate at which the impedance match degrades as the impedance transformation provided by the impedance matching network differs from an optimal value associated with an acceptable impedance match. For example, the system controller may first identify the impedance matching network configuration that provides an optimal impedance match. This may involve sweeping the impedance matching network through a number of configurations and measuring reflected RF power and/or forward-to-reflected RF power ratios for each impedance matching network configuration to identify the configuration that provides the lowest reflected RF power and/or forward-to-reflected RF power ratio. The system controller then sets the impedance matching network to other configurations reflecting small changes in impedance transformation provided by the network (e.g., if the optimal match is at configuration "11", the system controller may set the network to a configuration of "10" and/or "12" by adjusting the value of one variable component). The system controller measures reflected RF power and/or a forward-to-reflected RF power ratio in those other configurations and calculates a rate of change in the impedance match (i.e., the rate of change of the measured reflected RF power and/or forward-to-reflected RF power ratio) to the rate of change in impedance associated with the different impedance matching network configurations. The rate of change in the measured reflected RF power and/or forward-to-reflected RF power ratio will be greater for low-loss loads than for absorptive loads. Accordingly, the rate of change, once calculated, may be utilized to detect low-loss loads.

For example, a low-loss load may typically be associated with a rate of change of measured reflected RF power and/or forward-to-reflected RF power ratio per change in impedance matching network configuration, while absorptive loads may be associated with lower rates of change for the same changes in impedance matching network configurations. Accordingly, if the system controller determines that the optimum impedance matching network configuration of "11" is associated with a measured reflected RF power and/or forward-to-reflected RF power ratio of −11 dB and that the impedance matching network configuration of "10" is associated with a measured reflected RF power and/or forward-to-reflected RF power ratio of −5 dB, the system controller calculates the rate of change as +6 dB per change in impedance matching network configuration. The system controller compares the rate of change to the threshold of +2 dB per impedance matching network configuration. Because the threshold rate is exceeded, the system controller may determine that the load is a low-loss load and can modify or cease operations accordingly.

In still other embodiments, the system controller may vary other attributes of the defrosting system's energy delivery to the load to determine the rate at which the impedance match between the system's amplifier and the cavity containing the load degrades to detect a low-loss load. As an example, the system controller may be configured to modify the frequency of the RF signal generated by the system's amplifier and measure the rate at which the impedance match between the load and the system's amplifier degrades in response to those frequency changes. For example, the system controller may first identify the impedance matching network configuration that provides an optimal impedance match. This may involve, for a given RF signal frequency, measuring reflected RF power and/or forward-to-reflected RF power ratios at a number of different impedance matching network configurations and identifying the configuration that provides the lowest reflected RF power and/or forward-to-reflected RF power ratio. With the optimum configuration identified, the system controller modifies the frequency of the RF signal generated by the system's amplifier and delivered to the system's electrode (e.g., if the optimal match is established with an RF signal having a frequency of 10.0 MHz, the system may set the frequency of the RF signal to 11 MHz or 9 MHz for the next round of measurements). The system controller then again measures reflected RF power and/or forward-to-reflected RF power ratio while supplying the RF signal at the different frequency and calculates a ratio of the change in the impedance match (i.e., the rate of change of the measured reflected RF power and/or forward-to-reflected RF power ratio) to the change in frequency of the RF signal. The rate of change in the measured reflected RF power and/or forward-to-reflected RF power ratio will be greater for low-loss loads than for absorptive loads. Accordingly, the rate of change, once calculated may be utilized to detect low-loss loads.

For example, a low-loss load may typically be associated with a rate of change of measured reflected RF power and/or forward-to-reflected RF power ratio to frequency that is greater than +2 dB per MHz, while absorptive loads may be associated with lower rates of change. Accordingly, if the system controller determines that the measured reflected RF power and/or forward-to-reflected RF power ratio at a nominal frequency of 10.0 MHz is −11 dB and that the RF signal having a frequency of 11 MHz is associated with a measured reflected RF power and/or forward-to-reflected RF power ratio of −5 dB, the system controller calculates the rate of change as +6 dB per MHz. The system controller compares the rate of change to the threshold of +2 dB per MHz. Because the threshold rate is exceeded, the system controller may determine that the load is a low-loss load and can modify operations accordingly.

Figure 18:
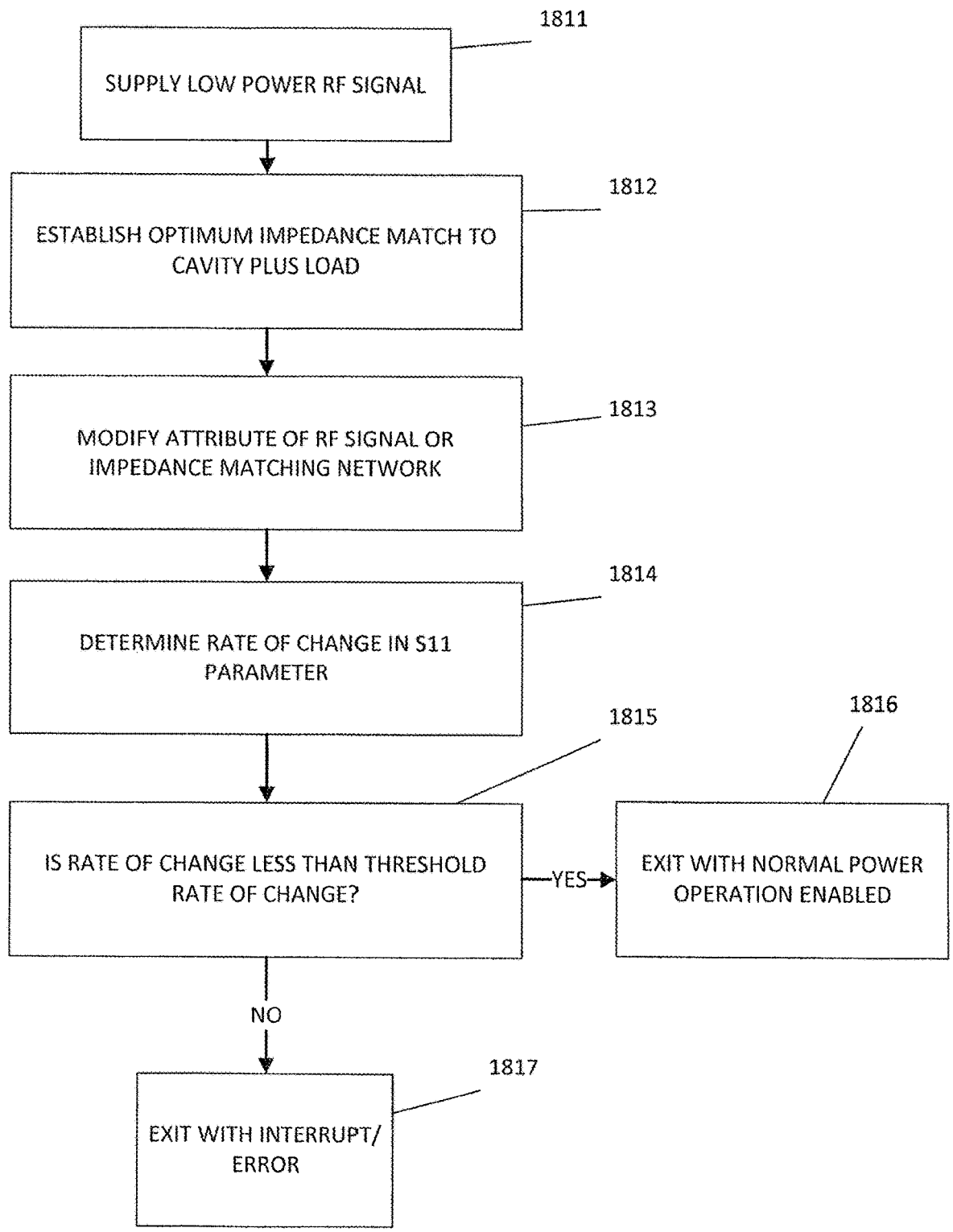
FIG. 18 is a flowchart of a general method for detecting a low-loss load present within the cavity of the defrosting system.

To illustrate, FIG. 18 is a flowchart of a general method for detecting a low-loss load present within the cavity of the defrosting system. The method of FIG. 18 may be executed as part of one of the steps in the method of FIG. 14A or as an independent method. Specifically, FIG. 18 is a flow chart depicting detailed steps that may be implemented by the system controller as part of the execution of block 1404 of FIG. 14A. At block 1811, the system controller causes the RF signal source to supply a relatively low power RF signal through the variable impedance matching network to the electrode(s). For example, the relatively low power RF signal may be a signal having a power level in a range of about 10 W to about 20 W, although different power levels alternatively may be used. Although the application of a lower power level signal at block 1811 may provide the benefits described above, in some applications block 1811 may be optional and the method steps depicted in FIG. 18 may be executed using a relatively high or non-low power level signal.

In block 1812, the system controller performs a process, referred to herein as an impedance matching network configuration scan, that identifies a configuration of the impedance matching network that provides an optimum or optimum impedance match to the system's cavity plus load. This may involve the system controller sweeping the impedance matching network through a number of different configurations and, for each configuration, measuring the reflected RF power (and in some embodiments the reflected-to-forward power). The system controller can then identify the optimum configuration by determining which configuration provides the lowest reflected RF power and/or the lowest reflected-to-forward power ratio, for example.

At block 1813, the system controller modifies the configuration of the defrosting system's impedance matching network or a frequency of the RF signal being supplied to the load and again measures the reflected RF power (and in some embodiments the reflected-to-forward power). Using the measured reflected RF power captured in blocks 1813 and 1812 the system can, at block 1814, determine a rate of change in the reflected RF power and/or the reflected-to-forward power ratio.

In block, 1815 the system controller compares the rate of change determined in block 1814 to a threshold rate of change value. If the rate of change is less than the threshold, the system controller may determine that the load is an absorptive load and, in block 1816, normal operation of the defrosting system is enabled. But if the rate of change is greater than the threshold, the system controller may determine that the load is a low-loss load and, in block 1817, operation of the defrosting system may be interrupted. This step may also cause the system controller to generate an appropriate output message or error to a user of the defrosting system indicating that a problem has occurred. Such a message may indicate that the defrosting system has detected an unsuitable load for the defrosting operation.

FIGS. 14B, 17, and 18 and the discussion above describe a number of approaches for detecting a low-loss load within the cavity of a defrosting system. The various methods may be executed at the beginning of a defrosting process so as to detect a potential low-loss load before a defrosting process is initiated. In other embodiments, however, the methods of FIGS. 14B, 17, and 18 and described herein may be executed during an on-going defrosting process to detect a low-loss load even after defrosting has started. For example, some loads, when subjected to a defrosting process, may transition from what appears to be an absorptive load (i.e., a load that absorbs RF electromagnetic energy) into a low-loss load (i.e., a load that is transparent to RF electromagnetic energy). For example, if the load is, initially, predominantly made up of ice, when the ice melts into liquid water, the load absorbs less RF electromagnetic energy than when the load was frozen. Accordingly, the load may become, effectively, a low-loss load. Upon detecting this transition, the system controller may determine, for example, that the load has been defrosted and stop or otherwise interrupt the defrosting process. Accordingly, the detection of the transition of the load from an absorptive load into a low-loss load can be used to control the defrosting process and, specifically, to determine an end point of that process.

Accordingly, the low-loss detection methods of FIGS. 14B, 17, and 18 that are described herein may be executed routinely during an on-going defrosting process. With reference to FIG. 14A, which depicts an example method for implementing a defrosting process, one or more of the methods of FIGS. 14B, 17, and 18 and described herein may be executed as part of the impedance matching network reconfiguration block 1410. In that case, each time the system controller performs a sweep of impedance matching network configurations to identify a configuration that provides an optimum impedance match, the system controller can also analyze the measure reflected RF power and/or reflected-to-forward power ratio (e.g., the S11 parameter) to determine whether the load has become a low-loss load. If so, the system controller can interrupt the defrosting process to prevent unwanted heating of components of the defrosting system.

In an example embodiment, a system includes a radio frequency (RF) signal source configured to supply an RF signal, an electrode coupled to the RF signal source, and a transmission path between the RF signal source and the electrode. The transmission path is configured to convey the RF signal from the RF signal source to the electrode to cause the electrode to radiate RF electromagnetic energy into a cavity. The system includes power detection circuitry coupled to the transmission path and configured to repeatedly measure RF power values including at least one of forward RF power values and reflected RF power values along the transmission path. The system includes a controller configured to determine a rate of change of the RF power values, determine a low-loss indicator value using the RF power values, wherein the low-loss indicator is at least partially determined by a dielectric loss of a load in the cavity, determine, using the rate of change of the RF power values and the low-loss indicator, that the load is in a defrosted state, and cause the RF signal source to stop supplying the RF signal.

In another embodiment, a thermal increase system includes a radio frequency (RF) signal source configured to supply an RF signal to an electrode to cause the electrode to radiate RF electromagnetic energy, power detection circuitry configured to repeatedly measure RF power values of the RF electromagnetic energy to generate a plurality of RF power values, and a controller. The controller is configured to determine that a load proximate to the electrode is in a defrosted state based on a rate of change of the plurality of RF power values and a low-loss indicator value determined using the RF power values. The low-loss indicator is at least partially determined by a dielectric loss of the load. The controller is configured to determine one or more signal parameters of the RF signal in response to determining the load is in the defrosted state.

In another embodiment, a method includes supplying, by a radio frequency (RF) signal source, one or more RF signals to a transmission path that is electrically coupled between the RF signal source and one or more electrodes that are positioned proximate to a cavity to cause the one or more electrodes to radiate RF electromagnetic energy. The method includes periodically measuring, by measurement circuitry, an RF power value of the RF signal along the transmission path, resulting in RF power values and determining, by a controller, a rate of change of the RF power values. The method includes determining, by the controller, a low-loss indicator value using the RF power values. The low-loss indicator is at least partially determined by a dielectric loss of a load in the cavity. The method includes determining, by the controller and using the rate of change of the RF power values and the low-loss indicator, that the load is in a defrosted state and causing, by the controller, the RF signal source to stop supplying the RF signal.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system comprising:
   a radio frequency (RF) signal source configured to supply an RF signal;
   an electrode coupled to the RF signal source;
   a transmission path between the RF signal source and the electrode, wherein the transmission path is configured to convey the RF signal from the RF signal source to the electrode to cause the electrode to radiate RF electromagnetic energy into a cavity;
   power detection circuitry coupled to the transmission path and configured to repeatedly measure RF power values including at least one of forward RF power values and reflected RF power values along the transmission path;
   a variable impedance network coupled between the RF signal source and the electrode, the variable impedance network including at least one variable component having at least one component configuration so that the variable impedance network is configurable into a number of distinct network states; and
   a controller configured to:
      determine a rate of change of the RF power values,
      determine a low-loss indicator value using the RF power values, wherein the low-loss indicator value is at least partially determined by a dielectric loss of a load in the cavity by:
         measuring a plurality of RF power values, wherein each RF power value in the plurality of RF power values is associated with a different component configuration of the at least one variable component and a different one of the number of distinct network states; and
         determining a first number of RF power values in the plurality of RF power values that are greater than a first power value threshold,
      determine, using the rate of change of the RF power values and the low-loss indicator value, that the load is in a defrosted state, and
      cause the RF signal source to stop supplying the RF signal.

2. The system of claim 1, wherein the controller is configured to determine the low-loss indicator value by:
   for each RF power value in the plurality of RF power values, determining a point score associated with the RF power value, wherein the point score is at least partially determined by the component configuration associated with the RF power value;
   using the point score for each RF power value to determine a total point score; and
   determining the low-loss indicator value using the total point score.

3. The system of claim 1, wherein the controller is configured to determine the low-loss indicator value by:
   determining a rate of change of the plurality of RF power values; and
   determining the low-loss indicator value using the rate of change of the plurality of RF power values.

4. The system of claim 1, wherein the controller is configured to cause the RF signal source to modify a frequency of the RF signal while the power detection circuitry repeatedly measures the plurality of RF power values.

5. The system of claim 1, wherein the load is in the defrosted state when a temperature of the load is greater than −4 degrees Celsius.

6. A thermal increase system, comprising:
a radio frequency (RF) signal source configured to supply an RF signal to an electrode to cause the electrode to radiate RF electromagnetic energy;
power detection circuitry configured to repeatedly measure RF power values of the RF electromagnetic energy to generate a plurality of RF power values;
a variable impedance network coupled to the electrode, the variable impedance network being configurable into a number of different network configurations; and
a controller configured to determine that a load proximate to the electrode is in a defrosted state based on a rate of change of the plurality of RF power values and a low-loss indicator value determined using the RF power values, wherein the low-loss indicator value is at least partially determined by a dielectric loss of the load and a comparison of each RF power value of the plurality of RF power values to predetermined thresholds, wherein each RF power value is measured with the variable impedance network in a different network configuration, and to determine one or more signal parameters of the RF signal in response to determining the load is in the defrosted state.

7. The thermal increase system of claim 6, wherein the controller is configured to determine the low-loss indicator value by:
measuring the plurality of RF power values, wherein each RF power value in the plurality of RF power values is associated with a different configuration of the variable impedance network; and
determining a first number of RF power values in the plurality of RF power values that are greater than a first power value threshold.

8. The thermal increase system of claim 6, wherein the controller is configured to determine the low-loss indicator value by:
measuring the plurality of RF power values, wherein each RF power value in the plurality of RF power values is associated with a different configuration of the variable impedance network;
for each RF power value in the plurality of RF power values, determining a point score associated with the RF power value;
using the point score for each RF power value to determine a total point score; and
determining that the total point score is less than a threshold point score.

9. The thermal increase system of claim 6, wherein the controller is configured to cause the RF signal source to modify a frequency of the RF signal while the power detection circuitry repeatedly measures the plurality of RF power values.

10. The thermal increase system of claim 9, wherein a first RF power value in the plurality of RF power values is associated with a first frequency of the RF signal and a second RF power value in the plurality of RF power values is associated with a second frequency of the RF signal and the low-loss indicator value is at least partially determined by the first RF power value and the second RF power value.

11. The thermal increase system of claim 6, wherein the controller is configured to modify a configuration of the variable impedance network while the power detection circuitry repeatedly measures the plurality of RF power values.

12. The thermal increase system of claim 11, wherein a first RF power value in the plurality of RF power values is associated with a first configuration of the variable impedance network and a second RF power value in the plurality of RF power values is associated with a second configuration of the variable impedance network and the low-loss indicator value is at least partially determined by the first RF power value and the second RF power value.

13. The thermal increase system of claim 6, wherein the load is in the defrosted state when a temperature of the load is greater than −4 degrees Celsius.

* * * * *